(12) United States Patent
Blanc et al.

(10) Patent No.: US 6,343,081 B1
(45) Date of Patent: Jan. 29, 2002

(54) METHOD AND APPARATUS FOR MANAGING CONTENTION IN A SELF-ROUTING SWITCHING ARCHITECTURE IN A PORT EXPANSION MODE

(75) Inventors: Alain Blanc, Tourrettes sur Loup; Bernard Brezzo, Nice; Pierre Debord, Tourrettes sur Loup; Patrick Jeanniot, LaGaude; Alain Saurel, Nice, all of (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/121,992

(22) Filed: Jul. 24, 1998

(30) Foreign Application Priority Data

Dec. 30, 1997 (EP) ............................................. 97480100

(51) Int. Cl.$^7$ ............................................... H04L 12/56
(52) U.S. Cl. ........................................ 370/411; 370/462
(58) Field of Search ................................. 370/360, 380, 370/384, 386, 387, 388, 389, 390, 422, 423, 424, 425, 426, 427, 428, 429, 430, 445, 447, 448, 461, 462, 411

(56) References Cited

U.S. PATENT DOCUMENTS

| 5,463,624 A | * | 10/1995 | Hogg et al. ................... 370/461 |
| 5,719,862 A | * | 2/1998 | Lee et al. ..................... 370/355 |
| 5,949,789 A | * | 9/1999 | Davis et al. .................. 370/452 |

* cited by examiner

Primary Examiner—Kwang B. Yao
(74) Attorney, Agent, or Firm—Driggs, Lucas, Brubaker & Hogg, Co. L.P.A.

(57) ABSTRACT

A method and apparatus for managing contention in a self-routing switching architecture based on a set of n×n individual switching structures that are connected in a port expansion mode by means of fan-out and fan-in circuits providing access of the Switch Core Access Layer (SCAL) to the different input and output ports of the switching core. The fan-in circuits use an arbitration mechanism for providing a token to the switch that is allowed to deliver the next cell and the arbiter operates from a detection of a special comma character in accordance with the 8B/10B coding scheme which is introduced in the data flow between the individual switching structures and the fan-in circuits. This provides a compensation for the difference in transfer delays of the cells even when high switching speed and long length of the physical media are involved.

8 Claims, 25 Drawing Sheets

FIG. 1
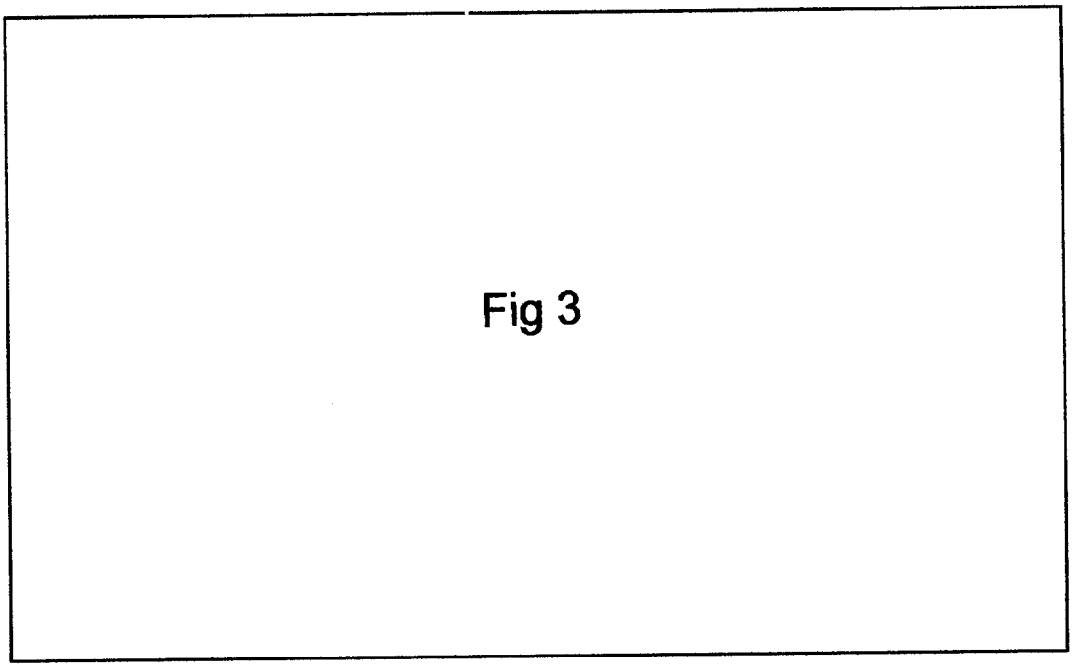
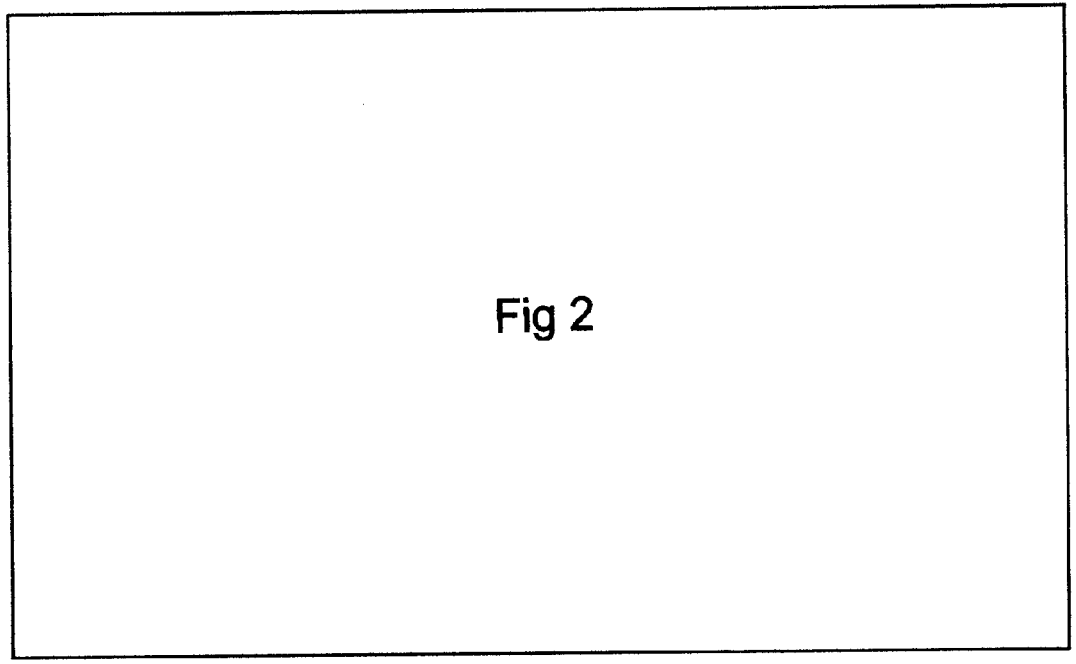

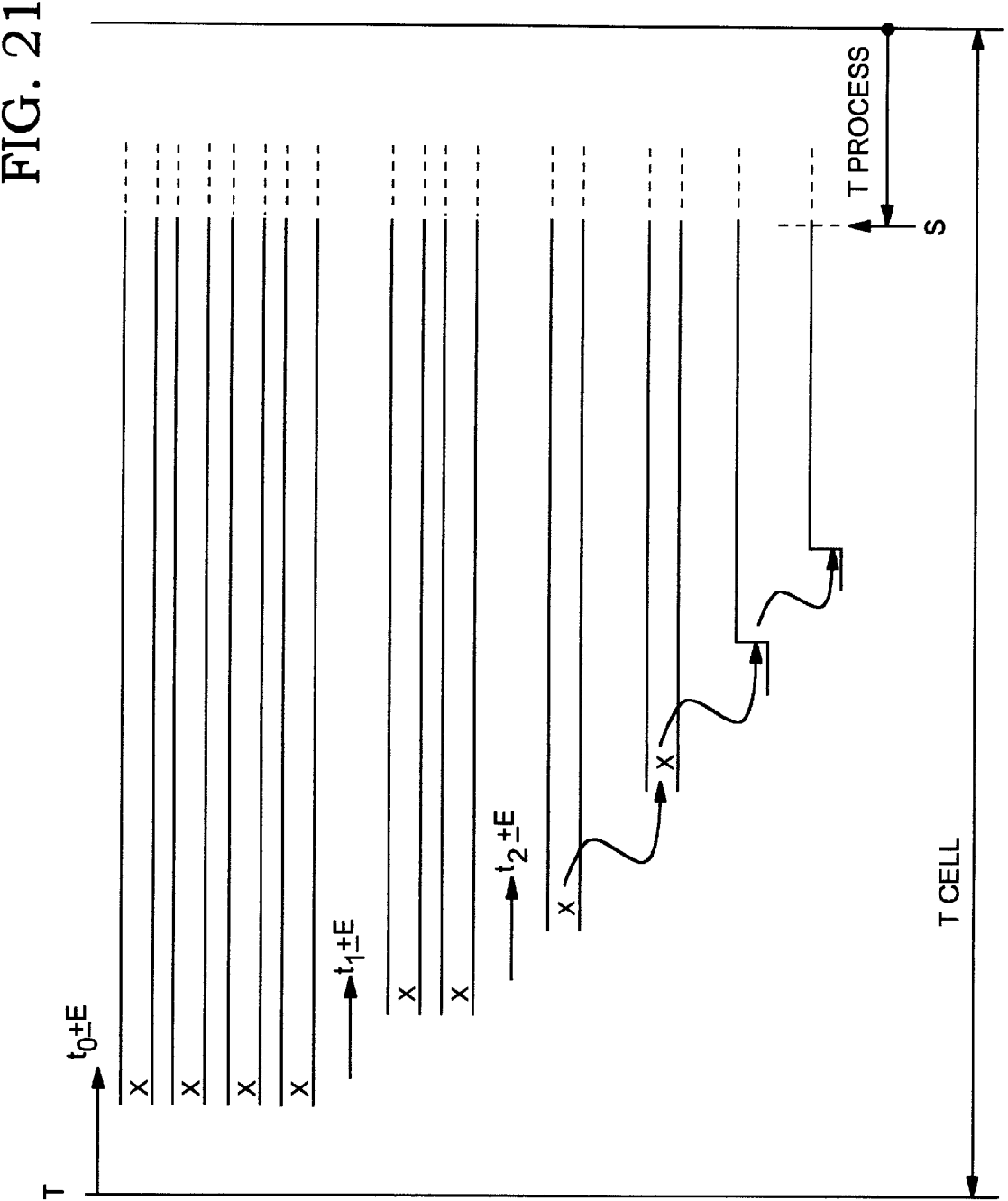

FIG. 23

| TOKEN 7325j | QE 7131j | QE 7132j | 7326j | GNT 7131j | GNT 7132j | 7315j |
|---|---|---|---|---|---|---|
| 0 | X | X | X | 0 | 0 | No change |
| 1 | 1 | 0 | X | 1 | 0 | 0 |
| 1 | 0 | 1 | X | 0 | 1 | 1 |
| 1 | 1 | 1 | 0 | 0 | 1 | 1 |
| 1 | 1 | 1 | 1 | 1 | 0 | 0 |

METHOD AND APPARATUS FOR MANAGING CONTENTION IN A SELF-ROUTING SWITCHING ARCHITECTURE IN A PORT EXPANSION MODE

TECHNICAL FIELD OF THE INVENTION

The invention relates to the telecommunication field, and more particularly to a method and apparatus for managing contention in a self-routing switching architecture in a port expansion mode.

BACKGROUND ART

Patent applications 96480126.0 (FR996040), 96480125.2 (FR996041), 96480117.9 (FR996042), and 96480120.3 (FR996045) are non-published prior European patent applications representing examples of powerful self routing switches that provide high switching speed. However, it is generally highly desired to increase the number of ports that allow more access and attachments to the basic switch core. When the switch rate tends to increase, it is observed that the cell cycle concurrently decreases, while, conversely, the transit time tends to increase when the physical area of the switching architecture tends to increase. Particularly, it may well happen that the basic switching component of a switching architecture, the so-called switch fabric, is located in one physical area, while the Switch Core Access Layers (SCALs) that permit the attachments to the switch fabric are located in different physical locations. The communication between the SCALs and the switch fabric will be achieved by means of one or more serial communication links that may extend over several hundreds of meters.

Therefore, the two basic requirements, i.e., the decrease in the cell cycle and the increase in the physical length of the cables involved in the switching architecture, tend to create significant difficulties in the possibility of connecting individual switching structures in a port expansion mode, since the latter implies the design of an effective contention mechanism for providing the fan-in operations involved downward of the switch fabric. Obviously it could be possible to base the arbitration mechanism on a fixed bandwidth for every switching structure which appears to be not very effective. However, another approach requires that a specific fan-in mechanism be designed, which can compensate for the effects resulting from the difference in the delays and transfer time of the cells throughout the physical coaxial cables and optical links between the switch fabric and the SCALs.

SUMMARY OF THE INVENTION

The technical problem to be solved by the present invention is to permit a port expansion architecture that authorizes, on one hand, an increase in the switching rates (corresponding to decrease of the cell cycles), while, on the other hand, permitting a large physical area for the switch architecture where the different SCAL elements are distributed at a distance up to 500 meters from the switch cores.

This problem is solved by the method and apparatus for managing contention in a self-routing switching architecture based on a set of n×n individual switching structures that are connected in a port expansion mode by means of fan-out and fan-in circuits providing access of the Switch Core Access Layers (SCAL) to the different input and output ports of the switching core. The fan-in circuits use an arbitration mechanism for providing a token to the switch that is allowed to deliver the next cell and the arbiter operates based on detection of a special comma character in accordance with the 8B/10B coding which is introduced in the data flow between the individual switching structures and the fan-in circuits. This provides an automatic compensation for the difference in delays of transfer of the cells even when high switching speed and long length of the physical media are involved.

DESCRIPTION OF THE DRAWINGS

FIG. 1 shows the arrangement of FIGS. 2 and 3 in order to provide a full and comprehensive illustration of the switching module 401 used for embodying the present invention.

FIG. 21 illustrates the timing diagrams that are involved in the actual process of transmission of the Queue-empty control signals through the first stage arbiters, the building of the Grant control signal inside the second-stage arbiter, and the retransmission of the latter in the opposite direction towards the appropriate switch core that will receive the Grant control signal.

FIG. 23 is a truth table for the combinatory logic circuit 7311-j which determines the appropriate direction of propagation of the token which is to be distributed back to the switch cores arranged in port expansion mode.

DESCRIPTION OF THE PREFERRED EMBODIMENT

Figure 2:
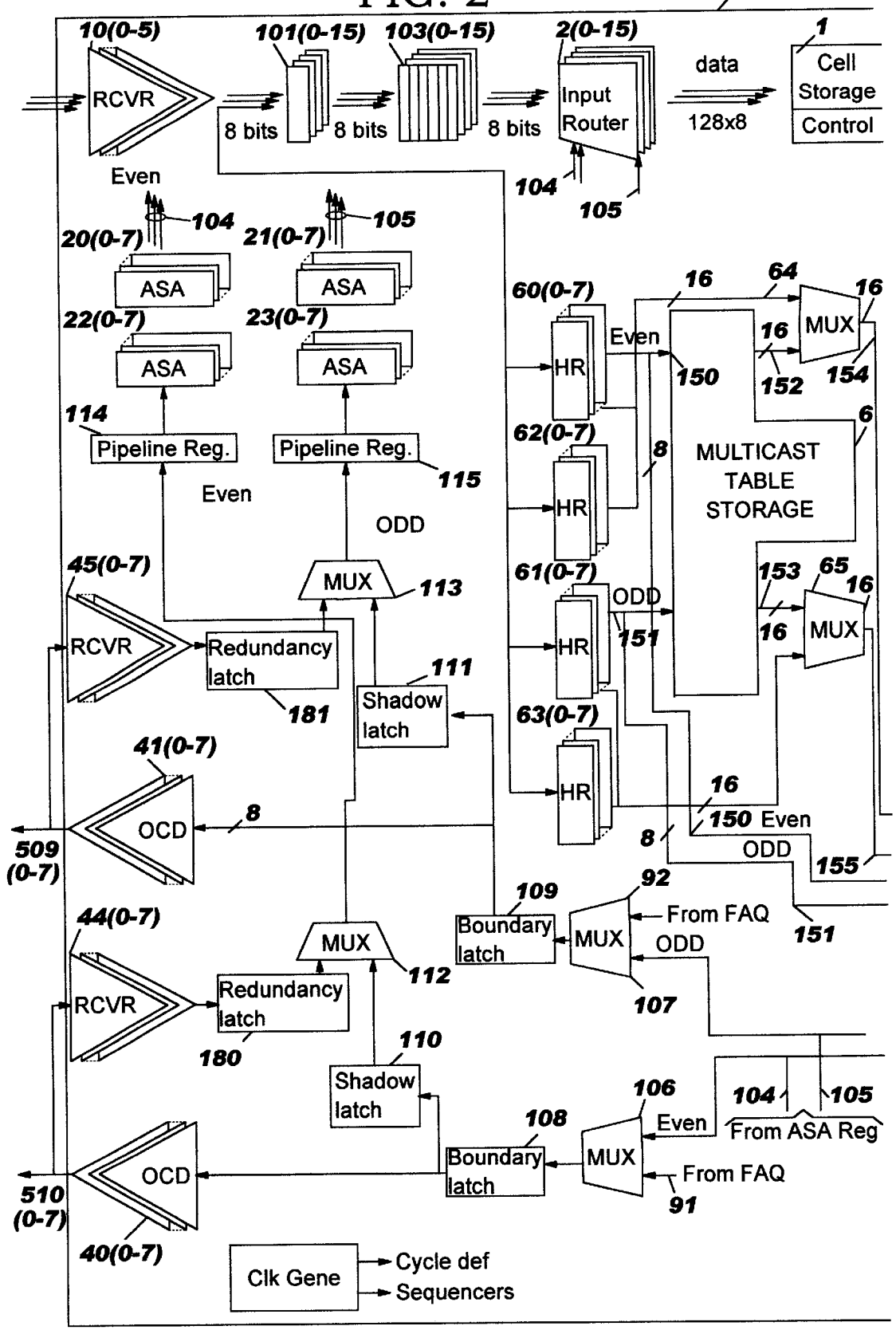
FIGS. 2 and 3 illustrate the structure of the switching module that is used in the preferred embodiment of the present invention.
Figure 3:
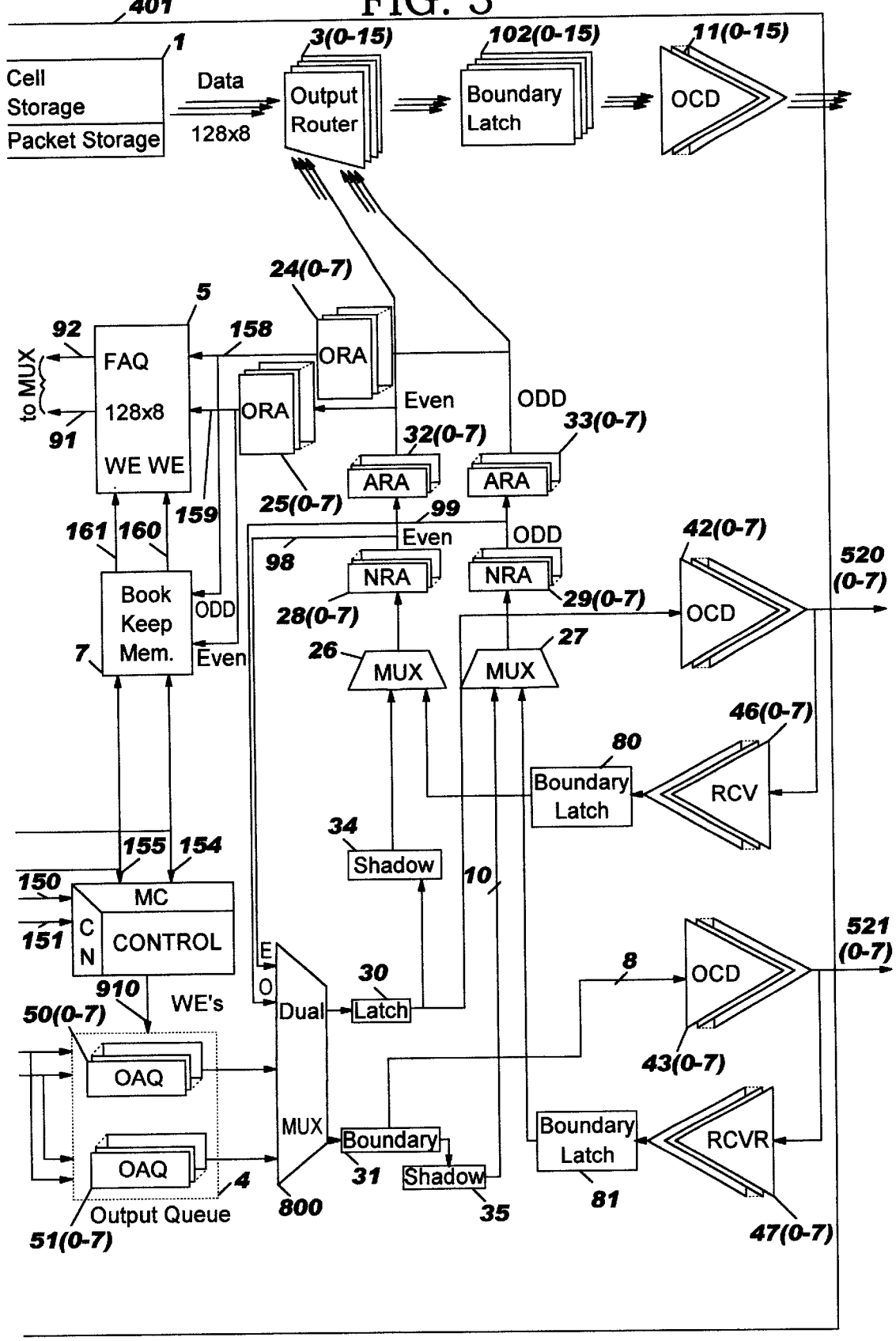

With respect to FIGS. 2 and 3, there is illustrated the switching module that is used for embodying the switching apparatus in accordance with the present invention. This module, represented in block 401 includes a data section comprising a storage section for performing the storage processing of the cells coming through any one of the sixteen input ports into a common Cell Storage 1, in addition to a retrieve section for outputting the cells therein loaded and for transporting them to any output port of the switching module.

The storage section uses a set of sixteen RCVR receivers 10-0 to 10-15 which represents the physical interface for the sixteen different input ports. A set of sixteen corresponding routers 2-0 to 2-15 achieves the connection of the input ports to anyone of the 128 positions of Cell Storage 1. For timing considerations, the storage section further comprises a set of sixteen boundary latches 101-0 to 101-15 and a set of pipeline circuits 103-0 to 103-15 so that the data that is transmitted by every receiver 10-i is conveyed to router 2-i via its corresponding boundary latch 101-i and pipeline 103-i.

On the other side of Cell Storage 1, the retrieve section of switching module 401 comprises a set of sixteen Off-Chip-Drivers (OCD) drivers 11-0 to 11-15 which are used for interfacing the sixteen output ports of the switching module. The OCD drivers receive the data from sixteen routers 3-0 to 3-15 via an associated set of sixteen boundary latches 102-0 to 102-15 (used for timing considerations) so that each router 3-i can retrieve any data located within the 128 locations that are available in Cell Storage 1, and transport them via a corresponding OCD driver 11-i towards the appropriate destination output port i.

In addition to the data section, switching module 401 further comprises a control section that is based on a Free Access Queue (FAQ) circuit 5 (shown in FIG. 3) which is used for storing the addresses of the empty locations in Cell Storage 1. An Output Queue Memory 4 is constituted by two distinct sets of eight Output Address Queues (OAQ) 50-0 to 50-7 and 51-0 to 51-7. As will be explained hereinafter in greater detail, these two sets of queues are used for storing the addresses of the locations within Cell Storage 1 that contain the data cells that are to be transmitted to the output ports. Two sets of eight registers, namely ASA Registers 20-0 to 20-7 and ASA Registers 21-0 to 21-7, are respectively used for generating addresses on a set of two busses—an Odd bus 104 and an Even bus 105—the two busses being connected to the sixteen routers 2-0 to 2-15, and to OAQ queue 4. Bus 104 is formed by the association of the eight output busses of ASA registers 20-0 to 20-7 (composed of 64 bytes), while bus 105 is a 64 byte bus that is constituted from the combination of the output busses of the eight ASA registers 21-0 to 21-7.

Additionally, Even bus 104 is connected to a first input bus of a multiplexor MUX 106 receiving at a second input the free addresses from FAQ 5 via bus 91. The output of MUX 106 is connected to a boundary latch 108, the output of which is connected to the inputs of a set of eight Off Chip Drivers (OCD) 40-0 to 40-7 and to a shadow latch 110. OCD drivers 40-0 to 40-7 have outputs which are respectively connected to form an 8-bit bus 510 (formed of the eight outputs 510-0 to 510-7), also connected to the input of corresponding RCVR receivers 44-0 to 44-7. The outputs of RCVR receivers 44-0 to 44-7 are connected to a redundancy latch 180, which output is connected to one input bus of a multiplexor MUX 112, the second input of which receives the contents of shadow latch 110. Multiplexor MUX 112 has an output that is connected to a pipeline register 114 in order to load the conveyed data into the appropriate NSA registers 22-0 to 22-7 as will be described hereinafter.

Similarly, Odd bus 105 is connected to a first input bus of a multiplexor MUX 107 receiving at a second input the free addresses from FAQ 5 via bus 92. The output of MUX 106 is connected to a boundary latch 109, the output of which is connected to the inputs of a set of eight Off Chip 6 Drivers (OCD) 41-0 to 41-7 and to a shadow latch 111. OCD drivers 41-0 to 41-7 have their outputs 509-0 to 509-7 which are respectively assembled in order to form an 8-bit bus 509, also connected to the inputs of eight RCVR receivers 45-0 to 45-7. The outputs of RCVR receivers 45-0 to 45-7 are connected to a redundancy latch 181, which output is connected to one input bus of a multiplexor MUX 113, the second input of which receives the contents of shadow latch 111. Multiplexor MUX 113 has an output that is connected to a pipeline register 115 so that the addresses can be made available to the appropriate NSA registers 23-0 to 23-7 as will be described hereinafter. The control section further comprises four sets of holding registers 60-0 to 60-7, 61-0 to 61-7, 62-0 to 62-7, and 63-0 to 63-7, that will be used for performing the switching process as will be described below.

Coming back to the data section again, it should be noticed that the sixteen input ports can simultaneously load sixteen cells into Cell Storage 1 at the addresses that are defined by the contents of two sets of eight registers ASA 20-0 to 20-7 and ASA 21-0 to 21-7. During the same time, sixteen cells can be extracted from Cell Storage 1 at the addresses that are defined by the contents of sixteen ARA registers, arranged in two sets of eight registers each: ARA registers 32-0 to 32-7 and ARA registers 33-0 to 33-7. ARA registers 32-0 to 32-7 recieve the contents of corresponding NRA registers 28-0 to 28-7 through an Even bus 98 which is also connected to a first input of a dual-multiplexor circuit 800. Similarly, ARA registers 33-0 to 33-7 receive the contents of corresponding NRA registers 29-0 to 29-7 through an Odd bus 99 which is connected to a second input of dual-multiplexor circuit 800. Dual-multiplexor 800 respectively receives the output of the first and second set of OAQ queues 50-0 to 50-7 and 51-0 to 51-7 at a third and fourth input bus. Dual-Multiplexor 800 has two output buses which are respectively connected to a boundary latch 30 and to a boundary latch 31.

NRA registers 28-0 to 28-7 are connected to receive the output of a multiplexor circuit MUX 26 which has a first and second input that respectively receives the contents of a shadow latch 34 and a boundary latch 80. Similarly, NRA registers 29-0 to 29-7 are connected to receive the output of a multiplexor circuit MUX 27 which has a first and second input that respectively receives the contents of a shadow latch 35 and a boundary latch 81. The output of latch 30 is connected to the input bus of shadow latch 34 and also to the inputs of a set of eight Off-Chip-Drivers (OCD) 42-0 to 42-7, which outputs 520-0 to 520-7 are assembled in order to form a bus 520 which is also connected to the inputs of a set of eight RCV Receivers 46-0 to 46-7. Similarly, the output of latch 31 is connected to the input bus of shadow latch 35 and also to the inputs of a set of eight Off-Chip-Drivers (OCD) 43-0 to 43-7, which outputs 521-0 to 521-7, forming a bus 521, are connected to corresponding inputs of a set of eight RCVR Receivers 47-0 to 47-7. The outputs of RCVR receivers 46-0 to 46-7 are connected to the input bus of latch 80, and the outputs of RCVR receivers 47-0 to 47-7 are connected to the input bus of latch 81.

As will be described below, it will appear that the structure of the present invention permits a set of sixteen cells to be simultaneously extracted from Cell Storage 1, and routed to the appropriate output port. Should one cell include N bytes (for instance 54 bytes), the switching module provides the capability to store sixteen cells into Cell Storage 1 and to retrieve sixteen cells from Cell Storage 1 in a set of N clock cycles. The input and output processes that are involved in the switching module 401 will now be described in more detail.

1. Input Process

The input process is involved with achieving the complete storage of a set of N bytes included in one elementary cell (considering that sixteen cells are actually being inputted simultaneously). The input process basically involves two distinct operations. First, the cells are entered into the data section via the sixteen receivers 10-0 to 10-15 as will be described below. This first step is achieved in a set of N clock cycles. Additionally, a second operation is performed for preparing the addresses within Cell Storage 1, or more exactly for computing the sixteen addresses that will be used within Cell Storage 1 for the loading of the next set of sixteen cells that follow. In the preferred embodiment of the invention, this second address computing step is achieved in a set of eight elementary cycles only. Indeed, the first cycle is used for computing the addresses used by input ports 0 and 1, while the second achieves the determination of the addresses that will be needed by ports 2 and 3 and, more generally, cycle n provides the computing of the two addresses within Cell Storage 1 that will be involved with inputting the cell coming through ports 2n and 2n+1.

In order to prepare the input operation, the free addresses of the Cell Storage 1 are provided by Free Address Queue 5 and loaded into the first set of ASA registers 20-0 to 20-7, and second set of ASA registers 21-0 to 21-7. For the sake of conciseness, when the ASA registers 20-0 to 20-7 are considered without any distinction, they will be referred to as "ASA registers 20". Similarly, the use of the reference to "ASA registers 21" will stand for the use of the eight ASA registers 21-0 to 21-8 indistinctly. When a distinction will have to be introduced, the normal reference to the registers 20-0 to 20-7 (or a reference to register 20-i) will be reestablished. This simplification will also be used in the remaining part of the description for the other groups of individual elements, such as ARA registers 32-0 to 32-7, NRA registers 28-0 to 28-7 etc. The full loading of the ASA registers 20 and 21 will now be described. As mentioned above, this is achieved by eight successive transfers of the addresses provided by FAQ circuit 5, via multiplexor 106, boundary latch 108, shadow latch 110, multiplexor 112, pipeline register 114 and multiplexor 112. For instance, the loading of ASA register 20-0 is achieved by a transfer of the address provided by FAQ circuit 5 (on bus 91) via multiplexor 106, latches 108 and 110, multiplexor 112, pipeline register 114 and NSA register 22-0. Then, ASA register 20-1 is loaded transfer via its corresponding NSA register 22-1 etc.

Similarly, the loading of the set of ASA registers 21 is successively carried out via the multiplexor 107, boundary latch 109, shadow latch 111, multiplexor 113, pipeline register 115, and the set of eight NSA registers 23. As mentioned above, multiplexors 106 and 107 have a second input which is connected to receive the contents of the ASA registers 20 and 21, respectively. The use of the second input of multiplexors 106 and 107 allows the recycling of the addresses that are loaded into the ASA registers 20 and 21. It should also be noticed that the two sets of ASA registers form a whole group of sixteen registers that will be associated with the sixteen input ports of the switch module. The invention takes advantage of the arrangement of the set of ASA registers 20 and 21 in two groups of eight registers each in order to reduce the number of elementary cycles that are required for computing the sixteen addresses used for the loading of the sixteen cells into Cell Storage 1. With only eight successive cycles, the invention provides the possibility of handling sixteen different input ports.

When the free addresses are loaded into ASA registers 20 and 21, the cell cycle which achieves the actual loading of the N bytes cell into Cell Storage 1 can be initiated. Indeed, it appears that, for each input port, an address is made available into a corresponding one of the set of sixteen ASA registers. More particularly, the cell that is presented at an input port number 2n (that is, an even port since n is an integer between 0 to 7) will be loaded into Cell Storage 1 through the corresponding router 2-(2n) at a location which address is defined by the contents of ASA register 20-n. The cell that is presented at an odd input port, that is, port number 2n+1 (with n being an integer between 0 and 7) will be loaded into Cell Storage 1 through router 2-(2n+1) at a location that is defined by the contents of ASA register 21-n. From this arrangement, it appears the complete storage of a full cell of N elementary bytes requires a set of N elementary clock periods, while the control section allowing the storage of the ASA registers 20 and 21 requires eight elementary cycles. However, it should be noticed that since each router 2 is associated with a corresponding one among the sixteen ASA registers 20 and 21, sixteen cells can be simultaneously loaded into Cell Storage 1. More particularly, router 2-(2n) receives the output bus of the ASA register 20-n, while router 2-(2n+1) receives the output bus of ASA register 21-n.

How the routing process of the incoming cell is being performed, simultaneously with the above mentioned loading of the ASA registers 20 and 21 will now be described. In the preferred embodiment of the invention, this routing process is based on a use of a routing header that can be either one or two bytes. When the header is limited to a single byte, the switch module according to the present invention operates differently in accordance with the Most Significant Bit (MSB) of the header. Indeed, as will be explained below, the switch is designed to operate in an unicast mode when the MSB of the one-byte routing header is set to zero, while it operates in a multicast mode when the MSB is fixed to a one.

In unicast mode, the header is defined by the following format:

bit 0 !bit 1 bit2 bit 3 !bit 4 bit 5 bit 6 bit 7 0!module number! port number!

with the module number defining the actual module that will route the cell. The port number defines the identification of the port to which the cell must be routed.

Conversely, when the MSB is fixed to a one, characteristic of the one-byte multicast mode, the seven remaining bits of the one-byte header are used as a multicast label which is used to determine the output ports to which the cell must be duplicated, as will be shown hereinafter.

In addition to the one-byte header, the switching module of the present invention is also designed to operate with a two-byte header. In this case, the sixteen bits of the header are used to define the output ports where the cell will be duplicated. Indeed, each bit of the sixteen bits of the header is associated with one output port, for instance the MSB corresponding to output port number 0, and every bit of the header that is set to a one indicates that the cell carrying this header will have to be duplicated to the output port that is associated with the considered bit. For instance, the MSB being set to "one" will cause the cell to be duplicated to output port 0, while bit number one set to a one will result in the same duplication to output port number 1, etc.

With this capability of using different formats of headers, resulting in different modes, the switching module is allowed a great flexibility, only requiring adaptations of the microcode that is loaded into the switching module.

What will now be described in more detail are the unicast one-byte-header mode ("unicast mode"), the multicast one-byte-header mode ("integrated multicast mode") and the two-byte header mode ("bit-map"mode).

Section 1.1. Description of the Unicast Mode (unicast one-byte header mode)

The unicast mode is based on the use of two sets of holding registers 60 and 61, forming a total of sixteen holding registers. Simultaneously with the loading of the sixteen cells (formed of N bytes each), the one-byte header of each cell is loaded into the corresponding one among the sixteen holding registers 60 and 61 mentioned above. These sixteen holding registers (namely registers 60-0 to 60-7 and 61-0 to 61-7) hold the header as long as the entire loading process of the cells is not fully completed. In the arrangement of the present invention, the header of the cell that comes through port 2n is loaded into holding register 60(n), while the header of the cell coming through port 2n+1 is loaded into holding register 61(n). The sixteen values that are loaded into these sixteen holding registers will be used by the control section of the switching module. As it appears in FIGS. 2 and 3, each holding register 60-i is connected via an Even bus 150 to a control module 200, as well as to a Multicast Table Storage 6. Similarly, each holding register 61-i is connected via an Odd bus 151 to Control Module 200 and to Multicast Table Storage 6. Similarly to the loading process of the ASA registers 20 and 21 that was described above, the access of the sixteen Holding registers 60 and 61 are achieved by eight successive elementary clock periods, each clock period providing the access of a dual Odd-Even holding register to bus 150 and bus 151. More particularly, during clock period number 0 for instance, holding registers 60(0) and 61(0) respectively get access to Even bus 150 and Odd bus 151 in order to transfer their contents into Control Module 200. At the next clock period, the busses 150 and 151 are used for transporting the contents of the holding registers 60(1) and 61(1), and so on. It should be noted that the access of holding register 60(i) and 61(i) to Control Module 200 permits the monitoring of the MSB of the header of each cell being inputted into the switching module. This permits Control Module 200 to be aware of the actual mode of the operation, either unicast or integrated multicast, that will be associated with each input port. For instance, should the header being loaded into holding register 60 (i) carry a MSB set to zero, indicative of the unicast mode of operation, then the Control Module 200 will determine that the considered input port 2n will require unicast processing. Conversely, if the MSB of holding register 61(i) carries a one, characteristic of the integrated multicast mode, then the Control Module 200 will cause the associated cell to be processed according to the integrated multicast mode that will be described below.

Therefore, it appears that the switching module of the present invention permits the sixteen input ports to operate quite independently, that is to say in different modes, either unicast or integrated multicast, in accordance with the contents of the routing header that is being transported by the considered input ports.

The unicast routing process operates as follows:

Output Queue is formed of the sets 50 and 51 of eight queues each. Each individual OAQ queue of sets 50 and 51 is a dual input port of 64 bytes at least that is connected to Even bus 104 and Odd bus 105. Additionally each OAQ queue receives an Odd Write-Enable and an Even Write-Enable control signal from Control Module 200. The sixteen sets of Odd and Even Write-Enable control leads form a 32-lead bus 210. Similarly to the notation that was already employed above, each OAQ queue is associated with a corresponding one of the sixteen output ports of the switching module. Therefore, output port number 2n will be associated with OAQ queue 50(n), while output port 2n+1 corresponds to OAQ queue 51(n).

At a given instant (referred to as cycle n), the two input ports 2n and 2n+1 are processed as follows: Control Circuit 200 gets access to the contents of holding registers 60(n) via bus 150 (i.e. the header of the cell on input port 2n) and the contents of holding registers 61(n) (i.e. the header of cell received at input port 2n+1) via bus 151. Control Module 200 uses these headers for generating the appropriate Odd and Even Write-Enable control signals so that the contents of the ASA registers 20(n) and 21(n) are loaded into one or two of the sixteen OAQ queues 50 and 51. More particularly, it should be noted that Control Module 200 generates the Write-Enable control signals on bus 210 so that the contents of the ASA register 20(n) are loaded into one of the sixteen OAQ queues 50 and 51 that correspond to the output port that can be determined from the contents of the header being transported and loaded into holding register 60(n), in accordance with the port number field that is defined by bits 4 to 7 of the one-byte header. Simultaneously, the contents of ASA register 21(n) are loaded into one of the sixteen output queues 50 and 51 that correspond to the output port that can be determined from the contents of the header being loaded into holding register 61(n), particularly bits 4 to 7 of the header. More precisely, considering the input port 2n for clarity's sake, should the contents of holding register 60(n) be equal to an integer 2p, the contents of ASA register 20(n) will be loaded into Output Queue 50(p). This will result, as will be described below, in the cell received on input port 2n being routed to the output port number 2p in accordance with the contents of the routing header transported by the cell. Should the contents of holding register 60(n) be equal to integer 2p+1, Control Module 200 generates the appropriate Write-Enable control signals on bus 210 so that the contents of ASA register 20(n) is loaded into OAQ 51(p), causing the cell that is received at input port 2n to be routed to output port 2p+1. Similarly, considering input port 2n+1, should the contents of holding register 61(n) be equal to integer 2q, the contents of ASA register 21(n) will be loaded into Output Queue 50(q) (so that the cell will be transported to output port 2q). However, should the contents of holding register 61(n) be equal to 2q+1, then Control Module 200 generates the appropriate Write-Enable control signals so that the contents of ASA register 21(n) are loaded into Output Queue 51(q), and the cell will be routed to output port 2q+1.

It may well occur that the two cells arriving at input ports 2n and 2n+1, and which are loaded into Cell Storage 1, are to be directed to the same output port, for instance output port 2p (resp. 2p+1) accordingly with the header being transported by the two cells. In this case, it appears that both holding registers 60(n) and 61(n) carry the same header, which results in the contents of the ASA register 20(n) and 21(n) being loaded into unique Output Queue 50(p) (resp. 51(p)). In the invention, this type of contention is advantageously solved by using a dual-port storage for embodying each one of the sixteen output queues 50 and 51.

1.2 Description of the One-byte Header Multicast Mode (integrated multicast).

The integrated multicast mode is based on the use of the two sets of holding registers 60 and 61, forming a total of 16 registers. As above, the header of the cell arriving at input port 2n is loaded into holding register 60(n), while that of the cell arriving at input port 2n+1 is loaded into holding register 61(n). The loading of the sixteen holding registers 60 and 61 requires eight clock periods, as above, since two registers can be loaded simultaneously. As mentioned above, by monitoring the MSB of the one-byte header that is incorporated into each cell, the Control Module 200 is made aware of the appropriate processing—unicast or integrated multicast—that has to be performed for every cell coming in at one input port.

The integrated multicast routing process operates as follows:

As above, the sixteen dual-port output queues 50 and 51 of OAQ queue 4 are arranged so that output port 2n is associated with queue 50(n) and output port 2n+1 is associated with queue 51(n).

At a given instant, during cycle n, the two input ports 2n and 2n+1 are processed as follows: the 7 Least Significant Bits (LSB) of the two headers that are respectively loaded into holding register 60(n) and 61(n) (which corresponds to the multicast label as mentioned above) are simultaneously used for addressing Multicast Table Storage 6 via busses 150 and 151. This entails the execution of simultaneous reading operations of the dual-port memory used for embodying the Multicast Table Storage 6. Multicast Table Storage 6 presents two 16-bit data busses 152 and 153 which are respectively connected to a first 16-bit input bus of a multiplexor 64 and to a first 16-bit input bus of a multiplexor 65. Multiplexor 64 (resp. 65) has a second input bus that is respectively connected to receive the contents of the two 8-bit holding registers 60(n) and 62(n) (resp. holding register 61(n) and 63(n)). The use of this second input bus of multiplexors 64 and 65 will be more fully explained with respect to the description of the bit-map multicast mode. Multiplexors 64 and 65 have 16-bit output busses that are respectively connected to a dedicated part (so called MultiCast or MC) of Control Module 200.

The results of the two simultaneous reading operations of Multicast Table Storage 6 are presented to Control Module 200 via multiplexors 64 and 65, respectively. It should be noted that the control of all the multiplexors that are used in the switching module of the present invention is achieved by means of a general control device such as a microprocessor (not shown in the figure). Therefore, for the input ports which are identified by Control Module 200 as requiring the integrated multicast processing, the latter uses the contents of the Multicast tables that are passed through multiplexors 64 and 65 via busses 154 and 155 respectively, to generate the appropriate Write-Enable control signals on bus 210 so that the contents of the ASA registers 20(n) and 21(n) are loaded into the appropriate queues 50 and 51 that correspond to the output ports involved in the multicast operation. This is achieved as follows: according to the multicast label that is carried by the header of input port 2n, loaded into holding register 60(n), the result of the reading operation performed in Multicast Table Storage 6 provides a 16-bit word that is presented on bus 152. Each of the sixteen bits forming this word is associated with one output port of the switching module. For instance, the MSB corresponds to the output port number 0 that is associated with OCD driver 11(0), while the LSB corresponds to the output port 15. Therefore, the sixteen bits of the word presented on bus 152 define the different output ports to which the cell carrying the considered one-byte header will have to be duplicated. Should the cell be duplicated in the even output ports, (i.e. ports 0, 2, 4, . . . , 14), then the word will be X'AAAA (in hexadecimal). Should the cell be duplicated in all output ports, corresponding to a so-called broadcast multicast, then the word will be X'FFFF.

More generally, Control Module 200 generates the Write-Enable control signals on bus 210 so that the contents of ASA register 20(n) are loaded into the group of appropriate queues among the sixteen output queues 50 and 51 of block 4 that correspond to one output port which is determined by the word transported on bus 152. Simultaneously, the contents of register 21(n) are loaded into the group among the sixteen output queues of OAQ block 4 that corresponds to the output port determined by the value carried by bus 155. More precisely, during cycle n, considering the bit number 2p of bus 154, if this bit appears to be set to a "one", this will cause the contents of ASA register 20(n) (corresponding to input port 2n) to be loaded into output queue 50(p). This will result in the duplication of the cell to output port 2p. Considering now bit number 2p+1 of bus 154 during the same cycle n, if this bit is set to a "one", this will be interpreted by Control Module 200 as a need for causing the contents of ASA register 20(n) (still corresponding to input port 2n) to be transferred into OAQ output queue 51 (p). This will result in the duplication of the cell arriving at input port 2n at output port 2p+1. This mechanism permits the duplication of one cell (arriving at input port 2n in the considered example) at any combination of the output ports. Considering cycle n again, and bit number 2q of bus 155, if the latter is set to a one, this will result in Control Module 200 causing the contents of ASA register 21(n) (corresponding to input port 2n+1) to be transferred into output queue 50(q). As above, this will result in the duplication of the cell arriving at input port 2n+1 to the output port 2q. Similarly, if the bit number 2q+1 of bus 155 is set to a one during cycle n, the contents of ASA register 21(n) will be loaded into output queue 51(q), resulting in the duplication of the cell at the output port 2q+1.

It appears from the above described mechanism that it could well occur that the two cells that arrive at input ports 2n and 2n+1 contain a header that each corresponds to a broadcast operation, in which case the duplication of the cells are requested for all the output ports. In this particular case, during cycle n of the eight clock periods needed for processing the sixteen ports, the two busses 154 and 155 appear to convey the same information, i.e. X'FFFF (in hexadecimal). Control Module 200 simultaneously generates the 32 Write-Enable control signals on bus 210, thus causing the loading of the contents of the two ASA registers 20(n) and 21(n) processed during cycle n into the sixteen OAQ output queues 50 and 51. Since these queues are embodied by means of a dual-port storage, it appears that any contention is advantageously solved.

Next, a specific operation is involved in preparing the output process associated with the two addresses which were transferred from ASA registers 20(n) and 21(n). This mechanism involves the use of the Book Keep Memory circuit 7. Indeed, during cycle n, the address defined by the contents of the ASA register 20(n), presented on bus 104, is used as an address for addressing the Book Keep Memory 7 and for therein storing the actual number of times that the considered address in ASA 20(n) was stored into Output Queue 4, that is to say the number of duplications which must be performed for the considered cell being loaded into Cell Storage 1. More particularly, for a unicast operation, the value which is loaded into Book Keep Memory 7 at the address defined by the contents of ASA register 20(n) will be equal to 1. In the case of a multicast operation on the cell arriving on port 2n, the value which is loaded will represent the number of 1's existing on bus 154, that is to say the number of times that the cell will be duplicated on the output ports. Simultaneously, the address that is loaded into ASA Register 21(n), during cycle n, is processed in the same way. Therefore, for a unicast operation on input port 2n+1, the value which is loaded into Book Keep Memory 7 at the address defined by the contents of ASA register 21(n) will be equal to 1, while, in a multicast operation, that value will be equal to the actual number of 1's that exists on bus 155.

1.3 Description of the Two-byte Header Multicast Mode (bit map mode).

In the bit map mode, the multiplexors 64 and 65 are switched at their alternate position contrary to the one-byte header mode (using an internal control device not shown in the figure). Therefore, it appears that the data can be directly transferred from bus 156 to bus 154 and similarly data that appear on bus 157 can be directly transferred to bus 155. The bit-map mode is based on the use of holding registers 60, 61, 62 and 63, thus forming a total of 32 registers of eight bits each. The two-byte header of the cell that comes through input port 2n is loaded into holding register 60(n) and 62(n), while the header of the cell arriving at input port 2n+1 is loaded into holding register 61(n) and 63(n). The full loading of the 32 holding registers requires a set of eight successive cycles. In the bit map mode, the Multicast Table Storage 6, busses 150, 151, 152 and 153 are not used. Further, an initialization period is involved for setting the Control Module 200 into this bit map mode, so that the latter can then use the 16-bit words that are presented on busses 154 and 155, respectively coinciding with the two-byte headers of the cells arriving at input port 2n and 2n+1, for generating the appropriate Write-Enable control signals on bus 210. This results in the contents of ASA registers 20(n) and 21(n) being loaded into the appropriate queues 50 and 51 that correspond to the actual output ports involved for the multicast operation, as described above for the integrated multicast mode.

In the particular case where a unicast operation is to be performed on one cell arriving at input port 2n, it should be noticed that the two-byte header will have one unique "1", which location among the sixteen bits will define the target output port where the cell will be routed.

Finally, the Book Keep Memory 7 is similarly processed as above, for the purpose of preparing the output process that will use the particular addresses that were loaded into ASA registers 20(n) and 21(n). The output process will now be described in detail.

2. Description of the Output Process Performed by the Switching Module.

The output process is independent from the input process and involves two distinct phases.

A first preliminary phase is initiated, which requires eight successive cycles. During cycle n, there is simultaneously prepared the operation for the output ports 2n and 2n+1. The first phases allows the loading of the sixteen ARA registers 32 and 33. This is achieved as follows: during cycle n the address loaded into Output Address Queue 50(n) is extracted and transported to NRA register 28(n) via boundary latch 30, shadow register 34 and multiplexor 26 (controlled by internal processor not shown in the figure). Simultaneously, the address that is loaded into Output Address Queue 51(n) is extracted and conveyed to NRA register 29(n) via boundary latch 31, shadow register 35 and multiplexor 27. It therefore appears that the loading of the sixteen NRA registers 28 and 29 requires a set of eight elementary clock cycles. When these eight cycles are completed, the contents of each NRA register among the sixteen NRA registers 28 and 29 are simultaneously loaded into the corresponding one among the sixteen ARA registers 32 and 33. This loading completes the first initialization phase.

The second phase can then be initiated. The sixteen addresses which are now available in ARA registers 32 and 33 are presented to their corresponding Output Routers 3-0 to 3-15. Each router will then perform the appropriate connection of its corresponding output port to one among the 128 locations within Cell Storage 1 that is designated by the address defined by the contents of the corresponding ARA register 32 or 33. More particularly, each router 3(2p), with p=0 to 7, performs the connection of output port 2p to the appropriate location within Cell Storage 1 that is defined by the contents of ARA register 32(p). Simultaneously, every router 3(2p+1), with p=0 to 7, performs the connection of output port 2p+1 to the appropriate location in Cell Storage 1 that is designated by the contents of ARA register 33(p). Therefore, it appears that the sixteen retrieve operations can be performed simultaneously and sixteen cells can be routed towards the sixteen OCD drivers 11, allowing a very effective switching mechanism. It should be noted that the full extraction of the cells requires a number of N clock periods.

At the completion of the output process, the sixteen addresses that are contained in the ARA registers are transferred into corresponding locations of a set of sixteen Old Retrieve Address (ORA) registers 24(0) to 24(7) and 25(0) to 25(7). This is achieved by a single transfer of the contents of ARA register 32(n) and 33(n) into ORA Register 24(n) and 25(n).

It should be noticed that in the preferred embodiment of the present invention, the dual transfer 6 of the contents of NRA registers 28(n) and 29(n) into the corresponding ARA registers 32(n) and 33(n) is simultaneously achieved with the dual transfer of the contents of ARA registers 32(n) and 33(n) into ORA registers 24(n) and 25(n).

The process then proceeds to a recycling of the addresses of Cell Storage 1 which become available again because of the possible extraction of the cells which were loaded therein. This process uses the Book Keep Memory 7 in order to take into account the possibility of multiple booking when in multicast mode. Indeed, in the case of multicast cells, the invention prevents the first retrieve operation performed on this cell from resulting in the availability of the considered location in Cell Storage 1 until the last duplication of the cell has been actually completed. Also, the process used in the present invention takes into consideration the fact that, should a cell be duplicated three times at three distinct output ports, for instance, the three retrieve processes might well not occur at the same instant for each output port. The difference in the actual retrieve operation of the same cell obviously depends upon the actual loading of the OAQ queue that corresponds to the output port being considered, that is to say the actual traffic of the output port. The recycling process requires that a set of eight elementary cycles be performed as follows: during cycle n, the contents of ORA Register 24(n) is presented via bus 158 to the Free Address Queue (FAQ) circuit 5 and to the Book Keep Memory circuit 7. For the address which is considered, and defined by the value carried by bus 158, Book Keep Memory 7 provides the number of remaining reservations, that is to say the number of times the cell stored in the considered location still should be retrieved. This number is then reduced by one and a test is performed on the result. If the result is not equal to zero, it is loaded again into the storage of Book Keep Memory circuit 7 at the same address. However, if the result of the decrementation appears to be equal to zero, indicating that the retrieve operation corresponds to the last duplication that was requested by the header, this result is also reloaded into the internal storage of Book Keep Memory circuit 7, at the same address. Additionally, Book Keep Memory circuit 7 generates a Write-Enable control signal on lead 160 in order to load the address existing on bus 158 into the internal storage of FAQ circuit 5. The address is therefore registered as an available location for further cell storage operations.

The same process is simultaneously performed for the value of the address that is stored into ORA register 25(n) which is presented via bus 159 to the input bus of both FAQ circuit 5 and to the Book Keep Memory circuit 7. Similarly as described above, if the result of the decrementation by one which is performed on the value being loaded into circuit 7 at the address carried by bus 159 appears to be equal to zero, then circuit 7 generates a Write-Enable control signal on lead 161 to FAQ circuit 5 so as to load the considered address into the internal storage of the FAQ circuit 5. When this is completed, the considered address is made available again for further cell storage operations, as described in section 1 above relating to the input process.

It should be noticed that the invention takes great advantage of the use of dual-port storage for embodying the internal storage of the two circuits 5 and 7. Indeed, this particularly allows reducing by a factor of two the number of cycles which are necessary for processing the different addresses within Cell Storage 1. In the invention, only 8 elementary cycles are required for providing a 16 input and 16 output port switching module.

Figure 4:
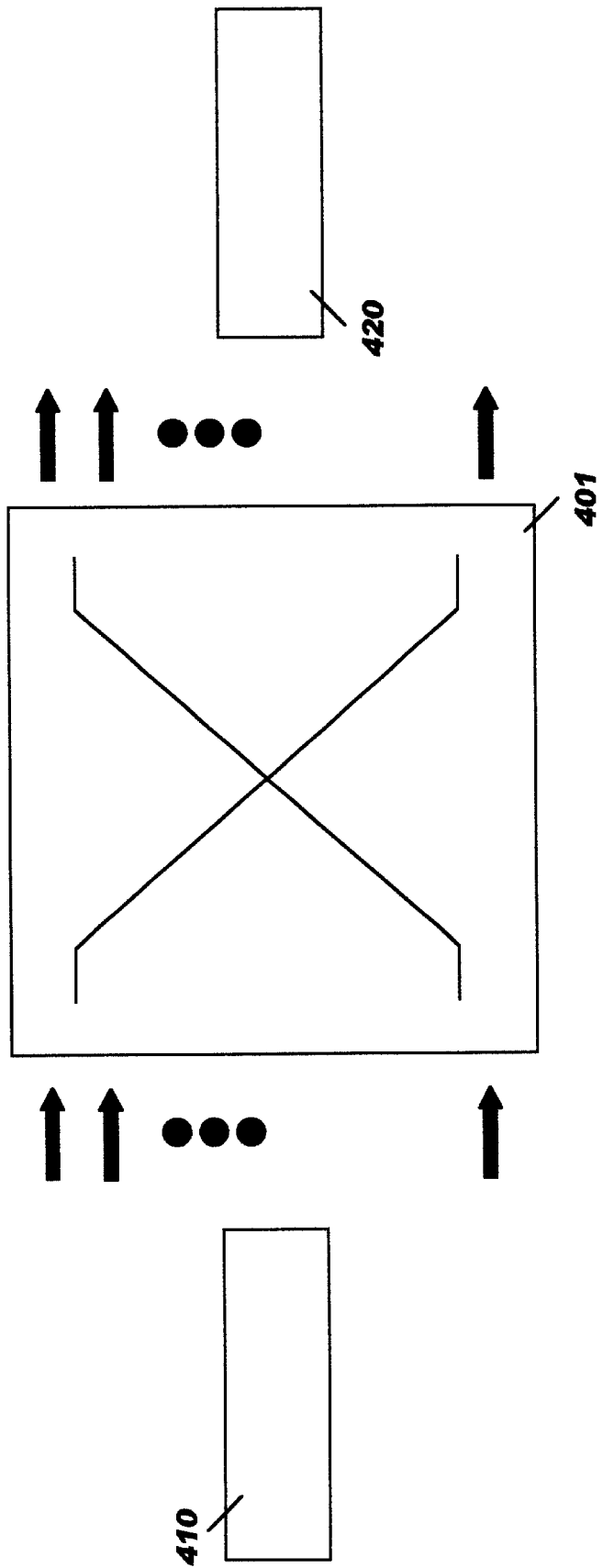
FIG. 4 illustrates the use of a single switching module for carrying out a switching apparatus.

FIG. 4 illustrates the use of a single switching module 401 of the present invention in order to provide a switching apparatus. As shown in the figure, a particular cell 410 is received by the switching module 401 and routed in accordance with the routing process that was described above. The cell 420 is made available at the appropriate output port of module 401. In this figure, the switching apparatus, that will be hereinafter called the switch fabric, is based on one single module 401 and operates at a speed which is basically fixed by a given technology.

Figure 5:
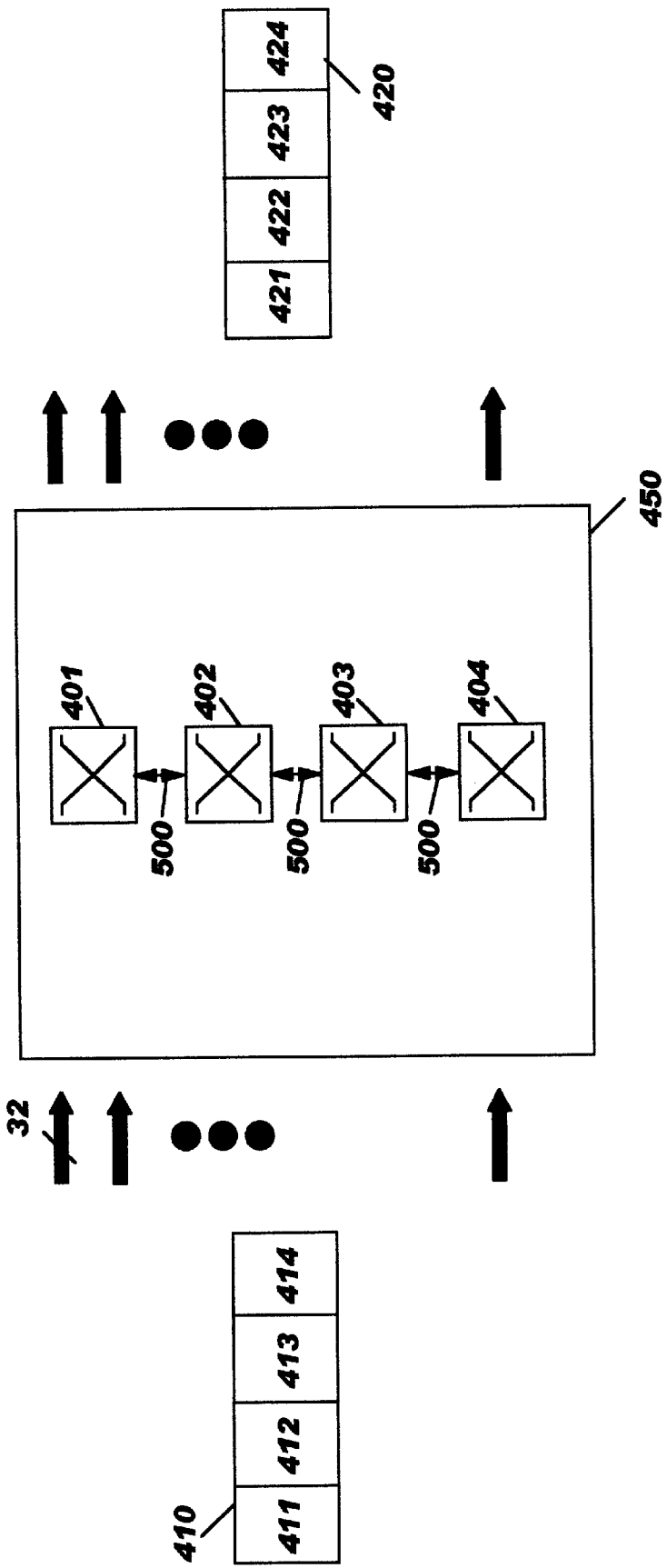
FIG. 5 illustrates the use of multiple switching modules arranged in port speed expansion for providing an enhanced switching structure operating at higher speed.

However, there will be requirements for higher speeds in a single stage architecture. The switching module of the present invention permits higher speeds to be attained even with the same technology. This is advantageously permitted by a particular arrangement of identical switching modules 401 which will now be described in more detail and which allows a very simple and effective possibility of aggregating multiple different switching modules in a expansion mode. FIG. 5 illustrates an arrangement where four different switching modules 401–404 are aggregated in order to constitute a more powerful switching structure 450 operating at a higher speed. In this arrangement of four switching modules 401–404, each cell 410 that is presented to an input port p of aggregate switching structure 450 is logically divided, or sliced into four distinct parts 411, 412, 413 and 414. The first part 411 of the cell is presented to the input port p of module 401, while the second part 412 is entered into port p of module 402.

Similarly, the third and fourth parts 413 and 414 of the cell are presented to the input port p of switching modules 403 and 404 respectively. As described below, the internal design of the switching modules 401–404 permits such arrangement to be made advantageously, so that the four distinct parts of the cell 410 are simultaneously processed. On the other side, the cell will be retrieved and routed towards the appropriate output port of each switching module 401–404. More particularly, the first part 421 of cell 420 will be routed at the appropriate output port q of switching module 401, while the second part 422 of cell 420 will be forwarded to the appropriate output port q of switching module 402. Similarly, the third and fourth parts 423 and 424 of the 21 cell will be respectively presented at the appropriate port q of the switching modules 403 and 404. It obviously appears that the simultaneous processing of the four distinct parts of cell 410 results in a decrease by a factor of four in the size of the cell that is actually processed by each individual switching module. Therefore, the four switching modules are fully combined so as to multiply by four the effective speed of the switching structure. This arrangement provides a substantial advantage since it becomes possible, for a given technology, to virtually increase the speed of the switching process. As will be explained hereinafter in more detail, the substantial increase in speed is made possible by simply aggregating multiple switching modules of FIGS. 2 and 3. As the cell cycle will be reduced by a factor of four for any switching module 401–404, it appears that the sole limit for aggregating multiple switching modules in order to carry out a more powerful switching structure 450 resides in the need to execute, with the capabilities provided by the given technology, the eight elementary clock cycles that are required for both the input and output processes described above. In the present invention, the enhanced switching structure 450 is based on four switching modules 401–404 and the description will be fully made for this particular arrangement. However, it should be noted that the man of ordinary skill in the art will adapt the description below for any other combination of switching modules in a straightforward manner. In the arrangement of the preferred embodiment, it appears that switching module 401 is presented with the first part of cell 410, that is to say part 401 that includes the routing header used for controlling the routing process as was described above. Therefore, switching module 401 will be used as a master module within the aggregate structure 450, that is to say that the control section of module 401 will operate for the whole set of four switching modules 401–404. The three other switching modules 402–404 will operate as slaves for the routing process, so that the four distinct parts constituting the output cell 420 will simultaneously appear at the same output port(s) q. Since the storage process inside Cell Storage 1 of the master switching module 401 operates randomly, depending upon the storage locations that are available at a given instant, it is quite necessary to make sure that the same storage process be performed inside the slave switching modules 402–404 in order to ensure the integrity of the cell that is routed through the four switching modules. In the invention, this is advantageously ensured by use of a specific speed expansion control bus 500 that is under control of master switching module 401. In the preferred embodiment of the invention, speed expansion bus 500 is a 32 bit bus which is made of four distinct parts. Speed expansion bus 500 includes a first set of eight leads 510-0 to 510-7 that are respectively connected to the input of receivers 44-0 to 44-7, and to the output of drivers 40-0 to 40-7 described above with respect FIG. 2. Additionally, speed expansion bus 500 comprises a second set of eight leads 509-0 to 509-7 that are connected to the output lead of the eight drivers 41-0 to 41-7 respectively, and are also connected to the input lead of the eight receivers 45-0 to 45-7, respectively as described above. Further, speed expansion bus 500 comprises a third set of eight leads that are connected to bus 520 (that is, to the input lead of the eight receivers 46 and to the output lead of drivers 42), and a fourth set of eight leads that are connected to bus 521 (i.e. to the input lead of the eight receivers 47 and to the output lead of the eight drivers 43. Therefore, it appears that speed expansion bus 500 realizes the full connection between the four switching modules forming the switching structure. The speed expansion mode then operates as follows: in the master module 401, the different OCD drivers 40, 41, 42 and 43 are enabled. Thus, they provide the routing data that will be conveyed through bus 500 to the other slave switching modules 402–404. Also, multiplexor 112 (resp. multiplexor 113) is controlled (by internal processor not shown) so that the contents of register 110 (resp. register 111) are transmitted to pipeline register 114 (resp. pipeline register 115). Multiplexor 26 (resp. multiplexor 27) is configured so that the contents of register 34 (resp. 35) is transmitted to NRA registers 28 (resp. NRA registers 29) since, in this case, no pipeline register is being used. In the slave switching modules 402–404, the different OCD drivers 40, 41, 42 and 43 are disabled. Multiplexor 112 (resp. multiplexor 113) is controlled so as to connect the output of boundary latch 180 (resp. boundary latch 181) to the pipeline register 114 (resp. pipeline register 115) via the Even bus (resp. the Odd bus). On the other side, multiplexor 26 (resp. multiplexor 27) is configured so as to connect the output of boundary latch 80 (resp. boundary latch 81) to the set of NRA registers 28 (resp. NRA registers 29). Therefore, at each cell cycle the ASA registers 20 and 21, ARA registers 32 and 33 of every switching module 401–404 will contain the same data, thus ensuring the same routing process in the four components of the aggregate switching structure. This achieves a strictly identical routing process being performed inside the four distinct switching modules and permits the four distinct parts of the cell 410 simultaneously to appear at the corresponding outport port of the modules 401–404. The full synchronism is particularly achieved by the use of boundary and shadow latches 110, 111, 80 and 81. It therefore appears that the switching module of the present invention can be easily aggregated with other modules in order to achieve a powerful switching structure operating at high speeds. Although the above description was based on the use of four individual switching modules 401–404, it should be noted that other arrangements can be achieved. Indeed, the possibility of aggregating similar modules is obviously not limited to four. When using two modules operating in speed expansion mode, the switch speed can be increased by a factor of two. The performance of the switching structure, either based on two, four or more switching modules 401, is still enhanced in the present invention by means of the use of specific circuits which are designed to satisfy the numerous requirements existing in the market. Indeed, the invention takes advantage of a set of adapters that provide, in addition to the cell slicing that is required for dividing the cell into four parts (in the preferred embodiment of the invention), the different interfaces that are needed by the wide variety of customers. Thus, the invention achieves a highly flexible switching system that can meet most switching requirements.

Figure 6:
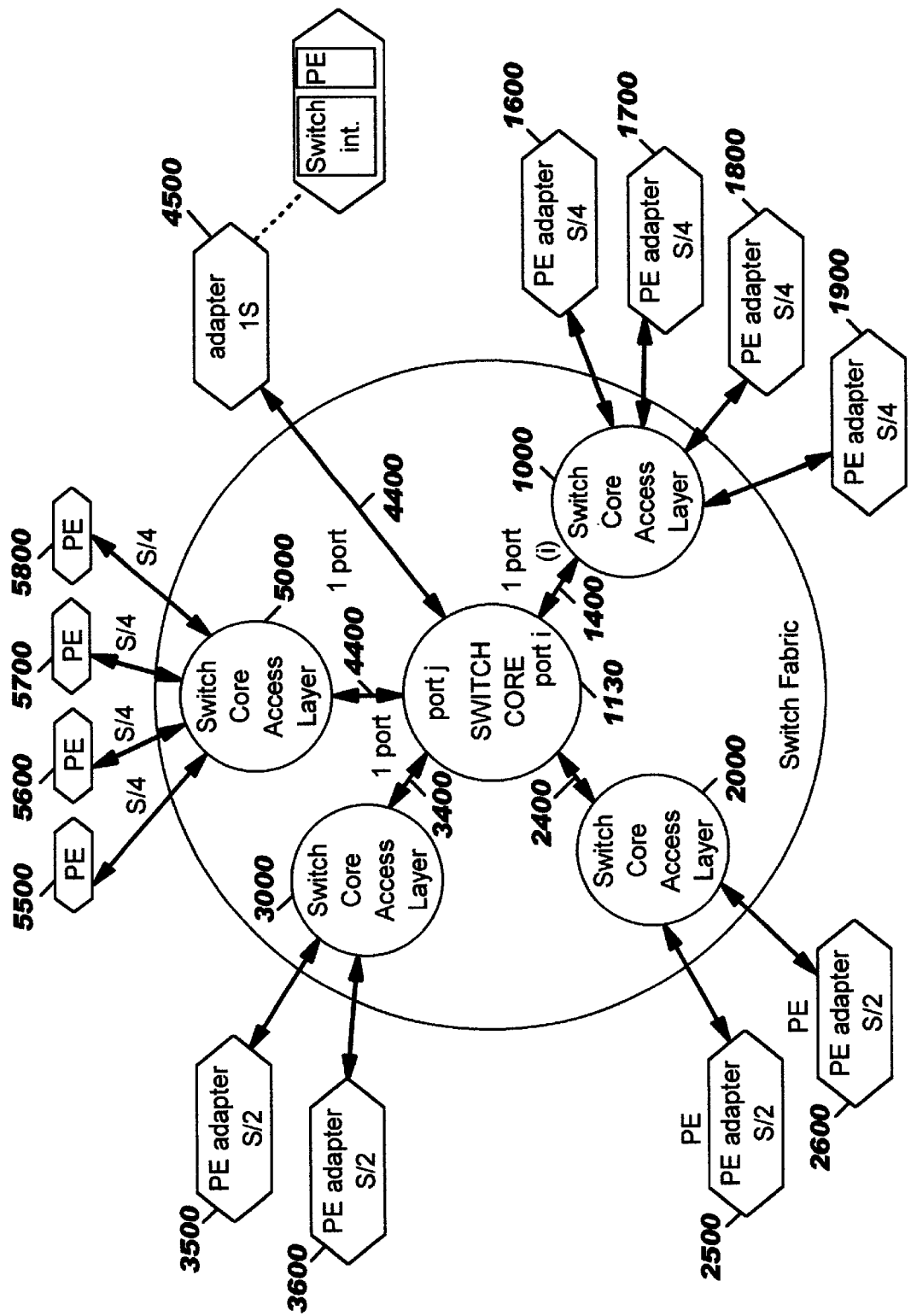
FIG. 6 illustrates a general switch fabric including a switch core based on the switching structure of FIG. 5 associated with Switch Core Access Layer elements.

FIG. 6 shows an example of an switching architecture, based on high speed switching structure 450, that achieves a wide variety of line attachments. Switch core 1130 may be located in one building and provide a set of N different input and output telecommunications ports (sixteen ports in the embodiment of the invention). One port providing a 1.6 Gigabit/s telecommunications link may be used for providing a high speed communication link with an adapter 4500. Switch core 1130 has a 1.6 Gigabit/s port i that provides a telecommunications link 1400 to a Switch Core Access Layer (SCAL) element 1000. SCAL element 1000 provides attachment to four Protocol Engine adapters 1600, 1700, 1800 and 1900 that each provide a s/4 communication link. A third port of switch core 1130 is dedicated to a link 2400 to another SCAL element 2000, which provides attachment to two s/2 Protocol Engine adapters. A similar attachment may be provided by means of an additional SCAL element 3000 attached to two PE adapters 3500 and 3600 sharing the 1.6 Gigabit/s communication link 3400 provided by switch core 1130. At last, in the example illustrated in the figure, a SCAL element 5000 allows attachment to four s/4 Protocol Engines 5500–5800 which gain access to the 1.6 Gigabit/s data flow of port j of switch fabric 450 via link 4400. In the preferred embodiment of the invention, SCAL elements 1000–2000 and 3000 take the form of electronic packages to which are attached the different Protocol Engines which take the form of electronic cards.

Figure 7:
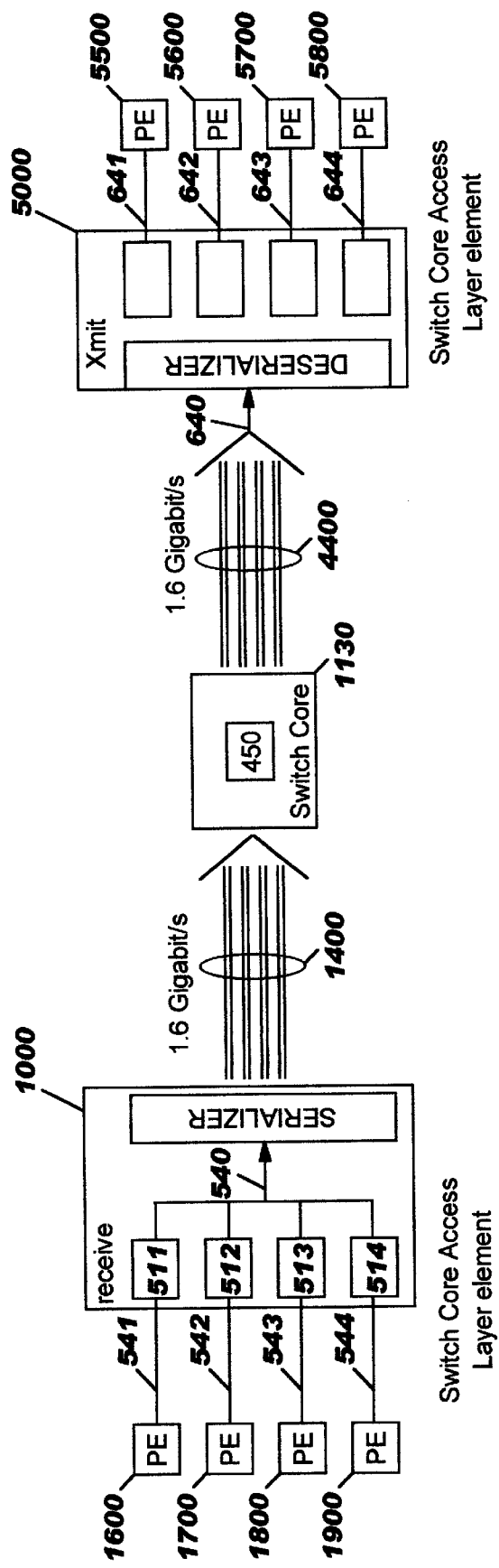
FIG. 7 illustrates the logical flow of the distributed switch core fabric embodiment.

As will be shown hereinafter in more detail, the invention provides two distinct embodiments of the general architecture, an example of which is illustrated in FIG. 6. Indeed, depending on the requirements of the customer, the switch fabric may take two distinct forms: a first compact switch fabric architecture and a second distributed switch fabric architecture. The first embodiment of the invention referred to as the compact switch fabric architecture is used when high flexibility and a powerful switch is needed in a close, compact area. In this case, the switch core 1130 and the different SCAL elements 1000, 2000, 3000 and 5000 are located in the same restricted physical area by means of direct 1.6 Gigabit/s communications links, based on the use of coaxial cables. However, in the more general case, the line attachments are located in different physical areas of a set of industrial buildings. In this case, the invention permits the SCAL elements to be located far enough from the switch core 1130, up to 100 meters, by means of 1.6 Gigabit/s communication links 1400, 2400, 3400 which are each based on a set of optical fiber communication links, at least four 500 Mbits/s optical links for the data. This results in simple connections being performed for the attachments of the different elements forming the td switching architecture, (i.e., "switch fabric"). The structure of the receive and transmit part of each SCAL element 1000–5000 is illustrated in FIG. 7 which shows the logical data flow between the receive part of SCAL element 1000 (communicating through port i of switch core 1130) and the transmit part of the SCAL element 5000 that is attached to port j of switch core 1130. This figure particularly illustrates the above mentioned distributed embodiment of the switch fabric where each Switch Core Access Layer element 1000–5000 is located apart from the switch core 1130 at a distance up to 100 meters. The receive and transmit part of one SCAL element will now be particularly described and it will be assumed that this SCAL element provides the attachment to four Protocol Engines. However, it should be noted that the SCAL structure of the invention is not limited to this particular arrangement of four Protocol Engines. Protocol Engines 1600–1900 may provide attachment to two OC3/STM1 links each according to CCITT Recommendations, or to eight DS3 communication links. In the present invention, each Protocol Engine connected to a SCAL element is associated with one so-called PINT element. With respect to the receive part of the SCAL element 1000, PE 1600 (resp. PE 1700, PE 1800, PE 1900) is associated with a PINT element 511 (resp. 512, 513, 514) via bus 541 (resp. 542, 543 and 544), while with respect to the transmit side of SCAL element 5000 (attached on port j), PE 5500 (resp. 5600, 5700, 5800) receives data cells from a PINT 611 (resp. 612, 613, 614) via bus 641 (resp. 642, 643, 644). Should the number of Protocol Engines attached to a SCAL element (for instance SCAL 2000) be limited to two, then the latter will only include a set of two PINT circuits. Additionally, the SCAL elements are fitted with serializer/deserializer circuits allowing the conversion of the data flow so as to reduce the number of coaxial cables (in the compact switch core) or optical fibers (in the distributed switch core).

Thus, FIG. 7 illustrates the logical flow of data between two determined ports, for instance port i on the receive side and port j on the transmit side. Therefore, each element appearing to the left of the switching structure 450 should bear an indicia i indicating that it corresponds to the port number i. Similarly, every element appearing to the right of block 450 should bear an indicia j for expressing the destination output port j. However, for clarity's sake the indicia will be suppressed in FIG. 7 for simplifying the following description. The use of the indicia will be introduced in FIG. 9 when considering the multicast description of the enhanced switching system.

It should be noted that the general term of "Protocol Engine" designates the line adaptation layer of the different lines that exists on the market. Basically, this term stands for hardware and software functional components that are well known to one of ordinary skill in the art and that provide the line interface adaptation to the different lines used by the customers. Such lines may include lines carrying ATM protocols, T3, DS3, AT1, E1, and interfaces such as FCS, ESCON etc. Such a system can be the "Trunk Port Adapter" that is marketed by IBM for the Nways 2220 module 500.

A particular improved ATM protocol engine will be described in detail with reference to FIGS. 14 to 17. However, whatever the particular type of line being interfaced, it should be kept in mind that the Protocol Engine is used for interfacing the line used by the customers and for providing SCAL element 1000 with cells that are intended for the switch core 450, the cells comprising a routing header and a payload. The routing header of the cells is used in accordance with the above described routing mechanism.

Figure 8:
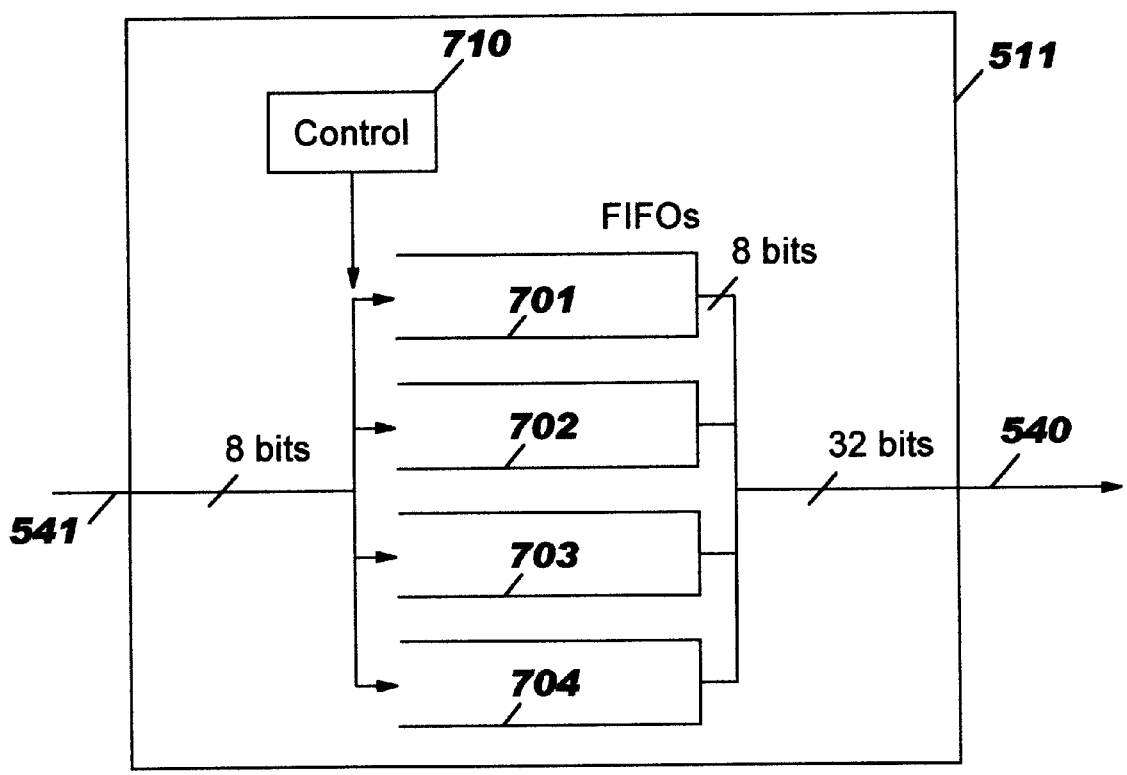
FIG. 8 shows the PINT receive part 511 of the SCAL of the present invention.

FIG. 8 shows the structure of any one of the receive parts of PINT circuits 511–514 of the Switch Core Access layer element 1000. The data flow coming in on 8-bit input bus 541 is distributed through four FIFO storage registers 701–704 so that the first byte is entered into FIFO 701, the second one into FIFO 702, the third one into FIFO 703, the fourth one into FIFO 704, the fifth one into FIFO 701 again, etc. Therefore, the 8-bit data flow is transformed into a four-byte output bus 540 that is needed by the four switching modules of structure 450. In the compact switch fabric embodiment, each byte is transmitted by means of the serializer/deserializer and a common coaxial cable, while in the distributed switch core each byte uses the path formed by the serializer/deserializer and a longer optical fiber. Therefore, bus 540 provides four flows of bytes that are directed to the four sets of receivers of each individual switching module.

For both the compact and distributed embodiments of the switch fabric, it should be noted that the first byte of bus 540 (the 8 MSB) is intended to be transmitted to the 8-bit input bus of receiver 10 at the appropriate input port of the first module 401. Similarly, the second byte of bus 540 (bit numbers 9 to 15) is transmitted to the input of receiver 10 at the appropriate input port of the second switch module 402, etc. Should the cell be received at the input port 541 of element 511 in N cycles, the same cell is presented at the input of the four switching modules 401–404 in approximately N/4 cycles. In the preferred embodiment of the invention, the cell which arrives at input bus 541 has 58 bytes. This set of 58 bytes is completed by two additional bytes that are incorporated at appropriate locations within the cell in order to form a 60-byte cell which, when distributed through the four FIFOs, provides a succession of 15 sets of 4-byte words that can be processed by the switching modules 401–404. The two extra bytes which are added to the 58 original bytes are used in conjunction with the above described "bit-map mode" or "two-byte header multicast mode". To achieve this, and assuming that the switching module that operates as a master is module 401, a control circuit 710 provides the incorporation of the two bit-map bytes at the first and second location within FIFO 701 (that is to say at the first and fifth position of the cell being received on bus 541). Therefore, switching module 401 receives the two bit-map bytes forming the routing header at the first location of the data flow coming in at its input port. It should be noted that the speeds on the two busses 541 and 540 are largely independent since the former may be lower than the latter. Assuming that the switch operates at a speed of 20 nanoseconds (corresponding to an aggregate data flow of 1.6 gigabits/s), the higher speed that is permitted on bus 541 appears to be 60/58×20 nanoseconds. In addition to the PINT circuits, the SCAL element 1000 further includes control logic 710 that provides control of the four "Enable-Output" input leads (not shown) of PINT circuits 511–514 so that aggregate switching structure 450 can successively process the cell received by PINT circuit 511 (requiring fifteen cycles in the preferred embodiment), then the cell received by PINT element 512, then that received by PINT element 513 and so on. In this way, each PINT circuit 511–514 gets access to a fourth of the bandwidth of the bus 540.

Figure 9:
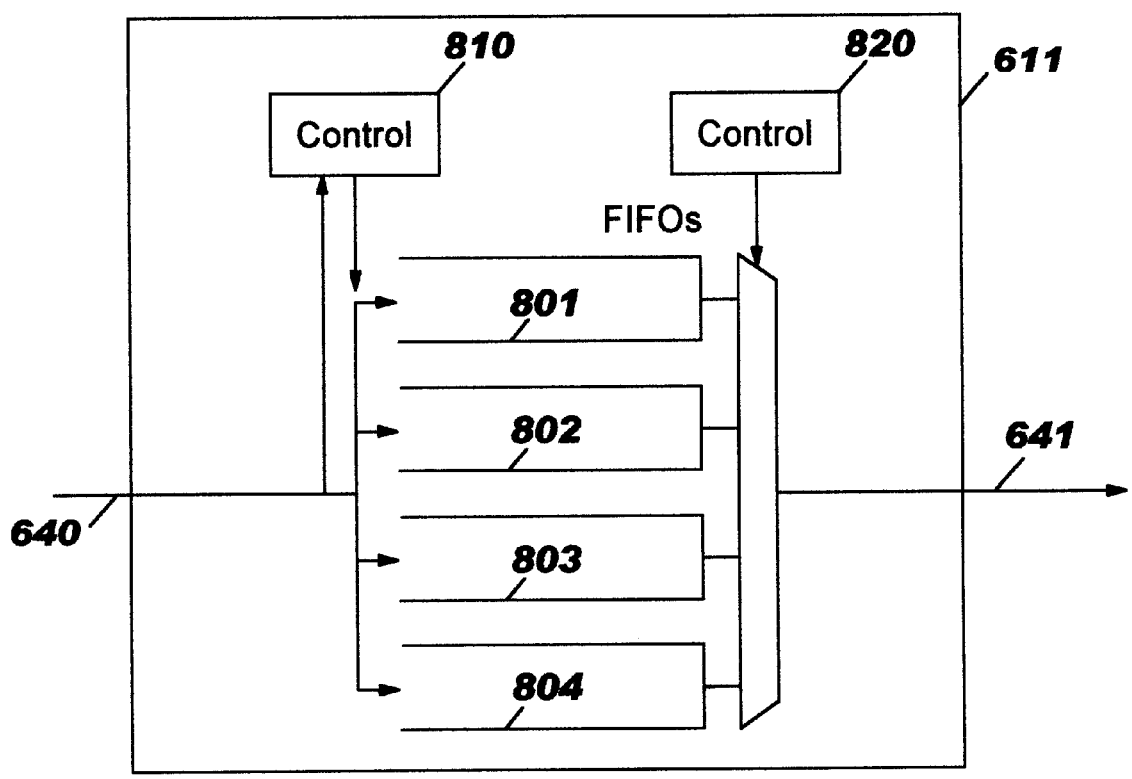
FIG. 9 shows the PINT transmit part 611 of the SCAL of the present invention.

FIG. 9 illustrates the structure of the four transmit parts of PINT circuits 611–614. Each PINT element 611–614 receives the totality of the 32-bit bus 640. The bus 640 receives the four parallel flows of serialized bytes that are received from the four coaxial cables separating the switch core from the SCAL (in the compact embodiment) or from the four optical links (in the distributed switch fabric where the different SCALs are located at different physical areas with respect to the switch core 1130). Each PINT element 611 is fitted with a set of four FIFO registers 801–804 that present a storage capacity that is far higher than that of the FIFO used for the received part. In the preferred embodiment of the invention, the ratio between the FIFO storage 801–804 and the FIFO storage 701–704 is fixed to at least 250 in order to ensure high buffering when many cells are to be destined to the same output port. Considering for instance transmit block 611, a control module 810 receives the data coming from bus 640 and extracts the "bit map" two bytes from the cell being received. From the value that is currently carried by these two bytes, control module 810 determines whether the cell has to be loaded into a set of four FIFO registers 801–804, or discarded. In the first case, Control Module 810 generates a load control signal which allows each of the four bytes carried by the 32-bit bus 640 to be loaded into its corresponding FIFO register 801–804. For instance, the first byte appearing on bits 0–7 of bus 640 will be loaded into FIFO 801, while the second byte (bit 8–15) will be transferred into FIFO 802 and so on. In the second case, if the cell appears to be discarded by the considered transmit block, then Control Module 810 does not generate the load control signal, thus preventing the loading of the cell into the FIFO registers.

Any one of the four elements 611 to 614 receives the same cells which appear on the common bus 640. However, since the two-byte "bit-map" header is used by each of the elements 611 to 614 in order to control or not the loading of the considered cell into the internal FIFO queues, it appears that this header also realizes a multicast operation that still permits the duplication of the cell arriving on bus 540 to multiple output directions. In the preferred embodiment of the invention, the first bit of the header is used by Control Module 810 in order to determine whether the cell has to be duplicated to the output bus 641, while the second bit of the two-byte header is used by Control Module of element 612, and so on. In each block 611–614, the four FIFOs are accessed by a Control Module 820 which is used for regenerating the sequence of the different bytes forming the cell on a 8-bit bus 641. Additionally, Control Module 820 provides the removal of the "bit map" two-byte header so that the cell becomes identical to the one that was received by the receive part of the SCAL circuit 1000. In the preferred embodiment of the invention, this is simply achieved since the "bit-map" header always occupies a fixed position within the 60 bytes forming the cell. The Protocol Engines 5500–5800 are then provided with the appropriate train of cells generated by the blocks 611–614.

Figure 10:
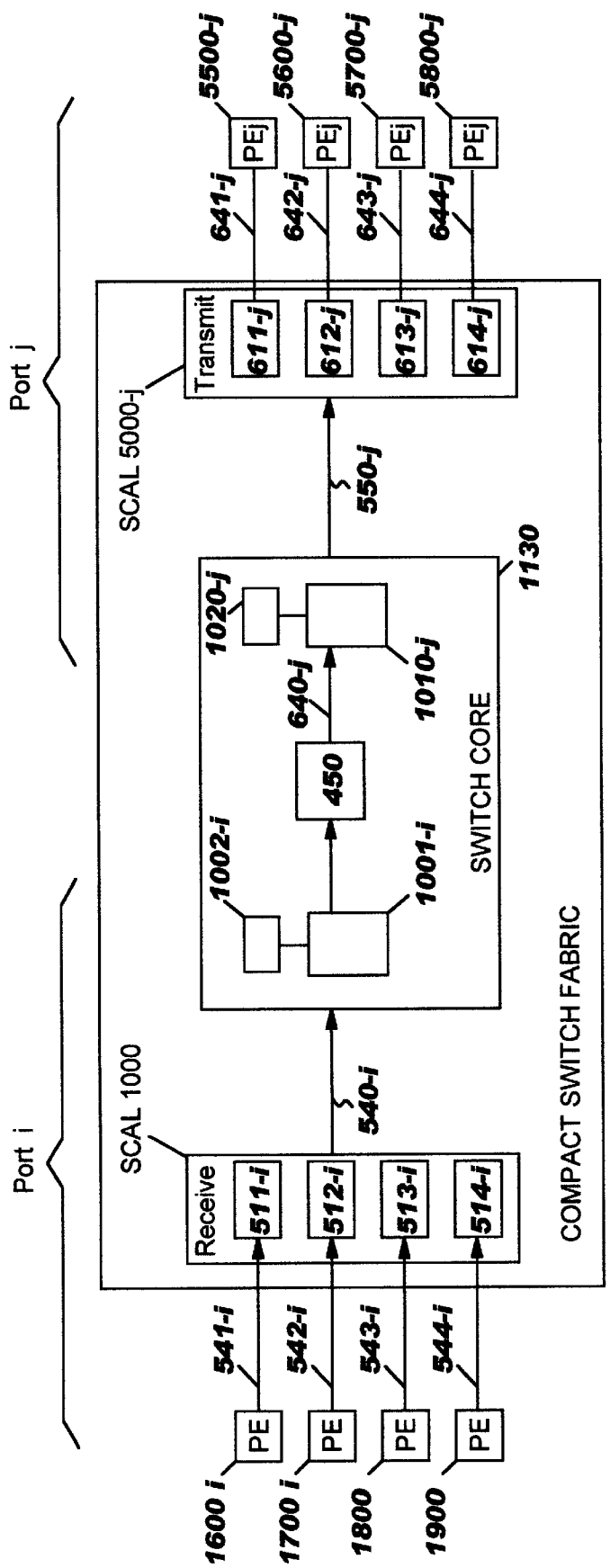
FIG. 10 illustrates a compact switch fabric embodiment enhanced in order to provide wide multicast capability.

It should be noted that the invention provides two independent embodiments that both provide wide flexibility because of the efficient cooperation between the powerful switching structure 450 and the different SCAL elements attached to every port. In one embodiment, it was shown that the SCAL elements are all located close to the switch core 1130, thus providing a compact switching architecture. In the second embodiment, where numerous line adapter attachments are required in a wide industrial area, the invention uses the serializer/deserializer in association with optical fibers so as to achieve links that can attain at least a 100 meters length. FIG. 10 illustrates a substantial optional enhancement that can be brought to the switching fabric of FIG. 7 and that provides wide multicast capabilities for both the compact and distributed switch fabric embodiments. For clarity's sake, the explanation will be made for the compact switch fabric embodiment, where the SCAL elements can directly communicate with the switching structure 450 by means of bus 540 without the use of the additional path formed of the serializer, the optical channels and the deserializer (required for forming again the 32 wide bus at each input port of the switch core 1130). In this figure, indicia i and j are introduced in order to clearly illustrate the logical path of a cell arriving at one input port i, and which is routed to output port j. Additionally, it is assumed that the sixteen SCALs that are attached to the switching structure are based on a similar structure, that is, includes four identical PINT elements (associated with four corresponding Protocol Engines). As shown in the figure, there is shown that bus 540-i connecting the switch structure 450 to the PINT receive circuit 511-i, 512-i, 513-i and 514-i of SCAL element 1000, is separated in two parts by means of the insertion of a Routing Control Device 1001-i. Similarly, bus 640-j that connects the output of aggregate switching structure 450 to the PINT transmit circuits 611-j, 612-j, 613-j and 614-j of SCAL 5000-j, is separated by means of the insertion of another Routing Control Device 1011 0-j. Each control device among the set of 32 control devices inserted in the 32 input and output busses of switching structure 450 is associated with a corresponding Routing Control Table 1002-i and 1020-j which is used for performing the routing process of the cell. For instance, Routing Control Device 1001-i is associated with its corresponding Routing Control Table 1002-i, while Routing Control Device 1010-j is associated with its corresponding Routing Control Table 1020-j.

This enhanced compact switch fabric operates as follows assuming, for instance, that Protocol Engine 1600-i at port i generates a cell comprising a Switch Routing Header (SRH) followed by a payload. This SRH is characteristic of the destination Protocol Engine which will receive this cell. Should the cell be transported to one unique destination PE, then the switching will have to be unicast. In the reverse case, there will be multiple destination Protocol Engines and the switching will be multicast. In accordance with the above description, the cell is entered into the PINT receive circuit 511-i which introduces within the cell a set of two bytes that affect the location of the bit map that will be determined later by the Routing Control Device 1001-i. The cell is then propagated on the bus 540-i as described above, and is presented after communication on optical lines to the Routing Control Device 1001-i. This element executes the following operations. First, it accesses the associated Routing Control Table 1002-i , using the SRH as an address. The value that is extracted from this table is then inserted, on the fly, within the cell at the two additional locations that were inserted before by the PINT receive circuit 511-i. Therefore, the master switching module 401 receives these two bytes at the first location within the cell coming in at its input port and can use them in accordance with the two-byte header multicast mode (bit map mode).

After the cell is processed by the Routing Control Device 1001-i, it is presented at the input bus of aggregate switching module 450, so that the master module 401 can use the bit map appearing at its first two bytes in order to control the overall routing mechanism for the four elements. However, it should be noted that the same mechanism could be used with one single switching module. Then the switching structure 450 duplicates the cell being received at the appropriate output ports. Assuming that the cell being considered is duplicated at the ports j, k and l, it will appear on busses 640-j, 640-k and 640-l. The cell presented on bus 640-j enters into the Routing Control Device 1010-j which, as above, accesses the associated Routing Control Table 1020-j in order to extract data that includes a two-byte bit map that will be used by the transmit part of PINT element 100-j of the SCAL circuit 1000. This extraction uses the SRH data that is incorporated in the cell being received. It should be noted that, as above, the access of Routing Control Table 1020-j can also be used for providing additional bits that can be advantageously used for control purposes. The newly extracted bit-map header is then used by SCAL circuit 5000-j for determining which one(s) of the PINT transmit circuits 611-j; 612-j, 613-j and 614-j will have to propagate the cell. For instance, should the bit map only contain a single "1", then the cell will be propagated to one single element (for instance block 611-j), while if the bit map contains two "1's" the cell will be propagated by two different elements. It therefore appears that a second duplication step is introduced, the former one occurring within the switching structure 450. Each Protocol Engine 5500-j, 5600-j, 5700-j and 5800-j can then be accessed by the cell in accordance with the bit-map that was determined by Routing Control Device 1010-j, which bit-map was uniquely determined in accordance with the SRH that was transported by the cell.

It appears that the SRH that is determined by each Protocol Engine is considered by the switching structure 450 and the PINT circuits of SCAL 1000-j as a part of their payload, while the routing header used for controlling the switching mechanism is locally generated from this SRH. The same mechanism applies for the ports k and 1, thus resulting in the cell being duplicated by one or more elements 611-k, 612-k, 613-k or 614-k, 611-1, 612-1, 613-1 or 614-4 of the PINT elements 100-k and 100-1. A wide range of possibilities for multiplexing through the two distinct multiplexing stages is thus permitted within the switching system.

Figure 11:
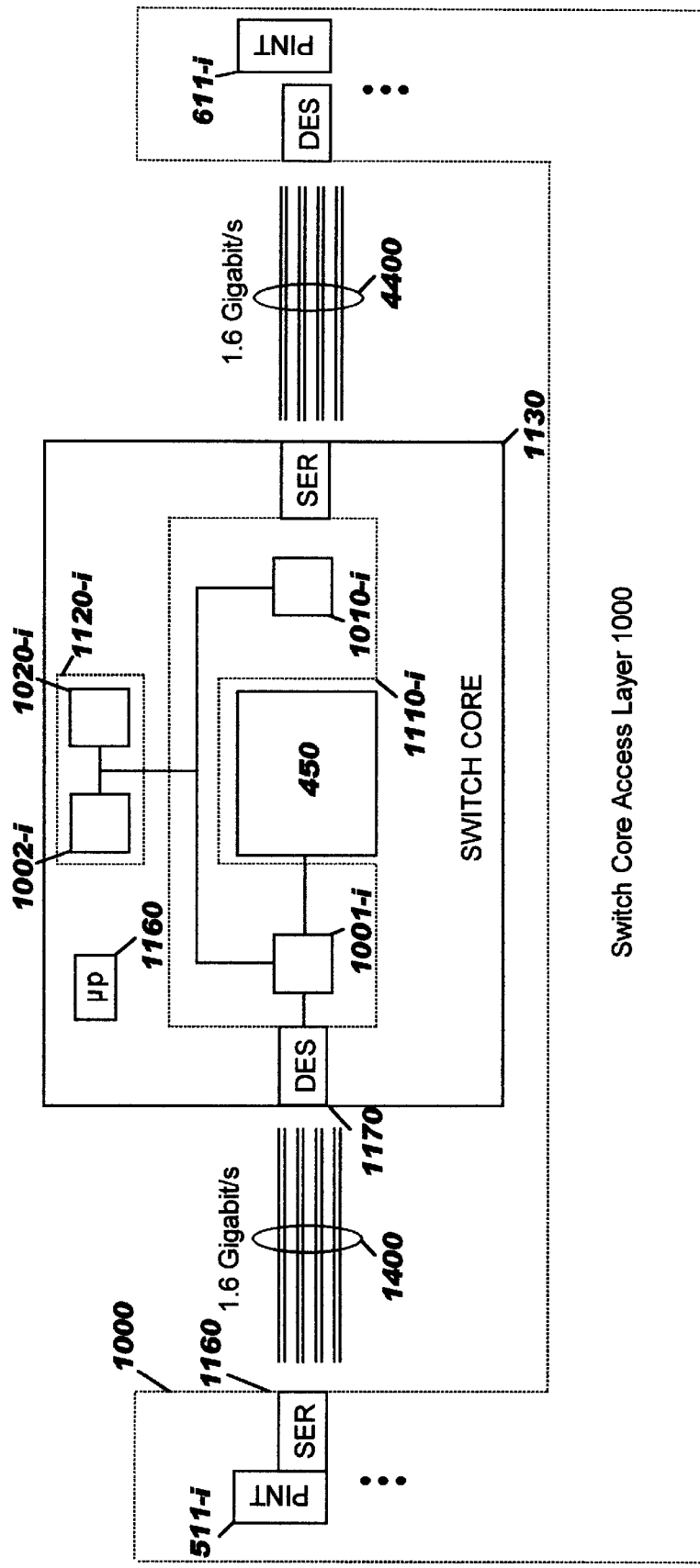
FIG. 11 illustrates the distributed switch fabric enhanced in order to provide wide multicast capability.

In the preferred embodiment of the invention, the Routing Control Devices are located within the switch core 450. This substantially enhances the capabilities of the switch since it becomes very simple to update the different contents of the multiple Routing Control Tables. Additionally, this presents the advantage of using slower, cheaper and larger memory than that used for embodying Multicast Storage Table 6 which must be very rapid since it might occur that the Multicast Table is continuously in operation during one cell cycle. Further, the possibility of providing larger storage (also resulting from the fact that this storage may be located outside the chip of the switching module) for embodying Routing Control Tables permits increasing the number of routing SRH labels. Finally, this feature appears to be very simple to embody in the second distributed switch fabric embodiment where the SCAL elements 1000–5000 are to be located at different physical locations of an industrial area. FIG. 11 shows the arrangement of the distributed switch fabric that provides great flexibility and high speed and which further permits, by using the Routing Control mechanism described above, a wide multicasting capability. Dotted lines represent the physical boundaries of the modules or packages. There is shown the switch core 1130 taking the form of one physical apparatus, which includes the switch structure 450, generally embodied under the form of a card comprising at least the four switching elementary modules, each module being an electronic chip. The two Routing Control Devices 1001-i and 1010-i that are associated with a same port i are embodied in the same physical chip 1100-i that is associated with a corresponding storage 1120-i that contains the two Routing Control Tables 1002-i and 1020-i described above in reference to FIG. 9. It therefore appears that switch structure 450 and the sixteen associated modules 1110 and 1120 are advantageously located in the same physical package, while the different SCAL elements are distributed in the different physical areas of the industrial premises where line attachment needs appear to exist. As mentioned above, the distributed switch fabric comprises a set of N physically distributed SCAL packages (N being equal to 16 in the preferred embodiment of the invention), although only SCAL package 1000 is represented in the figure. Every SCAL package contains the PINT receive and transmit circuits that are each associated with one attached Protocol Engine. The PINT curcuits are embodied in the form of additional cards that are plugged into the SCAL electronic circuitry board. Since the 1.6 Gigabit/s communications link between each SCAL and the switch core 1130 is achieved by means of a set of optical fibers (at least four for the data path), the two elements can be separated by a large distance with an optical fiber. This is very advantageous since it becomes possible to realize a powerful switching connection whatever the position of the different telecommunication links in the industrial premises. Should for instance an ATM link be located in a first building and an OC3 link in a second one, the invention achieves the switching connection by simply using a first SCAL package receiving an ATM PE in the first building, and a second SCAL element in a second building. This example shows the great flexibility of the solution of the present invention that particularly avoids the drawbacks of solutions of the prior art, based on costly telecommunication cables or on multiple switches that are arranged in networks, each switch being located at one premises, thus using their ports for the network connection. Since some ports are used for achieving the network connections of the different switches, it obviously results that these network connection ports are lost from the customer standpoint because they can not be affected to a communication link. The architecture of the present invention eliminates all these drawbacks.

Further, it could be possible to use the teaching of document "Single-chip 4×500 Mbaud CMOS Transceiver" by A. Widmer et al, in IEEE ISSCC96, Session 7, ATM/SOMET/PAPER FA 7.7, published on Feb. 9, 1996 for providing an embodiment of the 1.6 Gigabit/s communications links 1400, 2400, 3400 and 4400. This document, which is incorporated by simple reference, shows the possibility to use the so called 8B/10B transmission code. During idle periods that are marked by a flag, fill packets of data are transmitted, which start with a non-data comma character. The comma marks both byte and cell boundaries on the serial link. Therefore, synchronization at the byte and packet level can be provided and the 1.6 Gigabit/s communications link may be embodied by means of unique set of four cables, either coaxial or optical. The reduction of the number of cables is substantial since, without this feature, at least five or six optical lines would be necessary for embodying the 1.6 Gigabit/s communication link. It should be noted that the Switch Core package 1130 contains a processor 1160 which can access, for control purpose, any storage and register within the package. In addition, there is incorporated additional circuitry that monitors the presence of the particular bit map header being set to X'0000'. This causes the cell to be extracted from the normal data processing using ASA and NSA registers and directly loaded into one particular fixed location within the Cell Storage 1, shown in the figure under the name Control Packet Storage. This achieves a general extraction process allowing the processor to get access to control cells. Conversely, the process is also provided with an insertion process allowing the possibility of propagating a cell loaded into the last position of the memory towards any one of the output ports.

As the particular bit map X'0000' is used for control purpose between the control processor (inside the switch core) and other components of the switch fabric, the latter value is no longer available for discarding the cells. This possibility is reestablished by means of an additional control bit ("valid bit") that is advantageously used for discarding the cells. The valid bit is provided from the read operations of tables 1002 and 1020.

It should be noted that the person of ordinary skill in the art may advantageously loop the steps 1320 and 1330 in order to directly update the table 1002-i , before initiating the update process of table 1020-i. However such implementation details will depend on the particular context. Therefore it appears that the general control processor that is located within the switch core package can access and load values within the sixteen Routing Control Tables that are embodied in the sixteen storage modules 1120.

Figure 12:
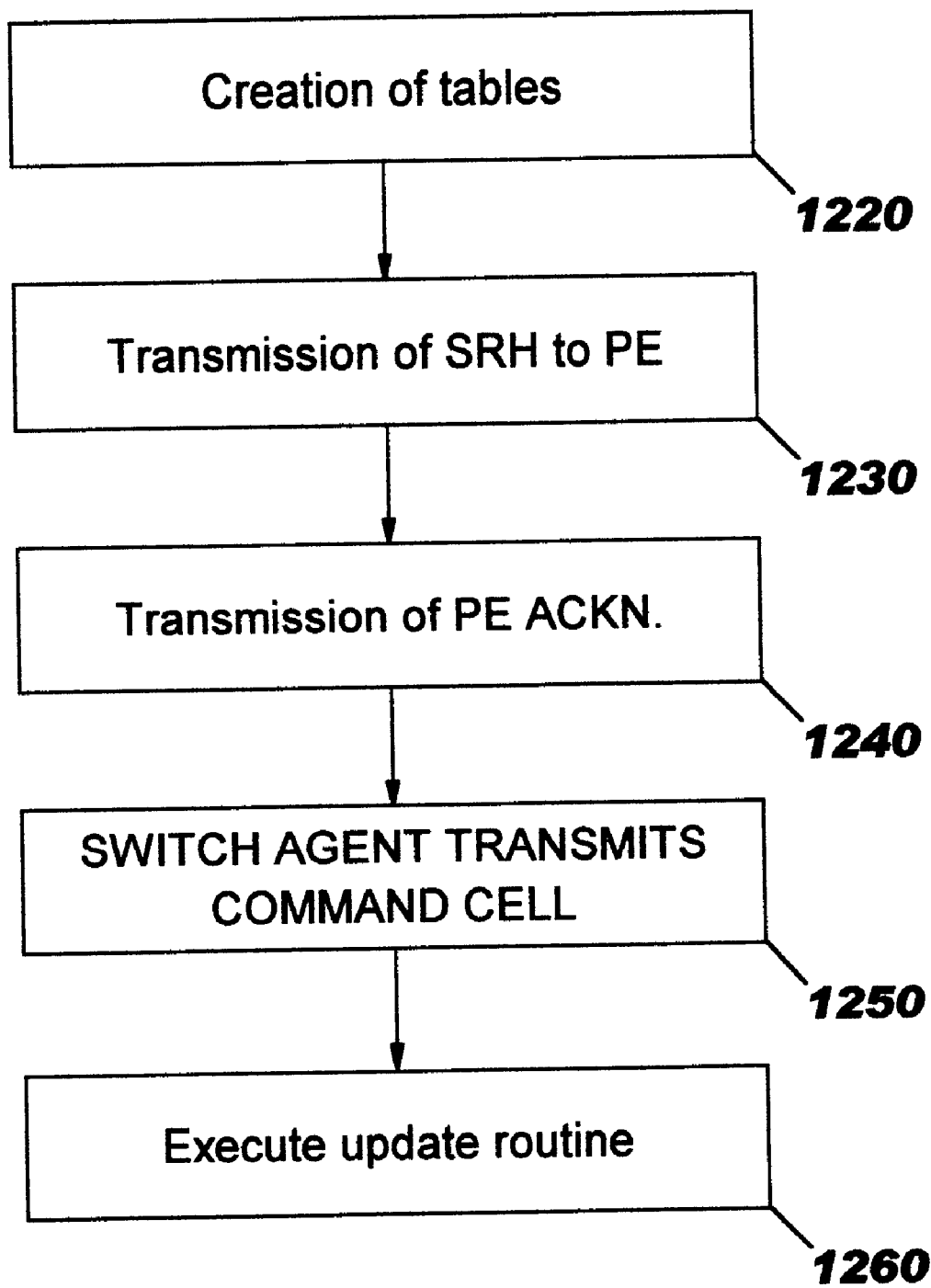
FIGS. 12 and 13 illustrate the update and creation procedure of the Routing Control Tables.

Next, the general procedure that is used for creating and updating the Routing Control Tables 1002-i and 1020-i which are located on the same chip will be described. The procedure is illustrated in FIG. 12. First, the procedure begins with an initialization step 1220 where the control processor 1160 affects a set of SRH routing labels. This is made possible since the processor is aware of its own topology and therefore can assign some SRH values that can distinguish the different Protocol Engines connected to the different ports. This is achieved by using the following allocation procedure: the processor first determines the number of Protocol Engines that are associated with a given output port, and then assigns a number of SRH values so as to distinguish the PEs from each other. For instance, assuming that port number 0 is associated with four different Protocol Engines (connected to SCAL 1000), the processor will reserve four different SRH values to each Protocol Engine. Therefore, according to the topology of the switch architecture, the control processor 1160 assigns the desired number of SRH values that are needed to distinguish the different Protocol Engines.

Then the Routing Control Table creation can be executed. First, it should be noted that each Routing Control Table 1002-i will contain the same data since all the cells that arrive on bus 540-i (and containing the same SRH routing label) will have to be propagated to the same output port. The SRH is characteristic of the destination, and not the connection. Therefore, the processor builds a table which complies with the following format:

| Add ! | data loaded into table 1002-0 | data loaded into table 1020-0 (left adjusted). |
|---|---|---|
| X'0000' | X'8000' port 0 of 450 | X'8000' PE number 0 on PINT of SCAL 1000-0 |
| X'0001' | X'8000' port 0 of 450 | X'4000' representing "0100 0000 0000 0000" PE number 1 on the PINT. |
| X'0002' | X'8000' port 0 of 450 | X'2000" PE number 2 on the PINT |
| X'0003' | X'8000' port 0 of 450 | X'1000" PE number 3 on the PINT |
| X'0004' | X'8000' port 1 of 450 | X'8000" PE number 0 on PINT 1000-1. |

A similar format is used for the tables 1002-1 and 1020-1, then 1002-2 and 1020-2, etc. but the values that are loaded therein are set to zero (with the exception of the valid bit). A more detailed representation of the table, clearly illustrating the use of the valid bit, can be found in the attached Appendix. Additionally, a particular SRH value is reserved for the communication between the processor 1160 and any PE.

The initialization procedure completes when the different Routing Control Tables are loaded. Then, in step 1230, processor 1160 uses the general insert capability for transmitting to every Protocol Engine a cell, characterized by a specific format, in order to inform it of the particular SRH value that was assigned to it. Therefore, each PE is made aware of a particular SRH value distinguishing it from the other ones. Then, in step 1240, each adapter acknowledges this assignment by means of the specific SRH value that is dedicated for the communication between processor 1160 and the PE.

Next in step 1250, a switch agent that operates within one particular Protocol Engine is used for managing the different connections. Such a function is well known to one of ordinary skill and involves, in the particular ATM case, the management of the allocation of the VP/VC parameters. This switch agent is used for handling the correspondence between the different connections and the SRH routing values that were assigned to each Protocol Engine. It should be noted that numerous connections can be associated with one single PE. Generally speaking the switch agent is aware of the precise topology of the network that may include a wide number of different switches as the one illustrated in FIG. 11. In particular, the switch agent can determine, should a switch X located in one area, wish to communicate with a switch Y located in another area, which output ports are involved in this communication. Therefore, since it knows the output port that has to be used, it can determine the unicast SRH (that is the SRH provided during the initialization period in step 1220) that is needed. Therefore, in step 1250, the switch agent initiates the building of a Command cell which will be destined for processor 1160 within the switch. This cell will present a payload that is arranged as follows:

!Command! SRH affected to connection ! label1 label2 label3 . . . !

with a first field (Command) defining a particular command which is requested by the switch agent. The second field, namely the SRH_Connection field is used for defining the SRH that is affected by the connection and is then followed by one or more unicast routing labels that define the destination Protocol Engines for the cells which will include the SRH defined in the second field. Basically, the third field comprises the distribution list of the unicast routing labels (which were already affected during initialization period 1220) of the destination PE.)

Figure 13:
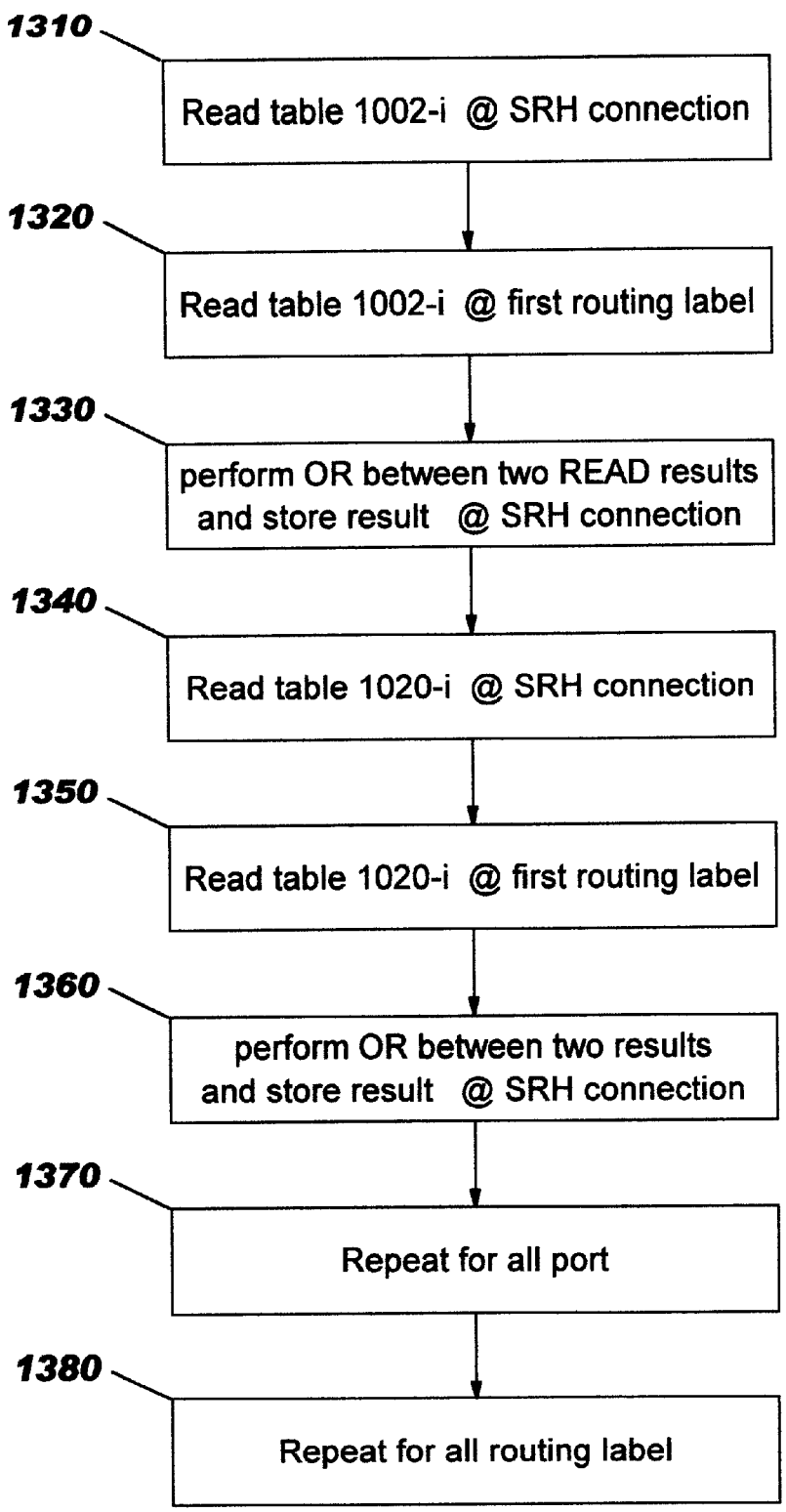

Then, in step 1260, processor 1160 uses this information being received in order to store into memory 1002-i , at the address defined by the second field (SRH_connection), the data that will be used for controlling the different Routing Control Devices. This is advantageously achieved by the update routing algorithm that follows and which uses the unicast SRH allocations that were made during the initialization procedure. The update algorithm is shown in FIG. 13 and operates as follows:

In step 1310, processor 1160 performs a read operation of table 1002-i at the address defined by the value carried by the second field of the switch agent command cell. Then, in step 1320, processor 1160 performs a read operation of table 1002-i at the address which is determined by the first routing label carried by the third field of the switch agent command cell. This read operation returns a value X. Then in step 1330, the processor performs a logical OR of the value X of step 1320 with the value returned by step 1310. This logical OR results in the addition of the ports that miss in the unicast configuration. The result of the OR operation is then loaded into table 1002 at the address SRH_Connection.

In step 1340, processor 1160 performs a read operation of table 1020-i at the address defined by the value carried by the second field of the switch agent command cell. In step 1350, processor 1160 performs a read operation of table 1020-i at the address which is determined by the first routing label carried by the third field of the switch agent command cell. This returns a value Y. Then in step 1360, a logical OR is performed between the value Y returned in step 1350 and that returned in step 1340 and the result of the OR operation is stored in table 1020-i at the address that is defined by the second SRH_Connection field carried by the switch agent command message. Steps 1310 to 1360 are executed for all ports so that all the sixteen tables 1002 and 1020 can be updated (step 1370). In the case where the switch agent command message has a third field that comprises more than one routing label, e.g. label2 and label3, the preceding procedure is performed again for all the remaining labels (step 1380). For instance, for the second label appearing in the third field, the procedure will be the following: processor 1160 performs a read operation of table 1002-i at the address defined by the value carried by the second field of the switch agent command cell (step 1310). Then processor 1160 performs a read operation of table 1002-i at the address which is determined by the second routing label carried by the third field of the switch agent command cell (step 1320). This read operation returns a value X. A logical OR between the two values can then be performed and the result can be loaded into table 1002-i at the address SRH_Connection.

The update of table 1020-i can then be executed, by performing a logical OR of the value extracted at the address defined by the address SRH_Connection and the value extracted at the address defined by the second routing label. The result can then be loaded into table 1020-i at the address SRH_Connection. The processing of the second routing label proceeds with the update of all the other tables 1002 and 1020. This algorithm appears particularly efficient as it allows the switch agent—being generally located in one Protocol Engine of the switching system—to update the different routing tables of the switch core 1130 without being aware of the internal topology of the switch. The logical OR operations permit easy addition of output ports to a unicast configuration which the switch agent does not need to know.

It should be noted that the updating process that was described before can be executed for any new connections that are required by the switch agent. Whenever a new connection is requested, the update of the routing tables 1002 and 1020 can be easily achieved by a simple transfer of a switch agent command cell via the normal data path using a simple connection cable.

The functional operations that are involved in the deletion process of one label in a SRH 16 connection will now be described. The principle is to search the particular value of i for which, in table 1020-i at the address defined by the considered label, the valid bit appears to be set on. At this location, the contents of table 1020-i, i.e, the bitmap, is kept as a value X. In the next step, a read operation is performed in this table (1020-i) at the address defined by the particular value of SRH_Connection to get the bitmap therein loaded (i.e., Y). Then, an AND operation is performed between Y and the inverted value of X. The result Z is stored again at the address that was defined by the SRH_Connection field. If the above result Z is different from zero (thus implying that there still remains a unicast label on this SRH_Connection), the bitmap must be kept to a state ON. Tables 1002-i remain unaffected.

However, when the value of Z appears to be equal to zero (thus implying that the delete operation was performed on the last label forming the SRH_Connection), the valid bit corresponding to the particular SRH_Connection being processed is then set to OFF. Additionally, since the last Protocol Engine has to disappear, all the different tables 1002-i (with i=0 to 15) will be updated in order to suppress the output port (corresponding to the latter Protocol Engine) at the address SRH_Connection. In the case where the resulting bitmap is equal to zero, an additional step is then performed in order to set the valid bit to zero. Similarly as for the creation process, the delete operation appears very simple since it does not require that the switch agent be aware of the precise topology of the switching system.

Figure 14:
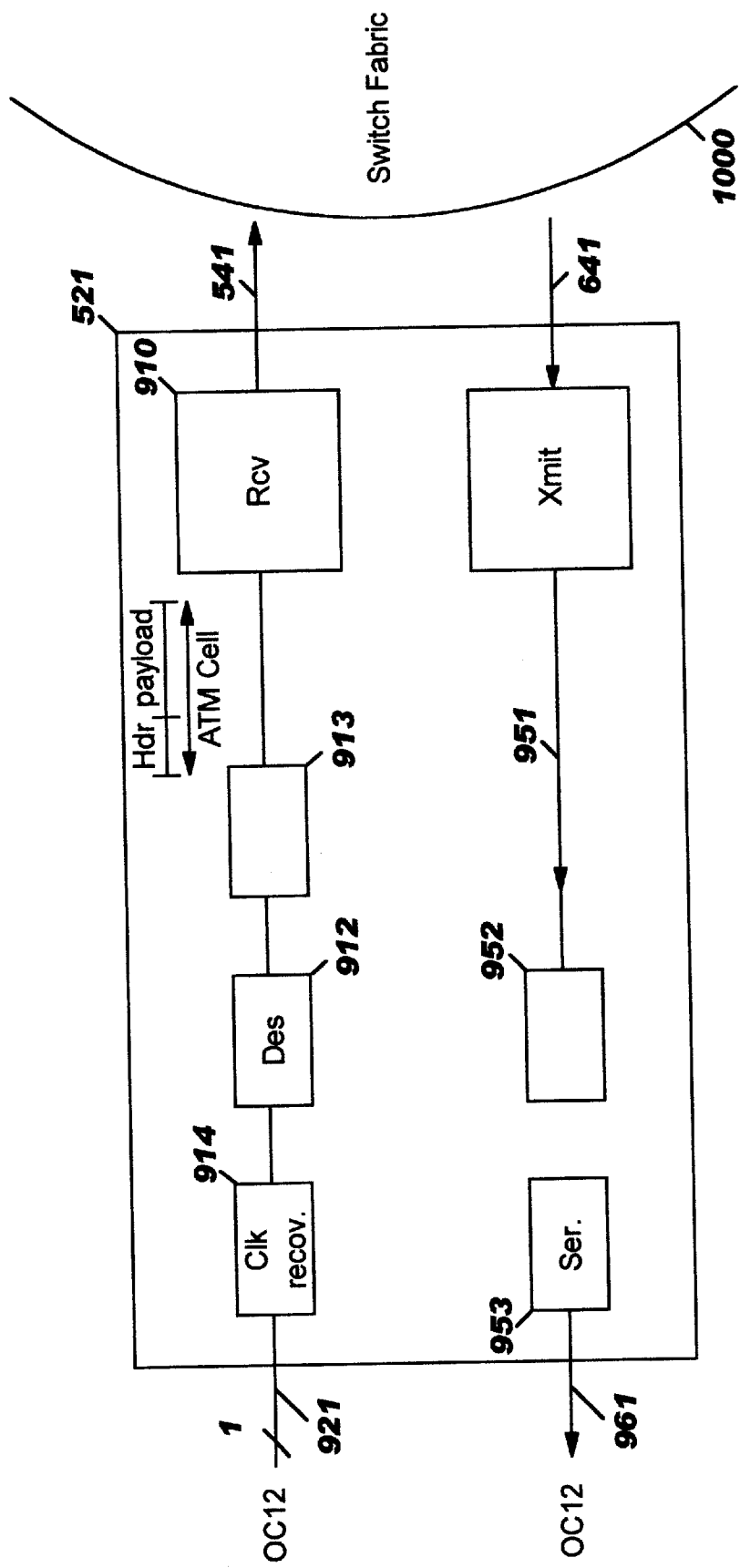
FIG. 14 shows the structure of a Protocol Engine well suited for interfacing lines carrying ATM cells.

With respect to FIG. 14 there is shown a particular embodiment of an enhanced "Protocol Engine" component that is well suited for interfacing lines carrying ATM cells. As shown in the figure, Protocol Engine 521 is based on a receive process block 910 for managing the ATM incoming flow and for preparing it for the attachment to the SCAL 1000. Receive block 910 has an input which is connected to 2-byte bus 911 and an output which is connected to a similar bus, namely bus 541. Conversely, Xmit process 950 receives the routed cells from bus 641 and provides the ATM cells on bus 951. In the example shown in the figure, the PE provides an attachment to one OC12/STM4 line. As known by the person of ordinary skill, such an attachment involves the use of traditional functions such as clock recovery 914, deserializing 912 and ATM cell delineation 913 so as to convert the physical one-bit data flow on lead 921 into a 16 bit ATM cell on bus 911. It should be noticed that such functions involve well known circuitry, traditionally used in line interfaces, and will not be described with more detail. Conversely, the transmit path involves the Xmit block 950 providing ATM cells on a 16-bit bus 951 that will be transmitted to the one-bit physical media on lead 961 via a block 952 and a serializer 953. Block 952 provides for the insertion of the ATM cells into the Synchronous Digital Hierarchy (S.D.H.) bit stream.

Figure 15:
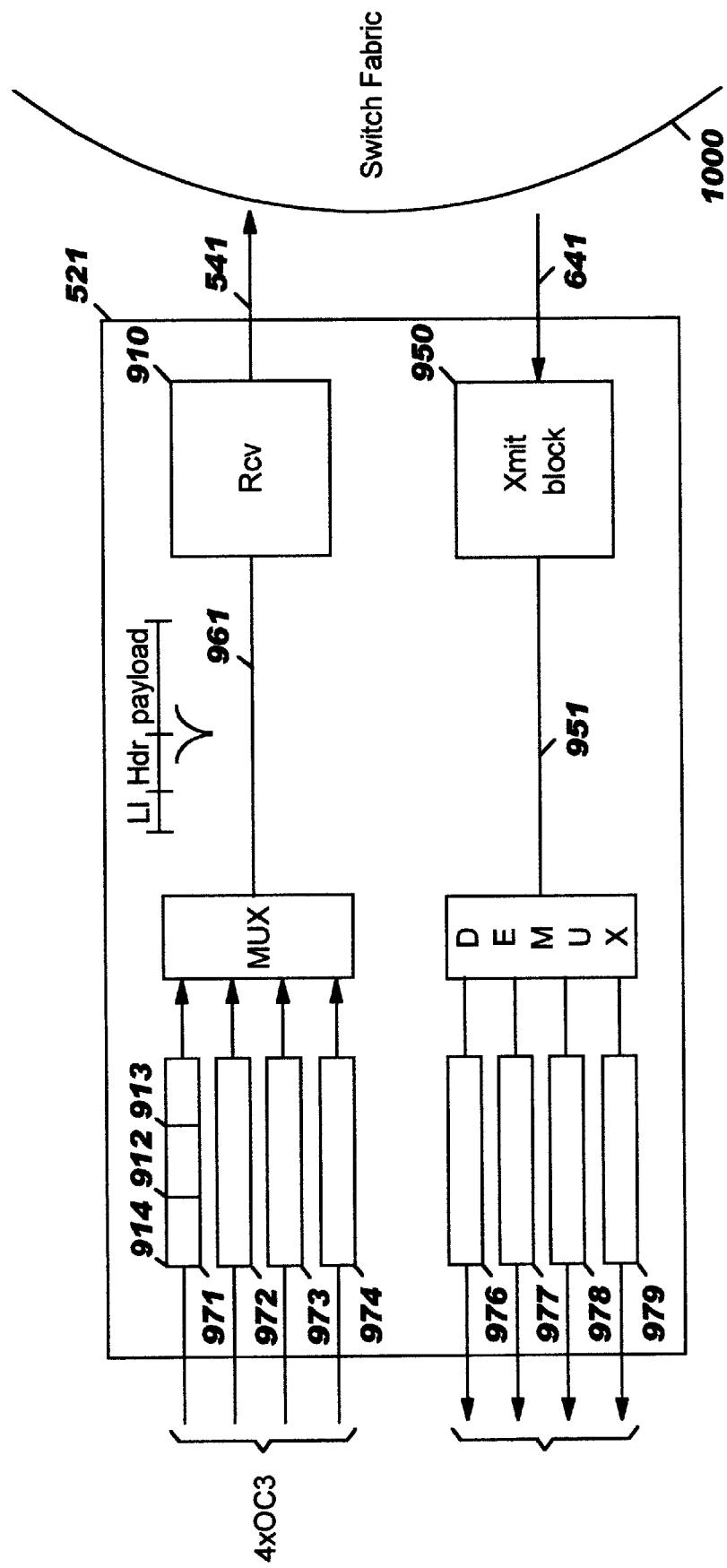
FIG. 15 shows a structure that is adapted for the attachment of four OC3 line interfaces via a set of four receive line interfaces 971–974 and four transmit line interfaces 976–979.

With respect to FIG. 15 there is shown a similar structure that is adapted for the attachment of four OC3 line interfaces via a set of four receive line interfaces 971-974 and four transmit line interfaces 976-979. For instance, receive line interface 971 comprises circuits 914, 912 and 913 of FIG. 14 and transmit line interface 976 may comprise circuits 952 and 953 of FIG. 14. With respect to the receive part, the output of the four blocks 971-974 are multiplexed at the cell level before the cells are generated on bus 911. Similarly, the flow of cells that is produced by Xmit block 950 is demultiplexed at the cell level so as to produce the four trains of cells which are transmitted to the appropriate OC3 line interface. In one embodiment of the invention the format of the cell that is received by receiver 910 may comprise three fields: a first one-byte field that defines the actual line on which the current cell was received, a second field comprising the 5-byte ATM header, and a third field comprising the ATM payload. However, it should be noted that other embodiments may take advantage of the so-called level-2 UTOPIA interface which provides the ATM layer with the capability of controlling several line interfaces. Such techniques are well known to the person of ordinary skill and will not be further described. In this case, the cell received by receiver 910 may only comprise the ATM cell (i.e. the header and the payload) and the information defining the associated line is provided to receiver 910 by a separate mechanism (not shown).

Figure 16:
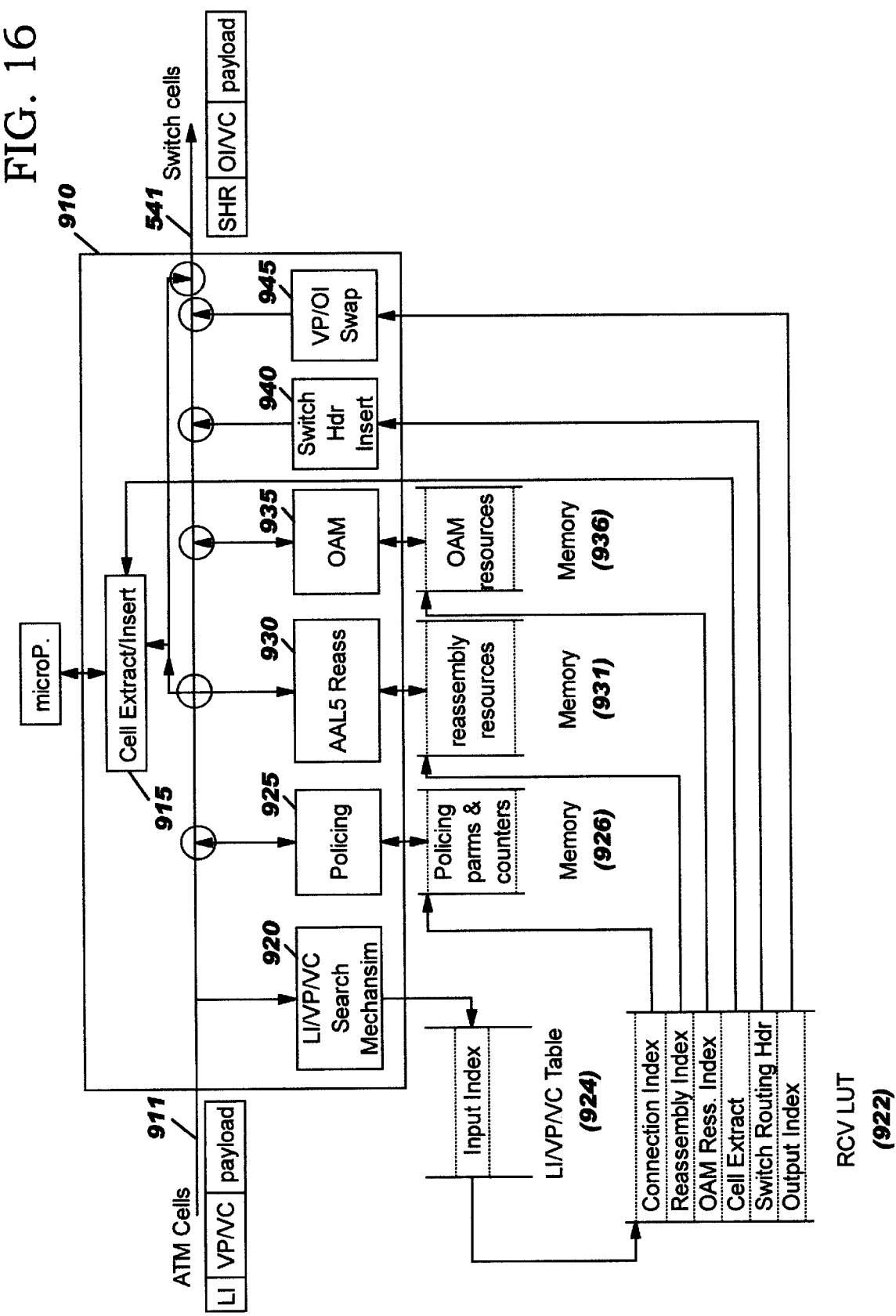
FIG. 16 shows the receive part of block 910 of the ATM Protocol Engine.

With respect to FIG. 16 there is shown the detailed structure of receive block 910. Basically, block 910 is based on a pipeline structure that successively performs elementary operations in order to convert the cell appearing on bus 911 into a switch cell on bus 541 that will be handled by the corresponding PINT element of the locally attached SCAL 1000.

First, receiver 910 comprises a Search block 920 that receives the cell on lead 911 and uses the LI/VP/VC field in order to access a LI/VP/VC table 924 for providing an input index. The access mechanism of such a table is well known and may advantageously use, for instance, the teachings of European patent application 94909050.0 owned by IBM Corp. (docket number SZ994001) showing an effective solution when a great number of different addresses (for instance 16000) are required. In the particular case where the LI/VP/VC does not appear to be included in table 924, block 920 causes the cell to be discarded so that the latter will not be processed by the remaining part of the receiver block 910. In the case where an input index is associated with the particular LI/VP/VC value being carried by the cell, the input is used for accessing a second table, namely a Receive Look Up Table 922 which is organized in order to contain, for each input index, a set of additional indexes which will be needed for the remaining part of the processing used by receiver 910.

More particularly, table 922 is organized to contain the following fields: A Connection Index, a Reassembly Index, an Operation and Maintenance (OAM) index, a Cell Extract index, the Switch Routing Header that will be used by the switch fabric and particularly by the PINT element, and the switch core, and an Output Index that will be used in conjunction with the transmit block 950.

When block 920 completes its processing, the cell is processed by a Policing block 925 which checks the conformance of the cell regarding the traffic parameters which have been defined for the particular ATM cell connection to which the considered cell belongs. To achieve this, block 925 uses the Connection Index returned by the access to table 922, in order to access a Policing and Parameters Counters table 926 in order to check the incoming cell. Block 925 may check the conformance of the cell to the Generic Cell Rate Algorithm (GCRA) that is well known in the art and recommended by the International Telecommunication Union (I.T.U.). Should non-conformance to the GCRA algorithm be detected, then the cell may be discarded in accordance with the above mentioned recommendation. After the conformance processing performed by block 925, the cell is received by AAL5 block 930 which uses the Reassembly Index provided by table 922 for determining whether the cell which is currently received should be directly forwarded to the next block 935, or reassembled in accordance with the well known AAL5 format. In the latter case, AAL5 block 930 causes the payload being transported in the cell to be loaded into a buffer (not shown). It should be noted that since the storage capacity is limited, the number of reassembling operations which can be simultaneously performed is also limited. When the full message is available in this memory, the latter may be accessed by the control processor that is located within the Protocol Engine.

If the cell is not to be reassembled, block 930 lets the cell be processed by an OAM block 935. The latter uses the OAM Resources Index in order to determine whether or not the received cell belongs to a connection (defined by the VP/VC) for which a decision concerning OAM performance monitoring as specified in the I. 610 ITU Recommendations was made. If the cell is not under OAM performance monitoring, then block 935 lets the cell be processed by the next block 940. In the reverse case, however, block 935 determines whether or not a particular OAM cell is to be inserted or extracted, depending upon the actual number of user cells which were already received or transmitted according to the case. For instance, in the case of cell insertion, block 935 determines the opportunity of inserting an additional OAM cell (having a specific VP/VC) in accordance with the actual number of cells belonging to the considered connection which were already transmitted since the last OAM cell insertion. In the case of cell extraction, conversely, block 935 achieves the extraction of the OAM cell that is received. It should be noted that, since the receiver block 910 is based on a pipeline device, the insertion mechanism is actually performed at the first empty cell slot within the pipeline. This is made possible since the receive block 910 is designed so as to operate slightly faster than the actual data throughput of the lines which are thereto attached, thus ensuring the existence of sufficient empty cell slots within the cell flow. Additionally, an independent Cell Extract/Insert block 915 is fitted for the control processor inside the receiver block 910 so that it may also perform extraction in accordance with the contents of the Cell Extract field, or insert a cell when appropriate.

When block 935 completes its process, the cell is received by Switch Header Insert block 940 which uses the Switch Routing Header that was read from the access to table 922, and appends the header to the cell being received before it is transmitted to VP/OI swap block 945. The latter uses the contents of the Output Index that will be inserted within the cell in lieu of the eight LSB of the VP, plus the Header Correction Code (H.E.C.) field. As will be shown hereinafter in more detail, the latter will be used by the transmit part of the Protocol Engine for establishing the final VPNC that will be required at the output of the PE. In other embodiments of the invention, the OI field may also be transmitted as a separate field which may be located at the first location of the cells. It should be noted that the Ouput Index is characteristic of a specific process that is involved in the destination Protocol Engine. Therefore it may happen that two distinct connections may use the same output index. This achieves the capability of realizing simple multipoint to point connections.

From the above described mechanisms, the SCAL 1000 receives a switch cell on bus 541 that takes the form shown in the figure. A substantial advantage resulting from the structure of receiver 910 comes from the arrangement of the different tables in memory and the pipeline organization which permits each block 920, 925, 930, 935, 940, 945 to perform an elementary operation prior to the processing made by the block that follows in the path. This ensures that the whole receiving process can be achieved in a limited period, which appears essential for high speed lines.

Figure 17:
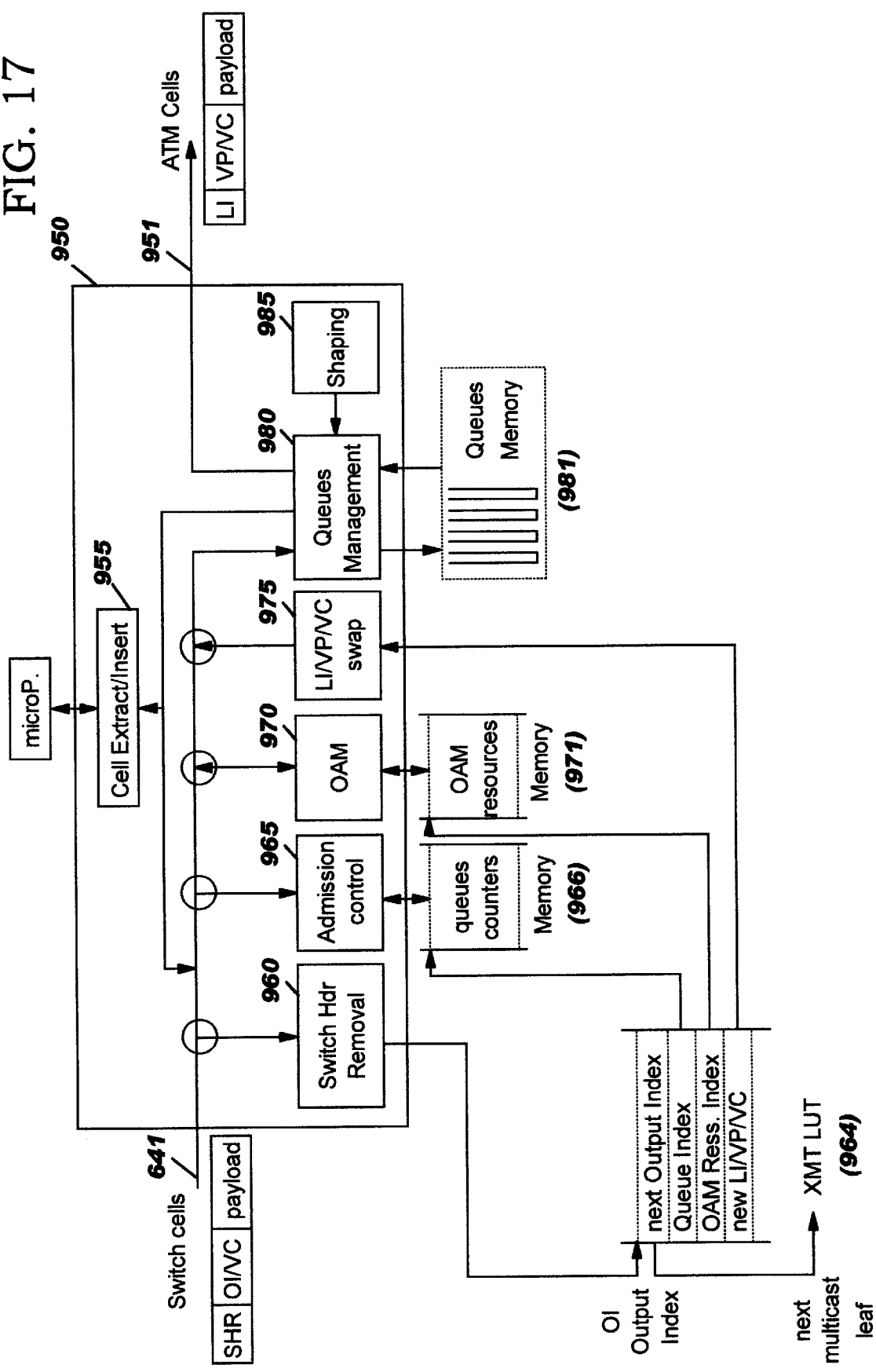
FIG. 17 illustrates the transmit part of block 950 of the ATM Protocol Engine.

The transmit part 950 is shown in FIG. 17. The switch cell that is received from the SCAL 1000 is entered into the Xmit part and processed by a block 960 that performs the suppression of the SRH from the cell. Additionally, block 960 uses the Output Index that is located within the cell for accessing a XMIT Look Up Table 964 which is so arranged as to provide the following field corresponding to the Output index being considered: a Next_Output Index that will be used for performing multicast operations with respect to ATM connections, a Queue Index, an OAM Resource Index and a New LI/VP/VC that will be used for reestablishing the cell in the state that it was received by receiver 910.

The cell is then processed by a Admission Control module 965 which checks the state of the queue that is associated with the particular connection corresponding to the cell being processed. Indeed, in the preferred embodiment of the invention, transmitter block 950 is designed for handling at least 16000 queues. When block 965 receives the cell, the Queue Index is used for determining which queue is associated with the considered cell, and particularly for addressing a storage 966 which contains some parameters relating to this queue. Such parameters may include the number of cells being loaded into the queue, or the number of cells which could be loaded into the considered queue because of overload conditions. From these parameters, block 965 may decide whether or not to cause the loading of the processed cell into the queue that is associated with the considered Queue Index. In a preferred embodiment of the invention, there is used a particular mechanism that monitors the current number of cells being loaded within the queue, and compares this value to a predefined threshold. Should the former exceed the latter, block 965 may either reject any additional cells, or in some restricted cases, accept additional cells when they correspond to priority connections.

Parallel with the loading of the cell into the appropriate queue, a LI/VP/VC block 975 performs the construction of a new header for the cell. This is achieved by suppressing the OI/VC from the cell being received and superseding it with the contents provided by the New_LI/VP/VC. It should be noted that this construction may leave the VC field unchanged, in which case, a VP switching is performed. More generally however, the whole VP/VC field may change.

In addition to the arrangement of the 16000 queues used in the Xmit block 950, a Queue Management system is provided for ensuring the maintenance of an ordered list of buffers in which the cells are loaded, each ordered list corresponding to one of the 16000 queues. Additionally, a Shaping device 985 causes a smooth output of the cells which are loaded into the different queues. This particularly depends upon the output rate which is allocated to each queue.

Similarly to the receive block 910, an OAM block 970 is used for inserting or extracting OAM performance monitoring cells. If the cell is not under OAM performance monitoring, then block 970 does not operate. In the reverse case, however, block 970 determines, as above, whether or not a particular OAM cell is to be inserted or extracted, depending upon the actual number of user cells which were already received or transmitted according to the case.

As mentioned above for the receiver block 910, the invention takes advantage of the particular arrangement of the different tables that are used for managing the different indexes. This permits preventing the use of large and costly memories. This very effective organization provides a receiver and a transmit block for an ATM Protocol Engine that allows 600 Mbits/s connections. It appears from the above, that the PE is used for performing the VP/VC swap by means of the additional output index which is embedded into the payload of the switch cell which is routed by the switch core. Without this particular feature, it would be necessary to perform the VP/VC swapping at the level of the PE receiver, thus resulting in a duplication of the cell prior to its routing by the switch core. With this very effective mechanism used in the PE of the present invention, only one cell is routed through the switch core, thus minimizing the overload of the switch core, and the VP/VC swap is performed at the level of the Protocol Engine on the Xmit side before the cell is transmitted on the line. Thus, the use of the Output Index which is introduced by the receiver part of the Protocol Engine is advantageously combined with the efficiency of the switch core that was described above.

Additionally, the mechanism could still be enhanced by using the Output Index for a second function, that provides the possibility of multicasting cells on connection. This is made possible by combining a multicast buffer with an additional mechanism that is based on the use of a specific bit of Next_Output index field that is produced by the access to table 964.

Port Expansion Architecture.

Figure 18:
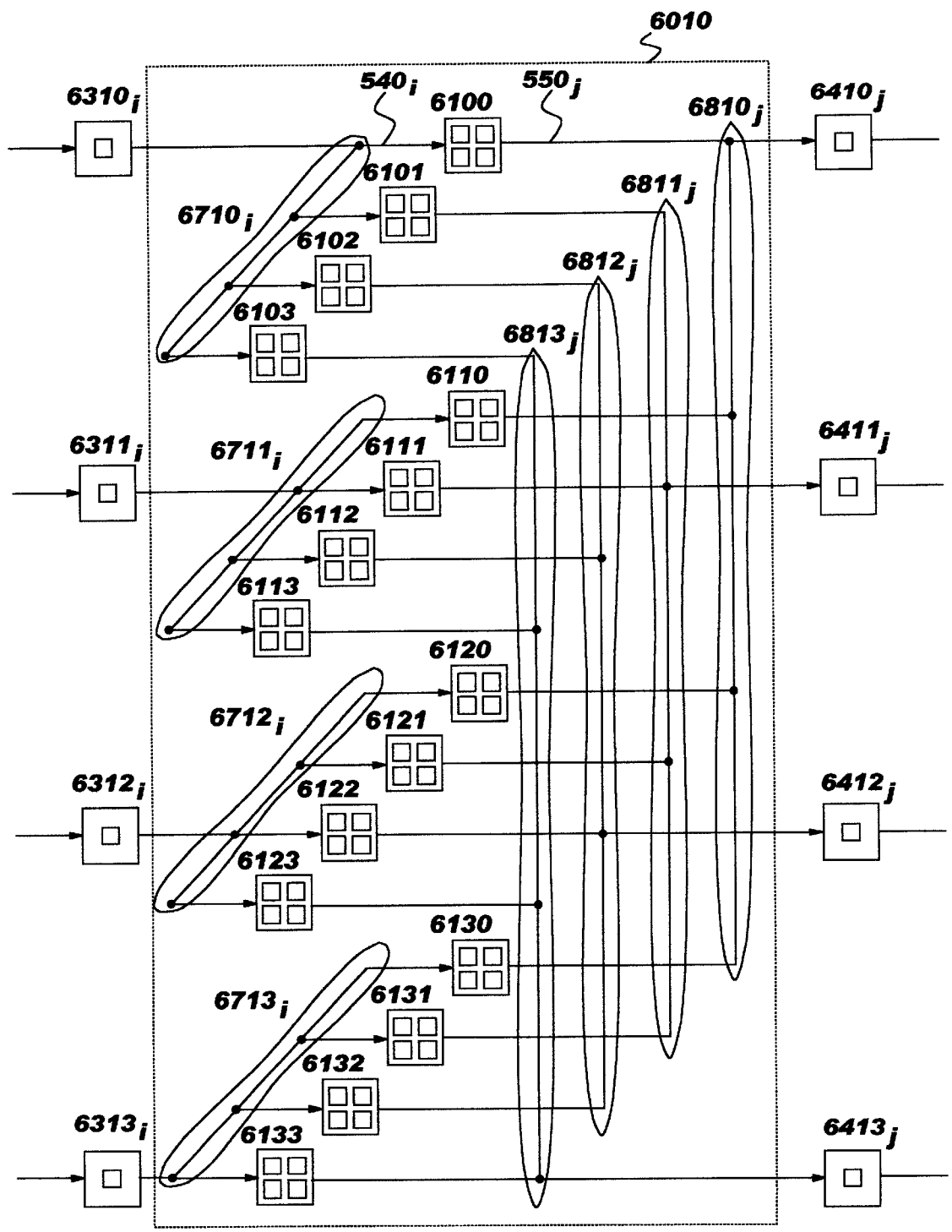
FIG. 18 illustrates the architecture of the switch fabric when arranged in port expansion mode.

With respect to FIG. 18 there is shown an improvement of the switch fabric of FIG. 6 wherein the power of the switch core is substantially enhanced by multiplying the number of ports while maintaining the characteristics (speed, physical and logical interfaces) of the ports. In the preferred embodiment of the invention, the number of ports is multiplied by four, thus providing a single-stage aggregate switch core 6010 of 64 ports. In FIG. 18, switch core 6010 contains a set of sixteen elementary switch cores divided in four distinctive groups of four elements each: a first group including switch cores 6100–6103, each switch core 6100–6103 based on a switching structure 450 as described above (comprising four individual switching modules such as described with reference to FIGS. 2 and 3); a second group comprising switch cores 6110–6113; a third group of cores 6120–6123; and a fourth group of cores 6130–6133. It should be noticed that each of the sixteen elementary switch cores fully comply with the structure 1130 of FIG. 10. Additionally, the person of ordinary skill will notice that the number of ports may be multiplied by any value of n. The number of elementary switch cores will be concurrently increased by a ratio of n×n.

The aggregate switch core 6010 is designed to cooperate with a set of 64 SCAL receive parts with the receive SCAL element 1000 of FIG. 10. The 64 SCAL elements are divided into four groups of 16 receive SCALs each: a first group of receive SCALs 6310-0 to 6310-15 (represented by the reference 6310-i in FIG. 18), a second group of receive SCALs 6311-0 to 6311-15, a third group of receive SCALs 6312-0 to 6312-15, a fourth group of receive SCALs 6313-0 to 6313-15. Similarly, the aggregate switch core 6010 cooperates with a set of 64 transmit SCAL elements which are divided into four distinct groups: a first group of transmit SCALs 6410-0 to 6410-15, a second group of transmit SCALs 6411-0 to 6411-15, a third group of transmit SCALs 6412-0 to 6415 and fourth group of transmit SCALs 6413-0 to 6413-15. Each of the sixteen transmit SCALs fully complies with element 5000 of FIG. 10.

The cells which are provided at the output of SCAL element 6310-i (for i=0 to i=15) are duplicated by means of a corresponding duplicating circuit 6710-i so that the cells are transmitted into the corresponding input i of the four elementary switch cores 6100–6103 that compose the first group of elementary switch cores. This eventually provides a fan-out operation of the bus 540-i of FIG. 10 at the considered input port-i.

Similarly, a second set of sixteen duplicating circuits 6711-0 to 6711-15 is associated with the sixteen receive SCALs 6311-0 to 6311-15 so as to provide a fan-out operation for the second group of four elementary switch cores 6110-6113. Similarly, a third set of sixteen duplicating circuits 6712-0 to 6712-15 is associated with the sixteen receive SCALs 6312-0 to 6312-15 so as to provide a fan-out operation for the third group of four elementary switch cores 6120–6123. Finally, a fourth set of sixteen duplicating circuits 6713-0 to 6713- 15 is associated with the sixteen receive SCALs 6313-0 to 6313-15 so as to provide a fan-out operation for the fourth group of four elementary switch cores 6130–6133.

The cells which are received by transmit SCAL element 6410-j (for j=0 to j =15) come from the corresponding output port j of one of elementary switch cores 6100 or 6110 or 6120 or 6130 (composing a first output group) via a corresponding merging unit 681 0-j in order to provide a fan-in operation on the bus 550-j of FIG. 10.

Similarly, a second set of sixteen merging circuits 6811-0 to 6811-15 is associated with the sixteen transmit SCALs 6411-0 to 6411-15 so as to provide a fan-in operation for the four elementary switch cores 6101, 6111, 6121 and 6131 (composing a second output group). A third set of sixteen merging circuits 6812-0 to 6812-15 is associated with the sixteen transmit SCALs 6412-0 to 6412-15 so as to provide a fan-in operation for the elementary switch cores 6102, 6112, 6122 and 6132 that compose a third output group and, finally, a fourth set of sixteen merging circuits 6813-0 to 6813-15 is associated with the sixteen transmit SCALs 6413-0 to 6413-15 so as to provide a fan-in operation for the fourth output group comprising the four elementary switch cores 6103, 6113, 6123 and 6133.

It appears from the above described architecture that a cell which is transmitted from a considered Protocol Engine (not represented in FIG. 18), arriving to receive SCAL element 631P-i (with P=0 to 3), and which is to be routed to a Protocol Engine that is connected to a transmit SCAL 641Q-j (with Q=0 to 3) will be conveyed through the particular elementary switch core 61 PQ via its input port referenced i and its output port j. For instance, the cell which arrives to receive SCAL 6312-4 and which is to be routed to transmit SCAL 6410-13 will be conveyed through duplication circuit 6712-4, will arrive at the input port 4 of elementary switch 6120 and will be output at the output port 13, and will be conveyed through merging circuit 6810-13 in order to arrive at SCAL 6410-13.

In the preferred embodiment of the invention, the invention takes advantage of the particular structure of each elementary switch core 1130 that is shown in FIG. 10. Indeed, as mentioned above in the description, switch core 1130 is fitted with a set of sixteen Routing Control Devices 1001-0 to 1001-15 with corresponding Routing Control Tables 1002-0 to 1002-15. As explained above, Routing Control Device 1001-i introduces the appropriate routing header that is read from the corresponding Routing Control Table 1002-i that corresponds to the SRH associated with the cell. In addition to the extraction of the appropriate routing header, table 1002-i provides an additional valid bit which can be used for discarding the cell, that is to say preventing the transmission of the cell to the switching structure 450 when the valid bit is found to be invalid. This achieves a filtering capability which permits the possibility of using very simple duplicating circuits 6710, 6711, 6712 and 6713 since they can be embodied by very simple electrical drivers.

Additionally, since the same cell is received by the four individual switch cores belonging to the same group (via its corresponding duplicating circuit), it appears the same cell will be processed by four distinct routing control devices (at the considered input port), each routing control device addressing its associated routing control tables. Therefore, as the contents of these four tables will be advantageously loaded; as described below, it appears that the same cell that arrives at four switch cores may be routed at different output ports in accordance with the contents of the four tables being addressed. This is very important since it provides an additional level of multicasting. Indeed, as mentioned above the Routing Control Device 1001 is used for generating the appropriate routing header which, when processed by the switching structure 450, will result in the transmission of the considered cell to the appropriate output ports of the switching structure 450. This was described as providing a first multicast capability since it makes possible having the cell duplicated at the appropriate output port of the switching structure 450. In the improvement illustrated in FIG. 18, the Routing Control Devices 1001 are assigned an additional filtering function which, when cooperating with the broadcast operation performed by the duplicating circuits, provides an additional level of multicasting since it makes it possible to discard or keep the cell and, moreover when the cells are transmitted to the four switch cores of the same group to independently route the same cell to four separate groups.

Therefore, it appears that a group of switch cores, such as cores 6100–6103, can operate in the same way that one elementary switching structure 450 does, but with the significant advantage that the number of ports is multiplied by four.

Figure 19:
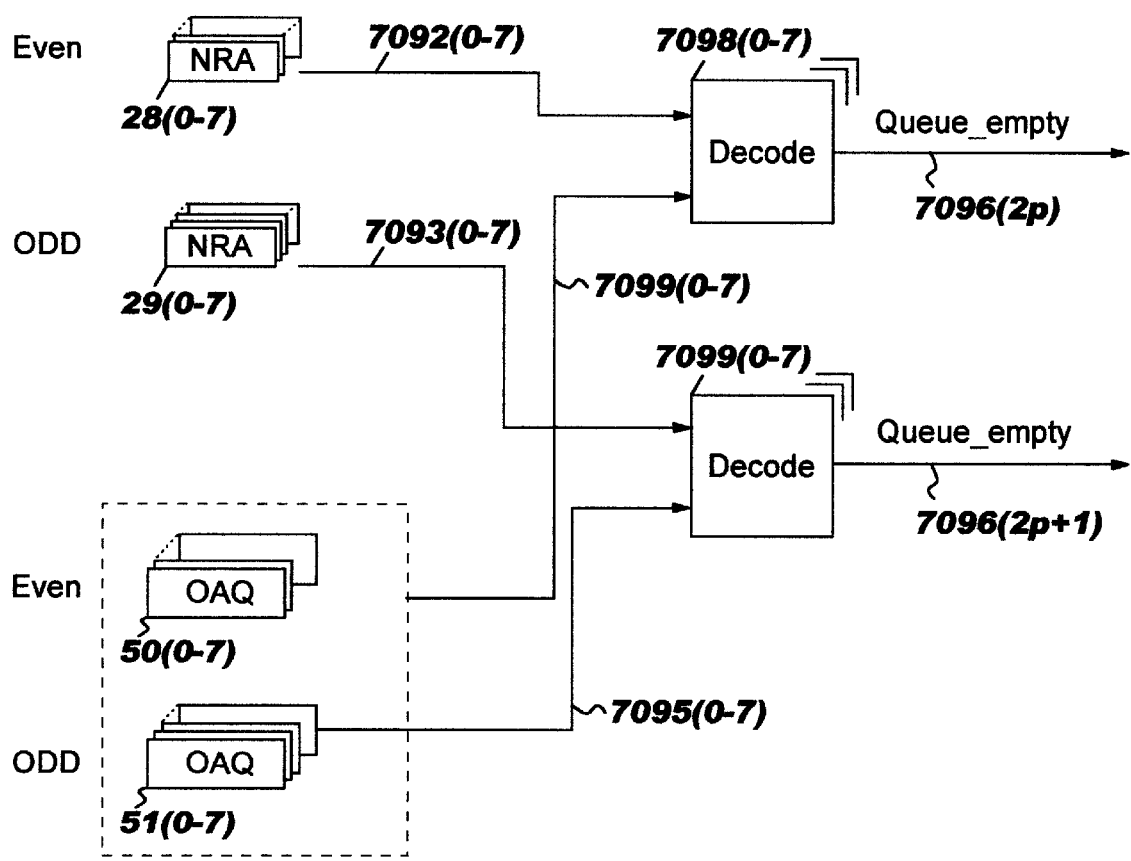
FIG. 19 shows the two Queue_Empty control signals that are used for embodying the merging of the port expansion architecture.

With respect to FIG. 19, it is shown how the merging function is achieved by means of an advantageous adaptation in the structure of the switching module 401, based on the use of two sets of additional control signals, a first set of 16 Queue_Empty control signals which are produced by means of 16 decoders located inside the switching module 401 of FIGS. 2 and 3. A first group (Even) of 8 control signals 7096 (2p) (for p=0 to 7) is generated as follows: a set of eight decoders 7098 (0–7) receives at a first input a corresponding one among eight control signals 7094 (0–7) which is generated in response to the empty state of the Output Address Queue 50(0–7). Additionally each one of the eight decoders 7098 (0–7) receives at a second input the control signal which is generated in response to the free state of the corresponding NRA register 28(0–7) that is illustrated in FIG. 3. The free state of these registers derives from the transfer of their contents into the corresponding ARA registers as explained above in reference to FIG. 3. Conversely, the non-free state is determined from the transfer of the OAQ into the NRA register.

A second group (Odd) of 8 control signals 7096(2p+1) (with p=0 to 7) is similarly generated as above: each of eight decoders 7099 (0–7) receives at a first input a corresponding one among eight control signals 7095 (0–7) which is generated in response to the empty state of the Output Address Queue 51(0–7). Additionally each one of the eight decoders 7099 (0–7) receives at a second input the control signal which is generated in response to the free state of the corresponding NRA register 29(0–7) that is illustrated in FIG. 3. As explained above, the free state of these registers derives from the transfer of their contents into the corresponding ARA registers, while the non-free state is determined from the transfer of the OAQ into the NRA register. It should be noticed that, since the four switching elements that compose a switching structure 450 operates under a master switching element, the Queue_Empty control signals that will be used in accordance with the description below are those that are generated by the master switching element.

Additionally, each switching element is designed so as to receive a set of sixteen Grant control signals (0–15) that are separated into Odd and Even groups of control signals. The 8 Odd Grant control signals are transmitted to the corresponding one among the first 8 drivers among the set of 16 OCD drivers 11 (0–15). When one among these 8 Grant control signals is set at a low state, this entails a disabling of the corresponding OCD driver. The 8 Even Grant control signals are transmitted to the corresponding one among the last 8 last drivers composing the set of 16 OCD drivers and, similarly, they are used for disabling the latter when set at a low state.

Additionally, each one among the 16 Grant control signals 7097(0–15) is assigned a second technical function: at a low level, indeed, this one performs the disabling of the transfer of the corresponding NRA into the ARA registers that correspond. Conversely, when one Grant control signal is set at a high level, the transfer of the corresponding NRA register (among the sixteen registers composing the two groups of Odd and Even sets of registers 28 and 29) is enabled. It should be noticed that when the transfer of one NRA register is disabled (in response to a low level of its corresponding Grant control signal), this prevents the latter from switching to a free state and, eventually, locks the transfer of the address loaded into the corresponding OAQ 50 or 51 towards this NRA register.

As shown in FIG. 18, the j output (with j=0 to 15) of switch cores 6100, 6110, 6120 and 6130, for instance, are connected to the same merging circuit 6810-j. Similarly, the j output of switch cores 6101, 6111, 6121 and 6131 are connected to the same merging circuit 6820-j etc.

Figure 20:
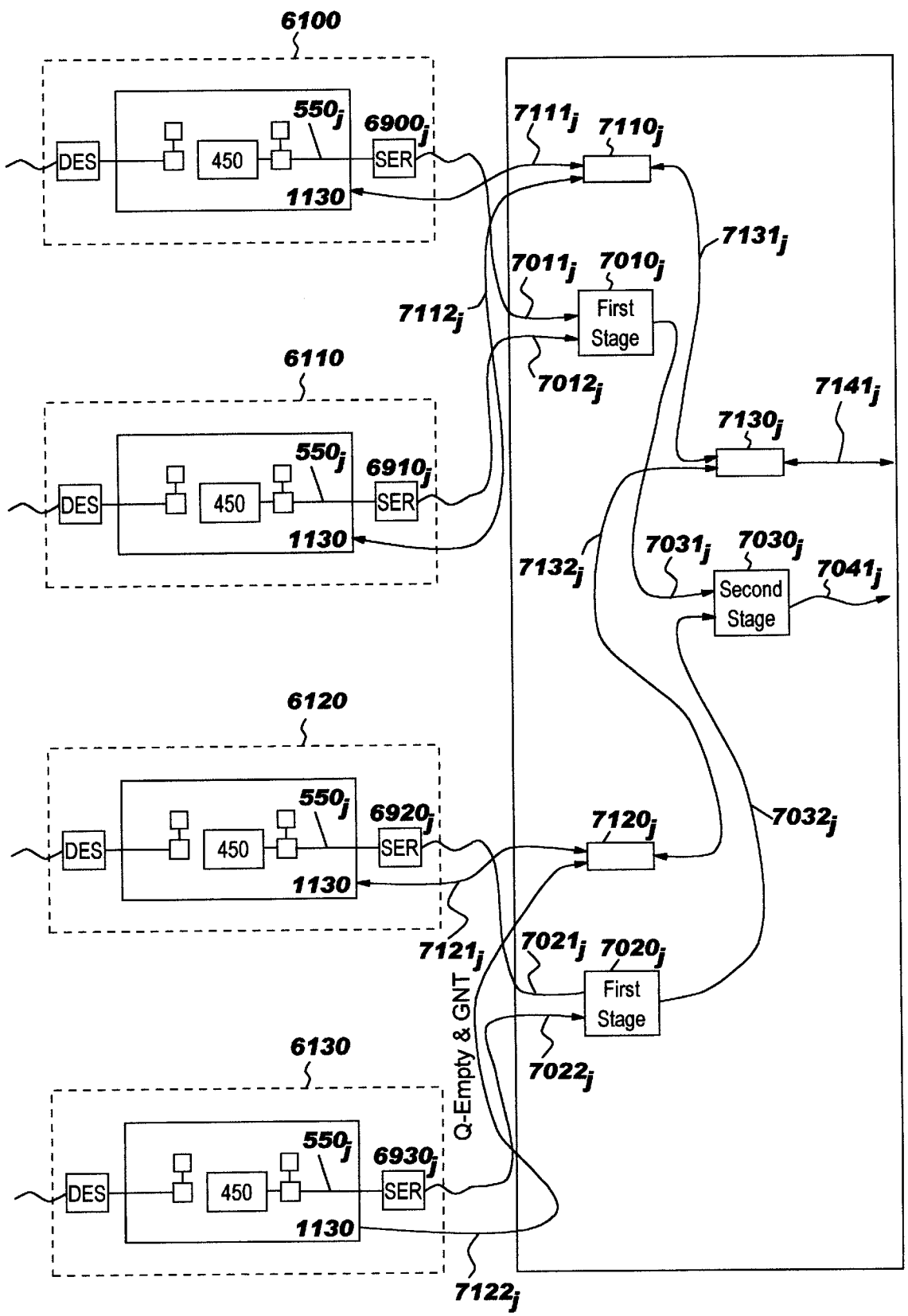
FIG. 20 is an illustration of the preferred embodiment of the architecture that is used for the practical realization of the merging circuit (e.g. merging circuit 6810) and the associated arbitration circuits.

With respect to FIG. 20 there is shown the preferred embodiment of the architecture that is used for the practical realization of the merging circuit, e.g. merging circuit 6810, and the associated arbitration circuits. As mentioned above, merging circuit 6810-j is designed to provide the fan-in of the data received from elementary switch cores 6100–6130. It should be noted that elementary switch core 6100 includes a switch core that is fully in compliance with the switch core 1130 that was illustrated in FIG. 10 (the control device 1000 and 1010 being symbolized in the figure without any numeric reference), and further comprises a set of 16 communications circuits for the sixteen output ports, only one circuit 6900-j being represented in FIG. 20. Communications circuit 6900-j, which is basically a serializing circuit, is used for converting the information that is transported by the bus 550-j (in FIGS. 10 and 20) in a set of analog signals that is suited to the media that will be used for the communication, for instance a coaxial or optical fiber cable 7011j. Indeed, in view of the high frequencies that are used, communications circuit 6900-j achieves the transport of the signal through the cable 7011-j (from a few meters to more than one hundred meters). Additionally, communications circuit 6900-j introduces a coding of the information which will be advantageously used by the first-stage circuit 7010-j of merging circuit 6810-j.

As shown in FIG. 20, merging circuit 6810-j has a first stage which comprises first stage circuit 7010-j and first stage circuit 7020-j. First stage circuit 7010-j receives the cells coming from elementary switch core 6100 through communications circuit 6900-j and the physical media 7011-j, as well as the cells that come from switch core 6110 through its communications circuit 6910-j and physical media 7012-j. The first stage of merging circuit 6810-j further includes first stage circuit 7020-j. First stage circuit 7020-j receives the cells coming from elementary switch core 6120 through communications circuit 6920-j and the physical media 7021-j, as well as the cells that come from switch core 6130 through its communications circuit 6930-j and physical media 7022-j.

Additionally merging circuit 6810-j comprises a second stage circuit 7030-j that receives the cells that come from the first-stage circuits 7010-j and 7020-j, respectively via physical media 7031-j and 7032-j. The cells that are outputted from second-stage circuit 7030-j are then available on a physical media 7041-j which can be embodied in the form of a coaxial cable or an optical fiber. It should be noted that, in the preferred embodiment of the invention, the length of the cables embodying the physical media that connect the switch core to the merging circuit are generally less than one meter, while the length of the cables that connects the first and second stage circuits are about several meters, and the last cable 7041 at the output of the merging circuit can have a length of several hundred meters.

In addition to the first and second stage circuits, merging circuit 6810-j comprises an architecture made up of first stage arbitration circuits, arbitration circuits 7110-j and 7120-j (composing a set of 32 first stage arbitration circuits when considering the 16 ports of the switch core), and a second stage arbitration circuit 7130.

First stage arbitration circuit 71 10-j receives the Queue_Empty control signal that is generated by switch core 6100 and conversely transmits a Grant control signal to the latter. The two controls signals, being conveyed in opposite directions, are illustrated in the figure with a common control line 7111-j. Similarly, first stage arbitration circuit 7110-j receives the Queue-Empty control signal that is generated by switch core 6110 and conversely transmits a Grant control signal to the latter via dual control line 7112-j.

Also, first stage arbitration circuit 7120-j receives the Queue_Empty control signal that is generated by switch core 6120 and conversely transmits a Grant control signal to the latter via a dual common control line 7121-j. First stage arbitration circuit 7120-j receives the Queue-Empty control signal that is generated by switch core 6130 and conversely transmits a Grant control signal to the latter via dual control line 7122-j.

Second stage arbitration circuit 7130-j receives the Queue-Empty control signals that are generated respectively by first stage arbitration circuit 7110-j via cable 7131-j and arbitration circuit 7120-j via cable 7132-j. Conversely, first stage arbitration circuits 7110-j and 7120-j respectively receive the Grant control signal from second stage arbitration circuit 7130-j via control line 7131-j and 7132-j. The second stage arbitration circuit 7130-j receives the Grant control signal from the SCAL element 6410-j.

It should be noted that the preferred embodiment of the invention uses a merging circuit architecture that is based on a two-stage structure. However, the invention is not limited to the use of only two stages, and may be expanded to three or more stages. In the case of a three stage merging circuit, arbitration circuit 7130j would be connected to a third stage arbitration circuit via line 7141-j which would be a dual control line, that is to say which would allow the transmission of the Grant control signal and the Queue_Empty control signal in opposite directions.

Since the arbiter only provides one Grant signal to one among the four elementary switch cores that belongs to the same merging circuit, it appears that theoretically contention is excluded since for each cell cycle the merging circuit should receive a maximum of one cell. However, the switching cores operate at a higher frequency, thus decreasing the cell cycle time. Additionally, the physical size of the switch tends to increase (in terms of the physical space and the length of the cables which are involved) and thus the transit time of the signals is increased accordingly. This substantially degrades the theoretical mechanism that is used by the arbiter and a specific mechanism was included into the arbiter in order to avoid this disadvantage.

For simplicity's sake, the elementary switch cores present the same cell cycle. For a given port j and at each cell cycle, the four elementary switch cores 6100–6130 of FIG. 18 control their corresponding Queue_Empty control lead in accordance with the actual state of their OAQ queues located therein. Therefore, the actual state of the four OAQ queues being considered are represented on the control leads 7111-j (for core 6100), 7112-j (for core 6110), 7121-j (for core 6120) and 7122-j (for core 6130).

First-stage arbiter 7110-j receives at its two inputs the two Queue_Empty control signals that are generated by elementary switch cores 6100 and 6110. From these two signals, first-stage arbiter 7110-j derives a corresponding Queue_Empty control signal on bus 7131-j which is transmitted to second-stage arbiter 7130-j.

Similarly, first-stage arbiter 7120-j derives from the two Queue_Empty control signals that are received from the two corresponding cores 6120 and 6130, the Queue_Empty control signal that is transmitted to second-stage arbiter 7130-j via bus 7032-j.

Second-stage arbiter 7130-j receives at its two inputs the two Queue_Empty control signals that are generated by the two first-stage arbiters 7110-j and 7120-j. In the case where the arbitration circuit is distributed in more than two stages, e.g. includes an additional third stage arbiter, second-stage arbiter derives a corresponding Queue_Empty control signal which can be transmitted to third stage arbiter (not represented in the figure) and so on. Now considering the case where only a two-stage arbitration circuit is employed, this means that second-stage arbiter 7130 is the last element of the chain. Therefore, from the two Queue_Empty control signals that are transmitted from the first-stage arbiters, second-stage arbiter 7130-j generates a unique Grant control signal (as described below in more detail) if appropriate. This Grant control signal is then propagated to the appropriate switch core, that is, to the first-stage arbiter that has issued a Queue_Empty control signal when alone; and, when the two first-stage arbiters issued a similar Queue_Empty control signal, second-stage control signal transmits the Grant in accordance with a considered assignment process. In the preferred embodiment of the invention, in case of contention, the second-stage arbiter assigns the Grant signal to the first-stage arbiter that was not serviced the last time. Similarly, the first-stage arbiter that receives the Grant signal assigns the latter to the other switch that has previously received the Grant signal. This assignment is embodied by means of an appropriate control signal on the Grant lead of busses 7111-j, 7112-j, 7120-j and 7121-j.

It should be noticed that, in view of the high switching rates of the switching architecture, the period that is assigned to one cell is very short, thus rendering the transit times not quite negligible. FIG. 21 illustrates the timing diagrams that are involved in the actual process of transmission of the Queue_Empty control signals through the first stage arbiters, the building of the Grant control signal inside the second-stage arbiter, and the retransmission of the latter in the opposite direction towards the appropriate switch core that will receive the Grant control signal. It should be noted that since the Grant control signal is used by the considered switch core for the next cell cycle, it appears that the Grant control signal should be available on one among the four considered busses 7111-j; 7112-j, 7120-j and 7121-j before the occurrence of the sampling time that is represented in the FIG. 21, and which corresponds to the latest time which is allowed by the switch core, in view of its physical requirements and internal organization, for ensuring the outputting of the data at the next cell cycle.

Figure 22A:
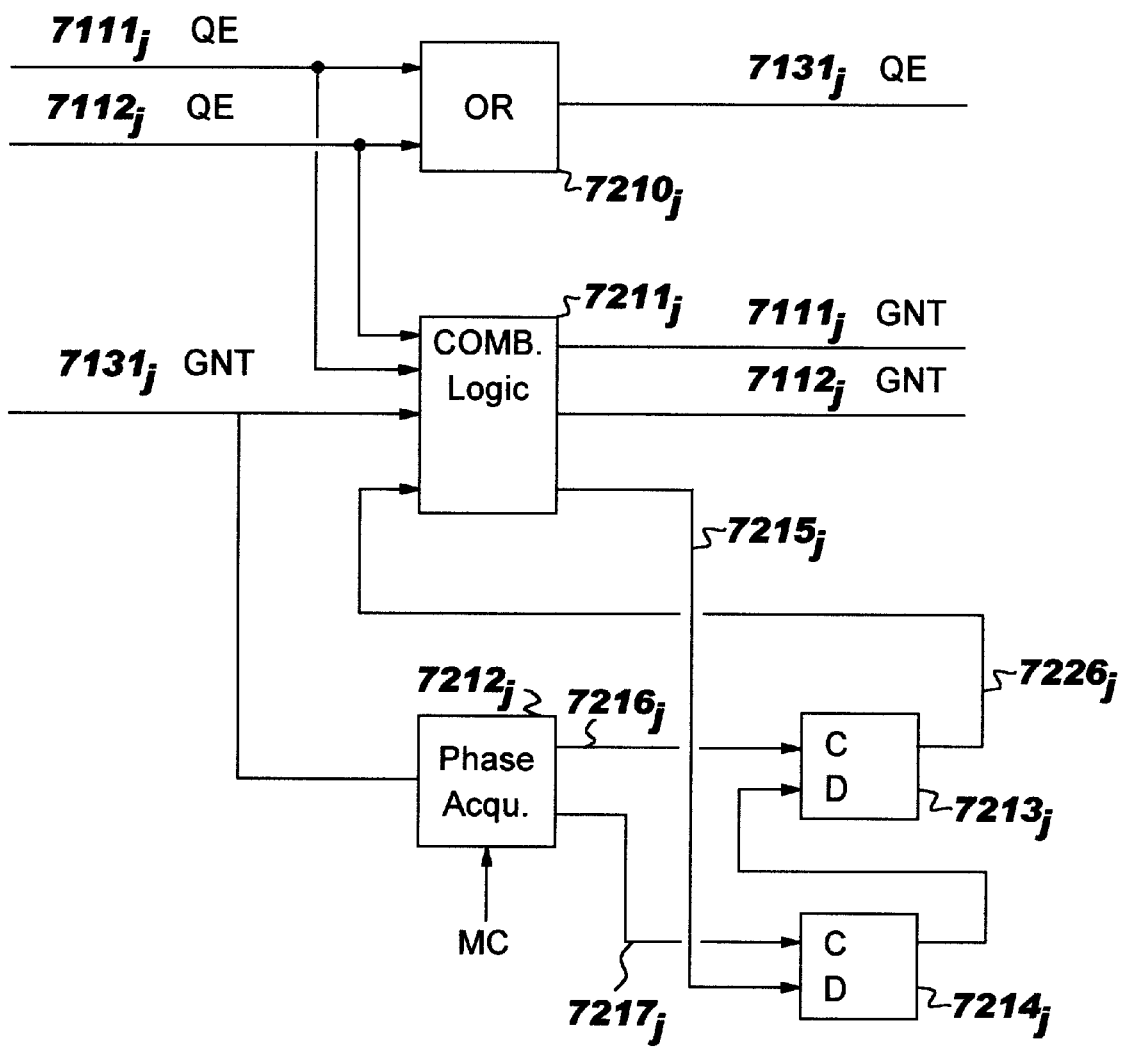
FIGS. 22A and 22B show the physical structure of the arbiters that are used for embodying first stage and second stage arbiters.
Figure 22B:
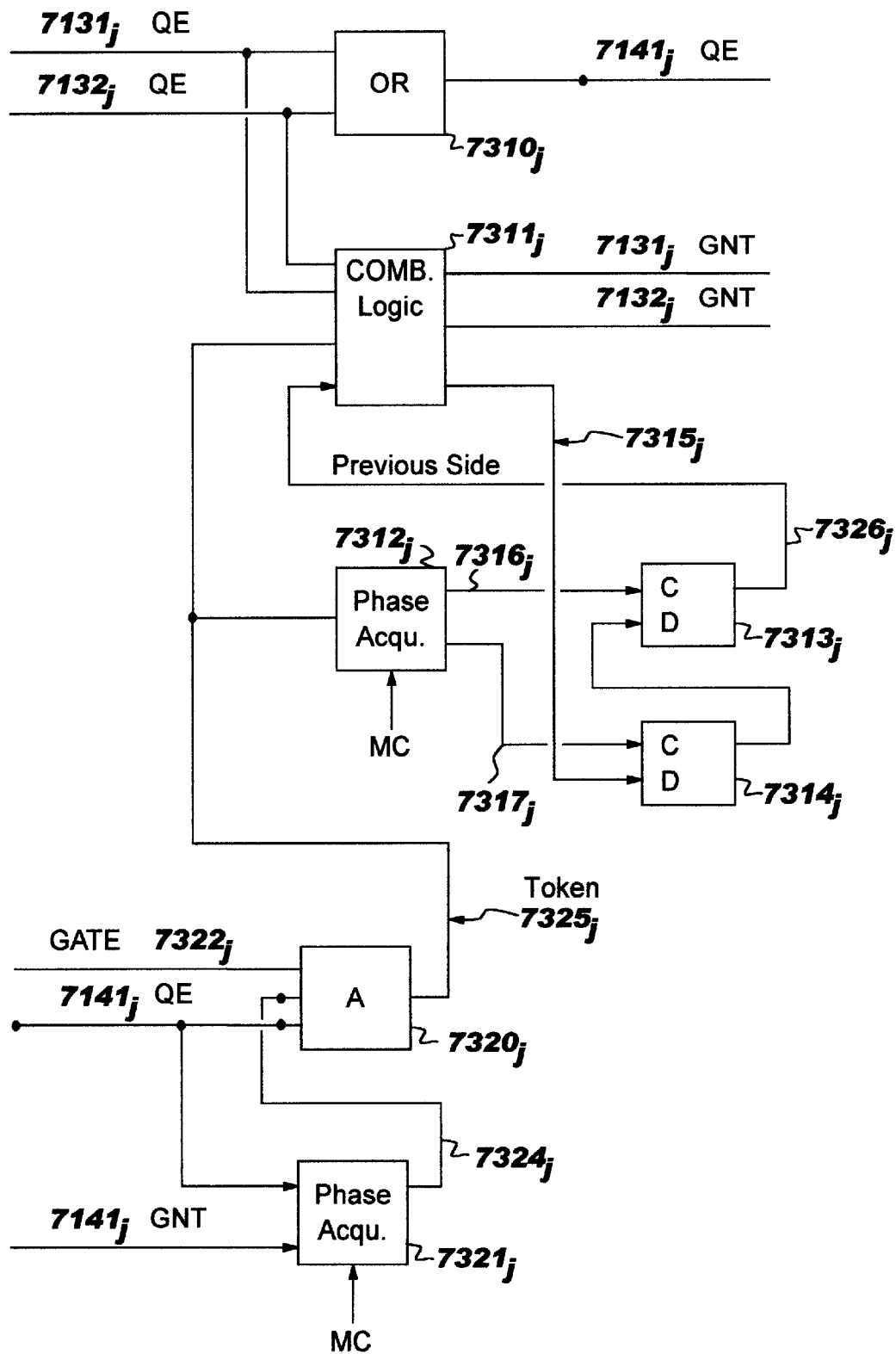

With respect to FIGS. 22A and 22B, there is shown the physical structure of the arbiters that are used for embodying first stage and second stage arbiters. First stage arbiter, e.g., arbiter 7110-j, is represented in FIG. 22A and comprises an OR gate 7210-j that has a first input receiving the Queue_Empty control signal of bus 7111-j and has a second input that receives the Queue_Empty control signal of bus 7112-j. The output of OR gate 7210-j is used to generate the Queue_Empty control signal on bus 7113-j that is intended for the second stage arbiter. Additionally, first stage arbiter 7110-j comprises a combinatory logic circuit 7211-j having a first input that receives the Queue_Empty control signal from bus 7111-j, a second input that receives the Queue_Empty control signal from bus 7112-j, a third input that receives the Grant control signal from bus 7131-j transmitted from the second stage, a fourth input that receives the contents of a latch 7213-j. Logic circuit 7211-j has a first output lead that generates the Grant control signal on bus 7111-j and a second output lead that produces the Grant control signal on bus 7112-j, these two control signals are used by the associated switch cores 6100 and 6110. Logic circuit 7211-j has a third output lead 7215-j that is connected to the data input of a second latch 7214-j, the output of which is connected to the data input of the first latch 7213-j. A Phase Acquisition circuit 7212-j receives the Grant control signal from bus 7131-j and respectively produces a first clock signal 7216-j that is intended for the clock input of latch 7213-j, and produces a second clock signal 7217-j that is used for clocking the second latch 7214-j. To achieve this, the Phase Acquisition circuit 7212-j receives a master clock signal.

With respect to FIG. 22B, there is shown the structure of the last stage arbiter, e.g. second-stage arbiter 7130-j in the preferred embodiment made up of two stages. Second stage arbiter 7130-j comprises an OR gate 7310-j that has a first input receiving the Queue_Empty control signal of bus 7131-j and has a second input that receives the Queue_Empty control signal of bus 7132-j. The output of OR gate 7310-j is used to generate the Queue_Empty control signal on bus 7141-j that is transmitted to an AND gate 7320-j. Additionally, second stage arbiter 7130-j comprises a combinatory logic circuit 731 1-j having a first input that receives the Queue Empty control signal from bus 7131-j, a second input that receives the Queue_Empty control signal from bus 7132-j, a third input that receives the Grant control signal available at the output of AND gate 7320-j, a fourth input that receives the contents of a latch 7313-j. Logic circuit 7311-j has a first output lead that generates the Grant control signal on bus 7131-j and a second output lead that produces the Grant control signal on bus 7132-j, those two control signals being used by the first stage arbiters. Logic circuit 7311-j has a third output lead 7315-j that is connected to the data input of a second latch 7314-j, the output of which is connected to the data input of the first latch 7313-j. A Phase Acquisition circuit 7312-j receives the Grant control signal available at the output of AND gate 7320-j and respectively produces a first clock signal 7316-j that is intended for the clock input of latch 7313-j, and produces a second clock signal 7317-j that is used for clocking the second latch 7314-j. To achieve this, the Phase Acquisition circuit 7312-j receives a signal as detailed hereinafter.

In addition to the control signal received from the OR gate 7310-j at a first input, AND gate 7320-j receives a Gate control signal 7322-j at a second input lead, and a control signal at a third input lead that is generated by a Phase Alignment circuit 7321-j. The latter has two input leads that respectively receive the Queue_Empty control signal from bus 7141-j generated by OR gate 7310-j, and the Grant control signal on bus 7141-j that is received from the Switch Core Access Layer (SCAL) 6410-j. Phase Alignment circuit 7321-j receives the same master clock that is also received by Phase Acquisition circuit 7312-j. Finally, AND gate 7320-j has an output lead that is transmitted to the Phase Acquisition circuit 7312-j and to the combinatory logic circuit 7311-j.

With respect to FIG. 21, consider T to be the theoretical beginning of the cell cycle for the group of elementary switch cores 6100, 6110, 6120 and 6130. It should be noted that the cell cycles of each respective switch core element are synchronized with each other. This synchronization is performed with a given degree of precision. Each switch core element generates a Queue_Empty control signal which is in phase with its cell cycle in order to indicate whether or not there is something to transmit on the next cell cycle. These four control signals are represented in FIG. 21 by the numeric references 7111-j, 7112-j , 7121-j and 7122-j. Although the theoretical switching instant is identical for the four switch core elements, the actual switching instants of the four considered control signals will not be strictly synchronized in view of the transit times that may slightly differ from one element to another. In FIG. 21, the non-perfect synchronization of the four signals 7111-j, 7112-j, 7121-j and 7122-j are represented by a certain width (epsilon) in the time transition of the latter. More precisely, the figure shows that the transit time for each control signal can be decomposed in two elements. A first delay t0 corresponds to the mean delay (identical for the four elements) that is required for the transmission of the signal from the output of the switch core to the input of the OR gate located in the considered first-stage arbiter, e.g. OR gate 7120-j of arbiter 7110-j. The second element of the delay corresponds to the value epsilon that may differ from one arbiter to another and which results in the fact that the four switching instants of the control signals are not strictly synchronous.

The four Queue_Empty control signals 7111-j, 7112-j, 7121-j and 7122-j that are respectively entering the OR gate of the first stage arbiters 7110-j and the OR gate of the first stage arbiter 7120-j, result in the propagation of two Queue_Empty control signals 7131-j and 7132-j which are both transmitted to the two input leads of OR gate 7310-j of second stage arbiter 7130-j. FIG. 21 shows the timing diagrams of control signals 7131-j and 7132-j, and it appears that the switching instant for each of these control signals is delayed with respect to the four control signals 7111-j, 7112-j, 7121-j and 7122-j. As previously noted, for each second-stage Queue-Empty control signal, the delay is composed of two elements: a first delay t1 which is common for each signal 7131-j and 7132-j and which is the mean delay corresponding to the transit time throughout the OR gate in one first stage element, e.g. OR gate 7210-j, plus the transit time of the bus 7131-j and 7132-j. The second element, epsilon, is the value that explains the difference between the actual switching instants.

The two Queue-Empty control signals 7131-j and 7132-j, which are entered into the OR gate 7310-j of second stage arbiter 7130-j, result in a control signal 7141-j that, as shown in the figure, has a switching instant that is still delayed with respect to the mean switching instant of the two Queue-Empty control signals 7131-j and 7132-j. Similar to the above discussion of the first stage arbiter, the delay comprises a value t2 (+/−epsilon) corresponding to the mean delay of transmission through the OR element.

The Queue-Empty control signal 7141-j is transmitted to the input of AND gate 7320-j so as to be processed by the Phase Alignment circuit 7321-j. The latter processes, in cooperation with AND gate 7320-j, three control requests that may be in contention. The first one is carried by control lead 7141-j and is generated by the SCAL element in order to indicate whether or not the latter is ready to receive the cell which is arriving on bus 7041-j. The second control request is received by AND gate 7320-j and carries a Gate signal that can be advantageously used for priority management purpose. The third request is obviously the Queue_Empty control signal 7141-j that is derived from the first stage arbiter Queue_Empty control signals. The function of Phase Alignment circuit 7321-j is to put in phase the Grant control signal 7141-j with the Queue_Empty control signal on the same bus 7141-j, since it is clear that the SCAL element which receives the cell and the switch core element that transmits the cell operate at the same frequency, but with a different phase. In other words, Phase Alignment circuit 7321-j provides AND gate 7320-j with inputs 7141-j and 7324-j which are in phase in order to get on bus 7325-j a pulse that has a width of a cell cycle with a minimum amount of distortion and delay. To achieve this, the Phase Alignment circuit uses an over sampling technique which is based on the MC master clock. Such a technique is well-known in the considered technical field.

As it appears in FIG. 21, when there is an occurrence between the three inputs of the AND gate 7320-j, that is to say there is simultaneously a request for a Grant control signal (lead 7141-j) associated with the actual possibility of transmitting a cell to the SCAL (signal 7141-j) and the latter is also authorized by a positive Gate signal (7322-j), the AND gate 7320-j can deliver a positive Grant control signal, or a so-called Token control signal, that will be distributed to the first-stage arbiters.

The Token being generated is transmitted to combinatory logic circuit 7311-j which determines the appropriate direction of propagation of the Token. To achieve this, combinatory circuit 7311-j realizes the logical table that is represented in FIG. 23. In the case where there is an unique request transmitted by one of the two first-stage arbiters, that is to say one among the two Queue_Empty control signals on bus 3131-j and 3132-j, combinatory logic propagates the Token to the direction that issued the request. For instance, should the Queue_Empty control signal of bus 7131-j carry an active signal, then combinatory logic causes the token to be transmitted to the Grant control lead of the same bus 7131-j. In addition, combinatory logic circuit 7311-j produces on lead 7315-j a signal that will be transmitted to the D-input of latch 7314-j so as to memorize the particular direction to which the Token has been transmitted. Phase Acquisition circuit 7312-j, which is also based on an over sampling technique, generates a clock signal 7317-j having the shape of a pulse, the latter being transmitted to the clock input of latch 7314-j. In addition, Phase Acquisition circuit 7312-j produces a second clock signal 7316-j having a phase which is determined from the phase of the Token that is generated on lead 7325-j so that the resulting clock signal transmitted to the clock input of latch 7313-j produces a signal at the output of the latch which is in phase with the Token and indicates to which of the two lines 7131-j and 7132-j the Token was distributed the last time.

As a consequence, when an unique Queue_Empty control signal was active on one of the two busses 7131-j and 7132-j, combinatory logic performs the transmission of the Token that is provided from AND gate 7320-j to the bus that requested the token and, additionally, records this particular bus by means of latch 7313-j.

When the two Queue_Empty control signals on busses 7131-j and 7132-j issue a request, combinatory logic 7311-j uses the contents of latch 7313-j (available on lead 7326-j) in order to determine in which direction the Token was distributed the last time, and correspondingly, distributes the current Token in the opposite direction in order to respect the fairness of the Token allocation. This mechanism has the strong advantage of preventing the use of traditional and fixed bandwidth allocation mechanisms that appear quite ineffective in the context of high speed and large switching architectures. Then, the actual destination bus of the token is recorded as described above, by means of two successive storing operations in latches 7314-j and 7313-j under control of Phase Acquisition circuit 7312-j.

The Token is then received by the appropriate first-stage arbiter, e.g. arbiter 7110-j on the Grant control lead of bus 7131-j, as shown in FIG. 22A. This Grant signal is then processed by combinatory logic 7211-j by means of a mechanism that appears similar to the preceding description. Therefore, in the case where one unique Queue_Empty control lead issues a request for a Token, combinatory logic provides the Token in that direction and records this particular direction into the latch 7213-j through latch 7214-j under control of Phase Acquisition circuit 7212-j. However, should the two busses 7111-j and 7112-j issue an active Queue_Empty control signal, then combinatory logic provides the Token in the opposite direction with respect to the bus which actually received the token the last time. Additionally, this particular bus which is being granted the Token is recorded by means of two successive store operations in latches 7214-j and 7213-j as described above. It therefore appears that one single Token can be delivered to one single switch core element.

As it appears in FIG. 21, the delivering of the Token is to be performed sufficiently in advance so that the switch core element that receives it can process the Token before the completion of the cell cycle. In the figure, the latest instant for permitting the correct processing of the Token by the switch core element is represented by the letter S (sampling) that is delayed from the theoretical cell cycle beginning T by the equation:

Sampling time=T+Tcell−Tprocess where T represents the theoretical cell cycle beginning, Tcell represents the value of the cell cycle, and Tprocess represents the minimum period that is required by the switch core element for processing the Token.

In consequence, it appears that the unique switch core element that receives the Token is able to deliver a full cell at the next cell cycle. The cell which is delivered by the appropriate switch core element, for instance element 6100, appears on bus 550-j of the latter. Bus 550-j transports the cell contents on 8 bits, a clock delimiting the cell boundary on one lead, and an additional signal on one lead for indicating the presence of a cell. The cell is then transmitted to the Communication Circuit 6900-j which converts the information into an analog form that is suited for the communication media, be it either optical, or a common cable 7011-j. In addition to this first function, Communication Circuit 6900-j introduces in the flow of data a coding pattern. This coding has the purpose of introducing all the information composing bus 550-j into one unique serial flow of data.

In the present invention one redundant code is advantageously used, that is based on the 8B/10B coding scheme disclosed in the article "A DC-Balanced, Partitioned-Block, 8B/10B Transmission Code ", IBM J. Res. Dev. , vol. 27, pp. 440–451 by A. X. Widmer and P. A. Franaszek. The coding scheme is also described in U.S. Pat. No. 4,486,739 assigned to IBM Corporation, the disclosure of which is hereby incorporated by reference. As known by the person of ordinary skill, this coding scheme provides, in addition to the effects related to the transmission (DC balanced and high bit density), a redundancy which is used for detecting the line errors and the creation of special patterns or characters, so-called comma characters, which can be used for synchronization purposes. As explained in this document, the comma character indicates the proper byte boundaries and can be used for instantaneous acquisition or verification of byte synchronization. More particularly, in the absence of errors , the comma does not occur in any other bit position, neither within characters nor through overlap between characters. Three characters in the 8B/10B code have been recognized as presenting those properties, the so called K.28.1, K.28.5 and K.28.7 characters.

The use of the 8B/10B code for transport purpose is also addressed in the article "Single-Chip 4×500-MBd CMOS Transceiver" in the IEEE Journal of Solid-State Circuits, December 1996, Vol. 31; number 12 by A. X. Widmer et al. This article discloses the use of comma characters in empty cell cycles in order to allow the detection of the cell clock. This results in an absence of overhead since the length of the cell which contains data is not increased with the insertion of the comma synchronization character. This is particularly interesting and advantageous when small cells are processed and switched.

In the present invention, the comma character is advantageously used by the first stage of merging circuit 6810-j, that is to say by first stage circuit 7010-j and first stage circuit 7020-j. Indeed, thanks to the arbitration process that is particularly performed by circuit 7110-j as thoroughly explained above, first stage circuit 7010-j is assured to receive a maximum of one cell coming from one among the two links or physical media 7011-j and 7012-j. The invention is designed so that the four switch core elements operates with the same cell clock. The circuitry to achieve such kind of synchronization is straightforward for the person of ordinary skill and will not be further detailed. Therefore, assuming that switch core element 6100 is assigned the delivery of one cell at a period n, and that the switch core element 6110 is assigned the delivery of one cell at the next period n+1 (thanks to the arbitration process described above), the producing of the first element of the two cells is strictly separated by a cell cycle period. In other words, all the busses 550 are strictly synchronous. In addition, the different cables embodying the links 7011-j, 7012-j, 7021-j and 7022-j are chosen so that they have practically a similar length, and the electronic components of the communication circuit 6900 is also designed in order to present a determined controlled transmit delay.

Assuming that T represents an arbitrary origin, and that Tcell is the cell period, the cell boundary for all the busses 550 is given by the following formula:

T(k)=T+kxTcell.

Assuming now that the transit time between bus 550-j and the first stage circuit 7010-j (via element 6900-j and link 7011-j) has a nominal value of Ttransit; the cells arriving at the input of first stage circuit 7010-j is given by the formula:

T1(k)=T+kTcell+Ttransit+epsilon1 while the cells arriving at the input of first stage circuit 7020-j complies with the formula:

T2(k)=T+kTcell+Ttransit+epsilon2.

The values of epsilon1 and epsilon2 distinguishes the overall transmit time of the cells which strongly depends on the internal characteristics of the components (temperature, power supply, etc.) and the accuracy of the length of the cables.

The first stage circuit 7010-j operates in accordance with the following algorithm. When the link 7011-j appears to present the comma character (characteristic of empty cell boundary), circuit 7010-j switches its outputs 7031-j on the link 7012-j. Conversely, if the link 7012-j appears to contain the K.28.5 (for instance) comma character, the circuit 7010-j switches so as to connect its output 7031-j to the link 7011-j. When both input links appear to contain the comma character the circuit 7010-j indifferently switches to one among the two inputs. Since the comma character is ten bits long, a small buffer can be used.

Figure 24:
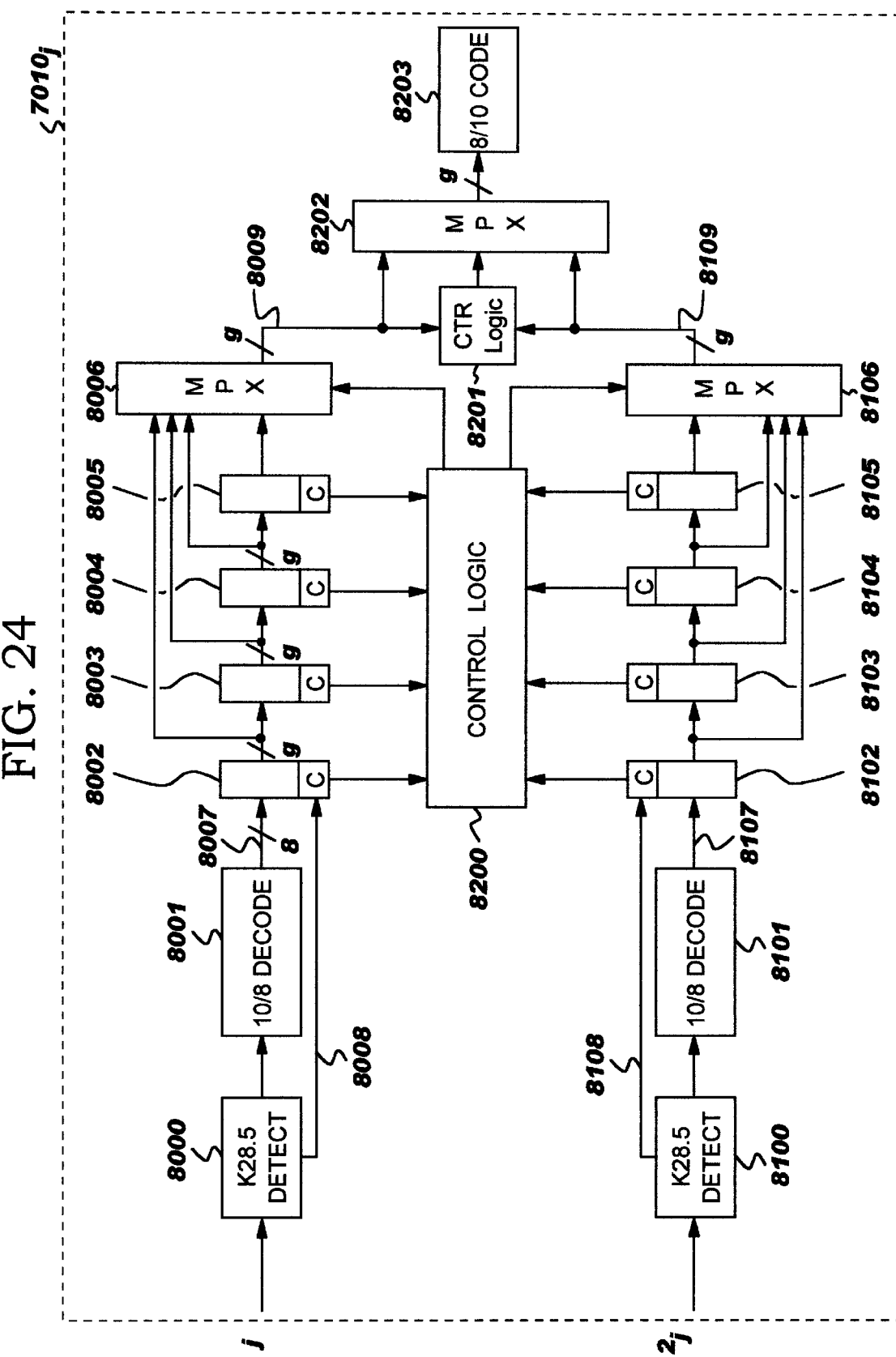
FIG. 24 illustrates the particular structure within first stage circuit 7010-j which eventually provides effective merging of the data cells, taking into account the existence of the comma character and the possible difference in delays of transfer throughout the two busses 7011-j and 7012-j.

With respect to FIG. 24 there is shown the particular structure within first stage circuit 7010-j which, eventually, provides the effective merging of the data cells, taking into account the existence of the comma character and the possible different transfer delays through the two busses 7011-j and 7012-j. For clarity's sake the whole circuit is illustrated without the use of the reference j. However, it should be clearly understood that since the structure being illustrated corresponds to the first stage circuit 7011-j, the elements therein included should logically bear the same reference.

The signal is entered in to a 10B/8B decode circuit 8001 which extracts from the 10 bits of the 10B/8B code, previously aligned by the comma detector 8000, the information byte bus. The 8 bits of a register 8002 receives the byte that is provided by 10B/8B bit decoder 8001 through bus 8007, and a 9th bit of the same register receives one additional bit on lead 8008 generated by K28.5 detector circuit 8000 and which is a pulse that corresponds to the detection of the comma character. The detection of the comma character within detector 8000 is delayed before being entered into register 8002 in order to take into account the transfer time of the bytes through the 10B/8B decode circuit 8001. The information that is contained within register 8002 represents the information byte that is decoded by the circuit 8001, taken on a 10 bit sample; the sample being correctly aligned by the comma detection circuit 8000. The 9th bit indicates whether the 10 bit sample that is considered was carrying the comma character.

The byte is then successively entered into a pipeline circuit that is formed by the three 8-bit registers 8003, 8004 and 8005 that each have a 9th bit for carrying the comma bit. Each register 8002–8005 has its output which is connected to a corresponding input of a multiplexing circuit 8006.

Similarly, the signal that is coming from bus 7012-j is successively entered into Comma Detection circuit 8100, 10B/8B bit decoder 8101 and the corresponding pipeline formed of the succession of registers 8102–8105, these registers having their output connected to corresponding input of a multiplexing circuit 8106.

The comma bits which are stored into the 9th bit of each register 8002–8005 and 8102–8105 are also transmitted to a control circuit 8200 that is used for controlling the two multiplexing circuits 8006 and 8106. The control process that is executed in control circuit 8200 operates as follows:

When two empty cells are respectively presented on input bus 7011-j and 7012-j, a comma character appears in the first 10 bits of the two cells. These two comma characters are detected, and a corresponding positive 9th bit appears in the two pipelines 8002–8005 and 8102–8105. Because of the difference in the transfer time through the two links 7011-j and 7012-j, the two bit commas will appear at different instants. For instance, at a given instant, the comma bit may well be in latch 8104 (for link 7012-j), while it is in latch 8002 (for the link 7011-j). This is representative of a two byte delay within the two links.

From this information, control circuit 8200 will control the multiplexing circuits 8006 and 8106 in such a way that multiplexor 8006 is switched to the output of register 8002 while multiplexor 8106 is switched to the output of register 8104. From this instant the two multiplexors are locked to this position which should not change as long as the difference in the transfer time is the same. More generally, control circuit 8200 operates in order to detect the simultaneous appearance of one comma in each pipeline circuit. Obviously, this detection will occur when the second comma bit appears within one of the two pipelines, e.g. pipeline 8002–8005, when link 7011-j appears to be the slowest, or pipeline 8102–8105, when link 7012-j is slower. At the instant of occurrence of the second comma, control circuit 8200 latches the position of the comma within the two pipelines and uses this configuration for controlling, as illustrated above, the two multiplexing circuits 8006 and 8106.

It should be noted that, as mentioned above, the position of the two multiplexors are locked to this position, and an additional mechanism is used for ascertaining that this position remain appropriate. This is done by a continuous checking of the position of the comma bits on the occurrence of the second comma bit within the pipeline circuits.

The cells that are provided at the output of the two multiplexors 8006 and 8106 appear strictly synchronous, byte by byte. An additional multiplexor 8202, controlled by a control logic 8201, is used for providing the merging of the traffic coming from the two synchronous outputs 8009 and 8109 of multiplexors 8006 and 8106. Control logic reads the presence of the 9th bit of both outputs of multiplexors 8006 and 8106 and controls the multiplexor 8202 as follows: when one comma bit is detected at the output of one multiplexor (and one only), control logic 8201 controls multiplexor 8202 so that the latter switches its ouput to the opposite but that does not contain the comma bit. When the two input busses of multiplexor 8202 contain the comma bit, the latter multiplexor is switched to a default position, for instance bus 8009. It should be noted, while the detection of the comma bit is made during one byte, the control logic 8201 controls the mutliplexor 8202 during a full cell period.

The output of multiplexor 8202 is then transmitted to an 8B/10B bit coder 8203 which is used for building the ten bits of the 8B/10B bit code as a function of the byte and the comma character that appear at the output of this multiplexor.

APPENDIX

| Tables Address SRH | 1002-i | 1020-0 | 1020-1 | 1020-2 | 1020-3 | .. |
|---|---|---|---|---|---|---|
| x'0000' | x'8000' | x'8000' | valid bit off | valid bit off | valid bit off | |
| x'0001' | " | x'4000' | valid bit off | valid bit off | valid bit off | |
| x'0002' | " | x'2000' | valid bit off | valid bit off | valid bit off | |
| x'0003' | " | x'1000' | valid bit off | valid bit off | valid bit off | |
| x'0004' | x'4000' | valid bit off | x'8000' | valid bit off | valid bit off | |
| x'0005' | " | valid bit off | x'4000' | valid bit off | valid bit off | |
| x'0006' | " | valid bit off | x'2000' | valid bit off | valid bit off | |
| x'0007' | " | valid bit off | x'1000' | valid bit off | valid bit off | |
| x'0008' | x'2000' | valid bit off | valid bit off | x'8000' | valid bit off | |
| x'0009' | " | valid bit off | valid bit off | x'4000' | valid bit off | |
| x'000A' | " | valid bit off | valid bit off | x'2000' | valid bit off | |
| x'000B' | " | valid bit off | valid bit off | x'1000' | valid bit off | |
| x'000C' | x'1000' | valid bit off | valid bit off | valid bit off | x'8000' | |
| x'000D' | " | valid bit off | valid bit off | valid bit off | x'4000' | |
| x'000E' | " | valid bit off | valid bit off | valid bit off | x'2000' | |
| x'000F' | " | valid bit off | valid bit off | valid bit off | x'1000' | |
| . | . | . | . | . | . | |
| . | . | . | . | . | . | |
| . | . | . | . | . | . | |
| x'0100' processor | x'0000' | valid bit off | valid bit off | valid bit off | valid bit off | |
| . | . | . | . | . | . | |

What is claimed is:

1. A method for managing contention in a self-routing switching architecture based on a set of n×n individual switching structures that are connected in a port expansion mode by means of fan-out and fan-in circuits providing access of a switch core access layer to the different input and output ports of a switching core, said method comprising:

using an arbitration mechanism in each said fan-in circuit for providing a token to the switching structure that is allowed to deliver a next data cell;

detecting a special character complying with 8B/10B transmission coding by said arbitration mechanism, said special character being introduced in the data flow between said individual switching structures and said fan-in circuits in order to compensate for differences in delays of transfer of said data cells.

2. The method according to claim 1 wherein said arbitration mechanism includes a control mechanism and a merging mechanism, said method further comprising:

providing a grant by said control mechanism to one individual switching structure to enable delivery of said next data cell;

recieving said next data cell delivered by said one individual switching structure at said merging mechanism; and detecting said special character by said merging mechanism in order to determine the beginning of said next data cell.

3. A switching architecture based on a set of n×n individual switching structures connected in a port expansion mode, said architecture comprising:

n input groups of n switching structures, each group being arranged to receive by means of an associated duplicating circuit the cells that are transmitted to the corresponding input i of the n elementary switching structures therein included;

the whole set of n×n switching structures being organized in n output groups; of n switching structures each, each switching structure of a considered output group having its output port j transmitting the cells to the same direction;

n groups of fan-in or merging circuits for providing each the fan-in operation for the elementary switching structures belonging to a common output group, each fan-in circuit comprising an arbiter for providing a token to the switching structure that is allowed to deliver the next cell and means for detecting a special character complying with an 8B/10B transmission code which is introduced at the output of each individual switching structure, so that the difference of delays of transfer in the cells can be compensated.

4. The switching architecture according to claim 3 wherein each merging circuit comprises:

at least one first stage circuit for receiving the cells coming from respectively a first and a second switching structure included in the same output group;

the output of said at least one first stage circuit providing a serialized train of cells which can be transmitted through a coaxial cable or an optical fiber;

at least one first stage arbitration circuit, each of said at least one first stage arbitration circuit corresponding to one first stage circuit and having a dual direction control link (Queue_Empty; grant) with each associated switching structure; said dual direction control link comprising a first Queue_Empty control signal being characteristic of the state of the output buffer located in the considered switching structure and a reverse direction grant control signal which is received by the switching structure in order to inform it that a cell may be outputted at the considered output port.

5. The switching architecture according to claim 4 wherein each merging circuit comprises two first stage circuits and further comprises:

one second stage circuit for receiving the cells coming from each of the two first stage circuits, the output of said second stage circuit providing the cells coming from the four switching structures belonging to the same output group on a physical media such as a coaxial cable or an optical fiber that may extend to several hundreds of meters;

a second stage arbitration circuit associated with said second stage circuit, said second stage arbitration circuit having a dual direction control link (Queue_Empty; grant) with each associated first stage arbitration circuit in order to respectively receive the Queue_Empty control stage reported by one of the two first stage arbitration circuits and to transmit the grant control signal that is received from a control device in accordance with an arbitration rule that assigns a token to the lower stage that was not serviced at the last time.

6. The switching architecture according to claim 5 wherein a coding pattern is introduced between the switching structure and the associated merging circuit, said coding pattern being based on the 8B/10B transmission code providing a redundancy special character being used by each first stage of said merging circuit in order to compensate for the difference in the delays of transfer of the dual control lines that separate the switching structures and the associated merging circuit.

7. The switching architecture according to claim 6 wherein each first stage circuit comprises means for detecting said special character in the flow of data coming from one of the two associated switching structures at one input, and means, in response to the detection of the special character in one input, for switching the output to the input that is opposite with respect to the input that issued the special character.

8. The switching architecture as defined in anyone of claims 3 to 7 wherein each switching structure comprises a routing control device for introducing the appropriate routing header that is read from a routing control table corresponding to the switch routing header associated with the cell, said routing control table providing in addition to the routing header used inside the switching structure an additional valid bit which can be used for discarding the cell received by the considered switching structure.

* * * * *